(12) United States Patent
Kim et al.

(10) Patent No.: US 11,948,579 B2
(45) Date of Patent: Apr. 2, 2024

(54) ELECTRONIC DEVICE PERFORMING OPERATION BASED ON USER SPEECH IN MULTI DEVICE ENVIRONMENT AND OPERATING METHOD THEREOF

(71) Applicant: Samsung Electronics Co., Ltd., Suwon-si (KR)

(72) Inventors: Taegu Kim, Suwon-si (KR); Hansin Koh, Suwon-si (KR); Jooyeon Kim, Suwon-si (KR); Hyeonjae Bak, Suwon-si (KR); Hyunjin Park, Suwon-si (KR); Kyounggu Woo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 469 days.

(21) Appl. No.: 17/114,381

(22) Filed: Dec. 7, 2020

(65) Prior Publication Data
US 2021/0174810 A1  Jun. 10, 2021

(30) Foreign Application Priority Data

Dec. 5, 2019 (KR) .................. 10-2019-0160994
Jul. 8, 2020 (KR) .................. 10-2020-0084246

(51) Int. Cl.
G10L 15/32 (2013.01)
G06F 3/16 (2006.01)
G10L 15/22 (2006.01)

(52) U.S. Cl.
CPC .............. *G10L 15/32* (2013.01); *G06F 3/167* (2013.01); *G10L 2015/223* (2013.01)

(58) Field of Classification Search
CPC ......... G10L 15/22; G10L 15/26; G10L 15/30; G10L 2015/223
See application file for complete search history.

(56) References Cited

U.S. PATENT DOCUMENTS 6,192,073 B1  2/2001 Reader et al.
10,074,371 B1 *  9/2018 Wang ................. G10L 15/08
(Continued)

FOREIGN PATENT DOCUMENTS

KR       10-0262453 B1    8/2000
KR   10-2006-0034337 A    4/2006
(Continued)

OTHER PUBLICATIONS

International Search Report dated Apr. 2, 2021 in connection with International Patent Application No. PCT/KR2020/017697, 3 pages.
(Continued)

*Primary Examiner* — Mark Villena

(57) ABSTRACT

According to various embodiments, an electronic device performing an operation corresponding to an utterance of a user in a multi-device environment includes a communication module, a processor, and a memory. The processor operates a first electronic device for receiving and a second electronic device for executing in association with each other. The memory stores instructions that, when being executed, cause the processor to: determine whether a first utterance received at the first electronic device should be performed at the second electronic device; when the first utterance should be performed at the second electronic device, form a connection binding with the first electronic device and the second electronic device by using one or more channels through the communication module. When an operation corresponding to the first utterance is completed at the second electronic device, the processor terminates the connection binding with the first electronic device and the second electronic device.

31 Claims, 23 Drawing Sheets

(56) References Cited

U.S. PATENT DOCUMENTS

| | | | |
|---|---|---|---|
| 10,536,287 B1* | 1/2020 | Leblang | G10L 15/22 |
| 10,643,609 B1* | 5/2020 | Pogue | G10L 15/18 |
| 11,343,374 B1* | 5/2022 | Rolia | H04M 3/36 |
| 11,348,579 B1* | 5/2022 | Strand | H04M 3/42263 |
| 2014/0335789 A1* | 11/2014 | Cohen | H04W 12/50 |
| | | | 455/41.2 |
| 2014/0351315 A1* | 11/2014 | Panvelwala | H04L 67/10 |
| | | | 709/203 |
| 2015/0154976 A1* | 6/2015 | Mutagi | G06F 3/167 |
| | | | 704/275 |
| 2015/0199975 A1 | 7/2015 | Won et al. | |
| 2016/0165380 A1* | 6/2016 | Kwan | H04W 4/80 |
| | | | 455/41.1 |
| 2017/0013562 A1* | 1/2017 | Lim | H04M 1/725 |
| 2017/0269816 A1* | 9/2017 | Bradley | G06F 40/14 |
| 2018/0061412 A1 | 3/2018 | Cho et al. | |
| 2019/0019518 A1* | 1/2019 | Kojima | G10L 15/08 |
| 2019/0259374 A1* | 8/2019 | Kwon | H04N 21/42203 |
| 2020/0120396 A1* | 4/2020 | Jamal | H04N 21/4825 |
| 2020/0125603 A1* | 4/2020 | Ha | G06F 16/3329 |
| 2020/0241829 A1* | 7/2020 | Long | G06F 3/16 |
| 2020/0349940 A1 | 11/2020 | Ko et al. | |
| 2022/0399019 A1* | 12/2022 | Heo | G10L 15/1822 |

FOREIGN PATENT DOCUMENTS

| | | |
|---|---|---|
| KR | 10-2018-0138017 A | 12/2018 |
| KR | 10-2019-0111624 A | 10/2019 |
| KR | 10-2019-0123358 A | 11/2019 |
| KR | 10-2020-0127814 A | 11/2020 |

OTHER PUBLICATIONS

Written Opinion of the International Searching Authority dated Apr. 2, 2021 in connection with International Patent Application No. PCT/KR2020/017697, 4 pages.

* cited by examiner

ELECTRONIC DEVICE PERFORMING OPERATION BASED ON USER SPEECH IN MULTI DEVICE ENVIRONMENT AND OPERATING METHOD THEREOF

CROSS-REFERENCE TO RELATED APPLICATIONS

This application is based on and claims priority under 35 U.S.C. § 119 to Korean Patent Application No. 10-2019-0160994 filed on Dec. 5, 2019 and Korean Patent Application No. 10-2020-0084246 filed on Jul. 8, 2020 in the Korean Intellectual Property Office, the disclosures of which are herein incorporated by reference in their entirety.

BACKGROUND

1. Field

Various embodiments of the disclosure relate to an electronic device which recognizes a user utterance in a multi-device environment and performs an operation corresponding to the user utterance, and an operating method thereof.

2. Description of Related Art

With the recent development of voice recognition technology, a voice recognition function may be implemented in various electronic devices provided with a voice input device (for example, a microphone). An intelligent assistance service for providing an intuitive interface between electronic devices is developing. The intelligent assistance service may infer an intent of a user by performing natural language processing with respect to an utterance of the user, and may process to control a control device based on the inferred intent of the user. For example, an electronic device may recognize an utterance of a user through a voice recognition function and may understand an intent of the user utterance. Thereafter, the electronic device may perform an operation corresponding to the user utterance. In particular, in a multi-device environment, a plurality of receivers and a plurality of executors should organically exchange information with each other, and operations corresponding to utterance should be performed without interruption even when a receiver and/or executor is changed.

The above information is presented as background information only to assist with an understanding of the disclosure.

SUMMARY

Various embodiments of the disclosure provide an electronic device which can process an utterance without interruption in a multi-device environment, and an operating method thereof.

Various embodiments of the disclosure provide an electronic device which can display a resulting response to an utterance according to a form of a user interface (UI) of a receiver and an executor, and corrects the response to the utterance and transmits the response to the receiver, and an operating method thereof.

Various embodiments of the disclosure provide an electronic device which can cause a fixed executor to process an operation corresponding to an utterance, while changing a receiver, and can process an operation corresponding to an utterance while changing an executor, and an operating method thereof.

Various embodiments of the disclosure provide an electronic device which can maintain and terminate a connection between a receiver and an executor, based on a connection maintaining time, a follow-up utterance waiting time, and an additional information input waiting time, and an operating method thereof.

According to various embodiments of the disclosure, an electronic device performing an operation corresponding to an utterance of a user in a multi-device environment may include a communication module, a processor, and a memory. The processor may be operatively connected with the communication module and may operate a first electronic device for receiving and a second electronic device for executing in association with each other. The memory may be operatively connected with the processor. The memory may store instructions that, when being executed, cause the processor to: determine whether a first utterance received at the first electronic device should be performed at the second electronic device; when the first utterance should be performed at the second electronic device, form a connection binding with the first electronic device and the second electronic device by using one or more channels through the communication module, and, when an operation corresponding to the first utterance is completed at the second electronic device, terminate the connection binding with the first electronic device and the second electronic device.

According to various embodiments of the disclosure, an operating method of an electronic device which operates a first electronic device for receiving and a second electronic device for executing in association with each other may include: determining whether a first utterance received at the first electronic device should be performed at the second electronic device; when the first utterance should be performed at the second electronic device, forming a connection binding with the first electronic device and the second electronic device by using one or more channels; and, when an operation corresponding to the first utterance is completed at the second electronic device, terminating the connection binding with the first electronic device and the second electronic device.

According to various embodiments of the disclosure, an electronic device performing an operation corresponding to an utterance of a user in a multi-device environment may include: a communication module; a processor operatively connected with the communication module and configured to operate a first electronic device for receiving and a second electronic device for executing in association with each other; and a memory operatively connected with the processor. The memory may store instructions that, when being executed, cause the processor to: generate a first channel with the first electronic device which receives the utterance; receive information of the utterance through the first channel; determine whether an action corresponding to the utterance should be executed at the second electronic device, based on the information of the utterance; generate a second channel with the second electronic device; request the second electronic device to execute the action corresponding to the utterance through the second channel; receive a result of executing the action corresponding to the utterance from the second electronic device; and transmit the result of executing the action corresponding to the utterance to the first electronic device.

According to various embodiments of the disclosure, an electronic device for receiving an utterance of a user in a multi-device environment may include: a communication module; a processor operatively connected with the communication module and configured to operate the first electronic device for receiving and a second electronic device for executing in association with each other; and a memory operatively connected with the processor. The memory may store instructions that, when being executed, cause the processor to: when the utterance is received, generate at least one channel and connect with the second electronic device; display the connection with the second electronic device through a UI; request the second electronic device to execute an action corresponding to the utterance through the at least one channel; receive a result of executing the action corresponding to the utterance from the second electronic device; and display the result of executing the action corresponding to the utterance through the UI.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

With regard to the description of the drawings, the same or similar reference numerals may be used to refer to the same or similar elements.

DETAILED DESCRIPTION

Figure 1:
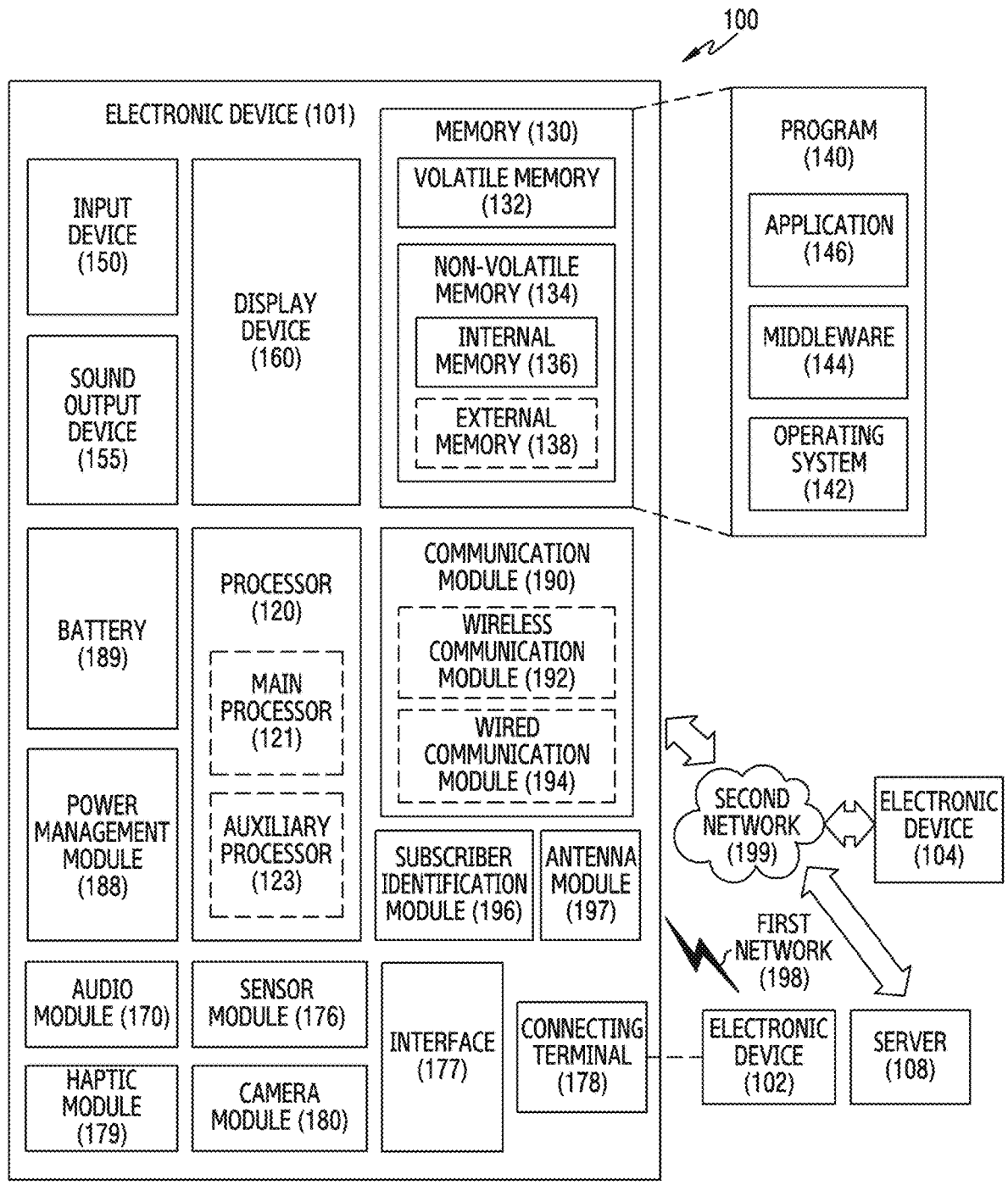
FIG. 1 illustrates a block diagram of an example electronic device in a network environment according to various embodiments.

FIGS. 1 through 22, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, various embodiments of the disclosure will be described with reference to the accompanying drawings. Components illustrated in the drawings may have their sizes exaggerated or reduced for convenience of explanation, and the disclosure is not necessarily limited to those illustrated in the drawings.

FIG. 1 illustrates a block diagram of an example electronic device 101 in a network environment 100 according to various embodiments;

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module(SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by another component(s) (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
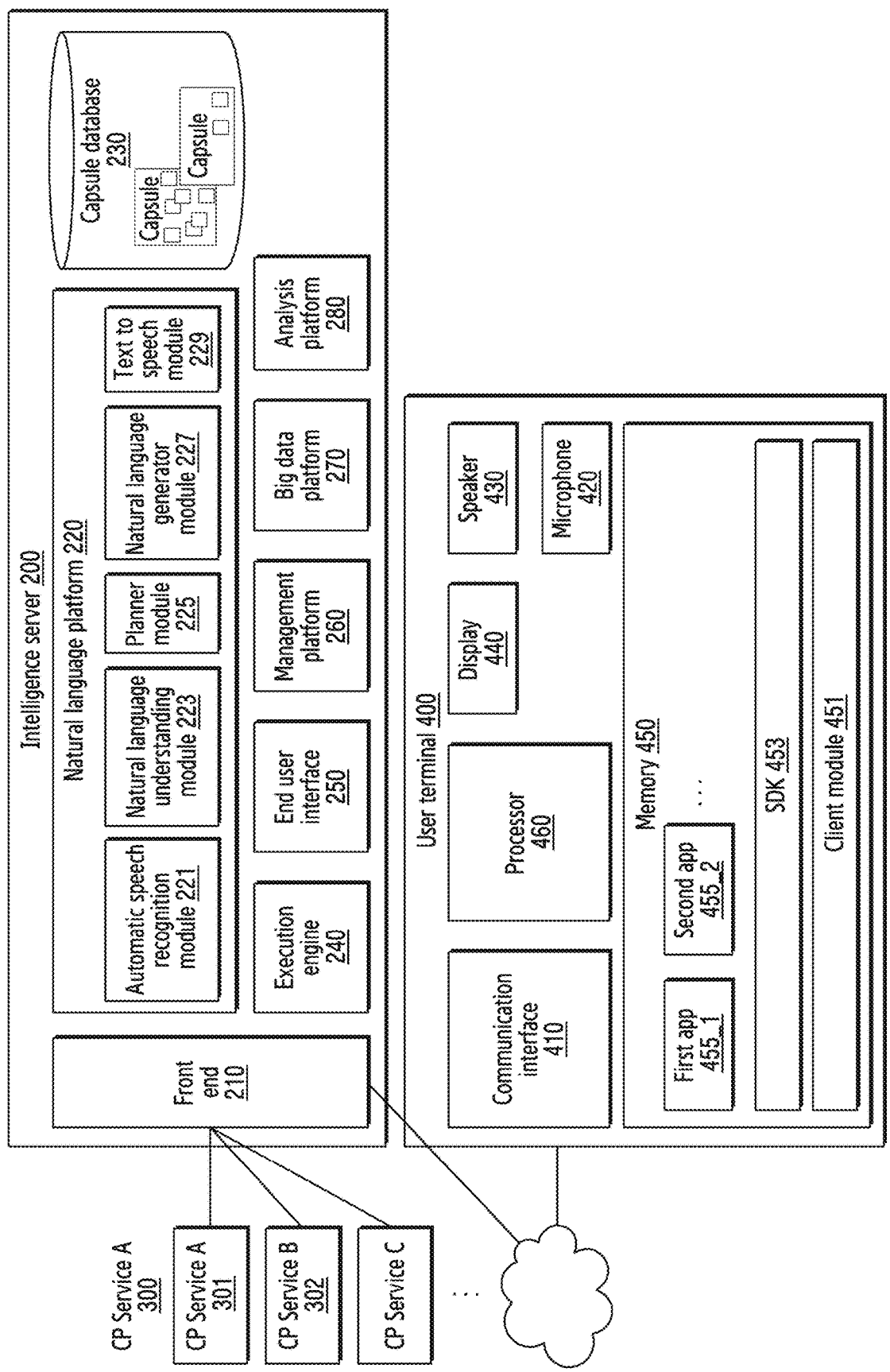
FIG. 2 illustrates a block diagram of an example integrated intelligence system according to an embodiment.

FIG. 2 illustrates a block diagram of an example integrated intelligence system according to an embodiment.

Referring to FIG. 2, the integrated intelligence system according to an embodiment may include an intelligent server 200, a service server 300, and a user terminal 400.

The user terminal 400 (for example, the electronic device 101 of FIG. 1) in an embodiment may be a terminal device (or an electronic device) connectable to the Internet, and for example, may be a mobile phone, a smartphone, a personal digital assistant (PDA), a notebook computer, a TV, a home appliance, a wearable device, a head mounted display (HMD), or a smart speaker.

According to the illustrated embodiment, the user terminal 400 may include a communication interface 410, a microphone 420, a speaker 430, a display 440, a memory 450, or a processor 460. The above-mentioned components may be operatively or electrically connected with one another.

The communication interface 410 in an embodiment may be connected with an external device and may be configured to transmit and receive data. The microphone 420 in an embodiment may receive a sound and may convert the sound into an electric signal. The speaker 430 in an embodiment may output an electronic signal as a sound (for example, a voice). The display 440 in an embodiment may be configured to display an image or a video. The display 440 in an embodiment may also display a graphic user interface (GUI) of an executed application (or an application program).

The memory 450 in an embodiment may store a client module 451, a software development kit (SDK) 453, and a plurality of applications 455. The client module 451 and the SDK 453 may constitute a framework (or a solution program) to perform a generic-purpose function. In addition, the client module 451 or the SDK 453 may constitute a framework to process a voice input.

The plurality of applications 455 in an embodiment may be programs for performing designated functions. According to an embodiment, the plurality of applications 455 may include a first application 455_1, a second application 455_2. According to an embodiment, each of the plurality of applications 455 may include a plurality of operations to perform a designated function. For example, the applications may include an alarm application, a message application, and/or a schedule application. According to an embodiment, the plurality of applications 455 may be executed by the processor 460 to execute at least some of the plurality of operations in sequence.

The processor 460 in an embodiment may control overall operations of the user terminal 400. For example, the processor 460 may be electrically connected with the communication interface 410, the microphone 420, the speaker 430, and the display 440 to perform designated operations.

The processor 460 in an embodiment may execute a program stored in the memory 450 to perform a designated function. For example, the processor 460 may execute at least one of the client module 451 or the SDK 453 to perform the following operation for processing a voice input. The processor 460 may control, for example, operations of the plurality of applications 455 through the SDK 453. The following operation described as the operation of the client module 451 or the SDK 453 may be an operation executed by the processor 460.

The client module 451 in an embodiment may receive a voice input. For example, the client module 451 may receive a voice signal corresponding to a user utterance detected through the microphone 420. The client module 451 may transmit the received voice input to the intelligent server 200 (for example, the server 108 of FIG. 1). The client module 451 may transmit state information of the user terminal 400 to the intelligent server 200 along with the received voice input. The state information may be, for example, execution state information of an application.

The client module 451 in an embodiment may receive a result corresponding to the received voice input. For example, when the intelligent server 200 is able to calculate the result corresponding to the received voice input, the client module 451 may receive the result corresponding to the received voice input. The client module 451 may display the received result on the display 440.

The client module 451 in an embodiment may receive a plan corresponding to the received voice input. The client module 451 may display results of executing a plurality of operations of an application according to the plan on the display 440. The client module 451 may display the results of executing the plurality of operations on the display in sequence. In another example, the user terminal 400 may display only some results (for example, the result of performing the final operation) of executing the plurality of operations on the display.

According to an embodiment, the client module 451 may receive, from the intelligent server 200, a request for obtaining information necessary for calculating the result corresponding to the voice input. According to an embodiment, the client module 451 may transmit the necessary information to the intelligent server 200 in response to the request.

The client module 451 in an embodiment may transmit information on the results of executing the plurality of operations according to the plan to the intelligent server 200. The intelligent server 200 may identify that the received voice input is correctly processed by using the information on the results.

The client module 451 in an embodiment may include a voice recognition module.

According to an embodiment, the client module 451 may recognize a voice input to perform a limited function through the voice recognition module. For example, the client module 451 may execute an intelligent application for processing a voice input for performing an organic operation through a designated input (for example, "Wake up!").

The intelligent server 200 (for example, the server 108 of FIG. 1) in an embodiment may receive information related to a user voice input from the user terminal 400 (for example, the electronic device 101 of FIG. 1) through a communication network. According to an embodiment, the intelligent server 200 may convert data related to the received voice input into text data. According to an embodiment, the intelligent server 200 may generate a plan to perform a task corresponding to the user voice input, based on the text data.

According to an embodiment, the plan may be generated by an artificial intelligent (AI) system. The AI system may be a rule-based system, or may be a neural network-based system (for example, a feedforward neural network (FNN), a recurrent neural network (RNN)). Alternatively, the AI system may be a combination of the above-mentioned systems or a different AI system. According to an embodiment, the plan may be selected from a set of pre-defined plans, or may be generated in real time in response to a user request. For example, the AI system may select at least one plan from a plurality of pre-defined plans.

The intelligent server 200 in an embodiment may transmit a result corresponding to the generated plan to the user terminal 400 or may transmit the generated plan to the user terminal 400. According to an embodiment, the user terminal 400 may display the result corresponding to the plan on the display. According to an embodiment, the user terminal 400 may display a result of executing an operation corresponding to the plan on the display.

The intelligent server 200 in an embodiment may include a front end 210, a natural language platform 220, a capsule database (DB) 230, an execution engine 240, an end user interface 250, a management platform 260, a big data platform 270, or an analytic platform 280.

The front end 210 in an embodiment may receive a received voice input from the user terminal 400. The front end 210 may transmit a response corresponding to the voice input.

According to an embodiment, the natural language platform 220 may include an automatic speech recognition (ASR) module 221, a natural language understanding (NLU) module 223, a planner module 225, a natural language generator (NLG) module 227, or a text to speech (TTS) module 229.

The ASR module 221 in an embodiment may convert the voice input received from the user terminal 400 into text data. The NLU module 223 in an embodiment may understand a user intent by using the text data of the voice input. For example, the NLU module 223 may understand the user intent by performing syntactic analysis or sematic analysis. The NLU module 223 in an embodiment may understand a meaning of a word extracted from the voice input by using linguistic features (for example, syntactic elements) of a morpheme or a phrase, and may determine the user intent by matching the understood meaning of the word with the intent.

The planner module 225 in an embodiment may generate a plan by using the intent determined at the NLU module 223 and a parameter. According to an embodiment, the planner module 225 may determine a plurality of domains necessary for performing a task based on the determined intent. The planner module 225 may determine a plurality of operations included in each of the plurality of domains determined based on the intent. According to an embodiment, the planner module 225 may determine a parameter necessary for executing the determined plurality of operations, or a result value outputted by execution of the plurality of operations. The parameter and the result value may be defined as a concept of a designated format (or class). Accordingly, the plan may include the plurality of operations determined by the user intent, and the plurality of concepts. The planner module 225 may determine relationship between the plurality of operations and the plurality of concepts in a stepwise manner (or hierarchically). For example, the planner module 225 may determine an execution sequence of the plurality of operations determined based on the user intent, based on the plurality of concepts. In other words, the planner module 225 may determine an execution sequence of the plurality of operations, based on the parameter necessary for executing the plurality of operations and the result outputted by execution of the plurality of operations. Accordingly, the planner module 225 may generate a plan including connection information (for example, ontology) between the plurality of operations and the plurality of concepts. The planner module 225 may generate the plan by using information stored in the capsule database 230 in which a set of relationships between the concept and the operation is stored.

The NLG module 227 in an embodiment may change designated information to a text form. The information changed to the text form may be a form of a natural language utterance. The TTS module 229 may change information in a text form to information in a voice form.

According to an embodiment, some or all of the functions of the natural language platform 220 may be implemented in the user terminal 400.

The capsule database 230 may store information on relationships between the plurality of concepts and operations corresponding to the plurality of domains. The capsule in an embodiment may include a plurality of operation (action) objects (or operation information) and concept objects (or concept information) included in the plan. According to an embodiment, the capsule database 230 may store a plurality of capsules in the form of a concept action network (CAN). According to an embodiment, the plurality of capsules may be stored in a function registry included in the capsule database 230.

The capsule database 230 may include a strategy registry in which strategy information necessary in determining a plan corresponding to a voice input is stored. The strategy information may include reference information for determining one plan when there are a plurality of plans corresponding to a voice input. According to an embodiment, the capsule database 230 may include a follow-up registry in which information of a follow-up operation for suggesting a follow-up operation for a user in a designated context is stored. The follow-up operation may include, for example, a follow-up utterance. According to an embodiment, the capsule database 230 may include a layout registry that stores layout information of information outputted through the user terminal 400. According to an embodiment, the capsule database 230 may include a vocabulary registry in which vocabulary information included in capsule information is stored. According to an embodiment, the capsule database 230 may include a dialog registry in which information of a dialog (or interaction) with a user is stored. The capsule database 230 may update a stored object through a developer tool. The developer tool may include, for example, a function editor for updating an operation object or a concept object. The developer tool may include a vocabulary editor for updating a vocabulary. The developer tool may include a strategy editor for generating and registering a strategy for determining a plan. The developer tool may include a dialog editor for generating a dialog with a user. The developer tool may include a follow-up editor for enabling a follow-up target and editing a follow-up utterance providing a hint. The follow-up target may be determined based on a currently set target, user's preference, or an environmental condition. The capsule database 230 in an embodiment may be implemented in the user terminal 400.

The execution engine 240 in an embodiment may calculate a result by using the generated plan. The end user interface 250 may transmit the calculated result to the user terminal 400. Accordingly, the user terminal 400 may receive the result and may provide the received result to the user. The management platform 260 in an embodiment may manage information used in the intelligent server 200. The big data platform 270 in an embodiment may collect user data. The analytic platform 280 in an embodiment may manage quality of service (QoS) of the intelligent server 200. For example, the analytic platform 280 may manage components and a processing rate (or efficiency) of the intelligent server 200.

The service server 300 in an embodiment may provide a designated service (for example, an order of food or reservation of a hotel) to the user terminal 400. According to an embodiment, the service server 300 may be a server that is managed by a third party. The service server 300 in an embodiment may provide information for generating a plan corresponding to a received voice input to the intelligent server 200. The provided information may be stored in the capsule database 230. In addition, the service server 300 may provide result information corresponding to the plan to the intelligent server 200.

In the above-described integrated intelligence system, the user terminal 400 may provide various intelligent services to the user in response to a user input. The user input may include, for example, an input through a physical button, a touch input, or a voice input.

In an embodiment, the user terminal 400 may provide a voice recognition service through an intelligent application (or a voice recognition application) stored therein. In this case, for example, the user terminal 400 may recognize a user utterance or a voice input received through the microphone, and may provide a service corresponding to the recognized voice input to the user.

In an embodiment, the user terminal 400 may perform a designated operation solitarily or along with the intelligent server and/or the service server, based on the received voice input. For example, the user terminal 400 may execute an application corresponding to the received voice input, and may perform a designated operation through the executed application.

In an embodiment, when the user terminal 400 provides a service along with the intelligent server 200 and/or the service server, the user terminal 400 may detect a user utterance by using the microphone 420, and may generate a signal (or voice data) corresponding to the detected user utterance. The user terminal 400 may transmit the voice data to the intelligent server 200 through the communication interface 410.

The intelligent server 200 according to an embodiment may generate a plan for performing a task corresponding to the voice input, or a result of performing an operation according to the plan, in response to the voice input received from the user terminal 400. The plan may include a plurality of operations for performing the task corresponding to the user voice input, and a plurality of concepts related to the plurality of operations. The concept may be a definition of a parameter inputted for execution of the plurality of operations, or a definition of a result value outputted by execution of the plurality of operations. The plan may include connection information between the plurality of operations and the plurality of concepts.

The user terminal 400 in an embodiment may receive the response by using the communication interface 410. The user terminal 400 may output a voice signal generated inside the user terminal 400 to the outside by using the speaker 430, or may output an image generated inside the user terminal 400 to the outside by using the display 440.

Figure 3:
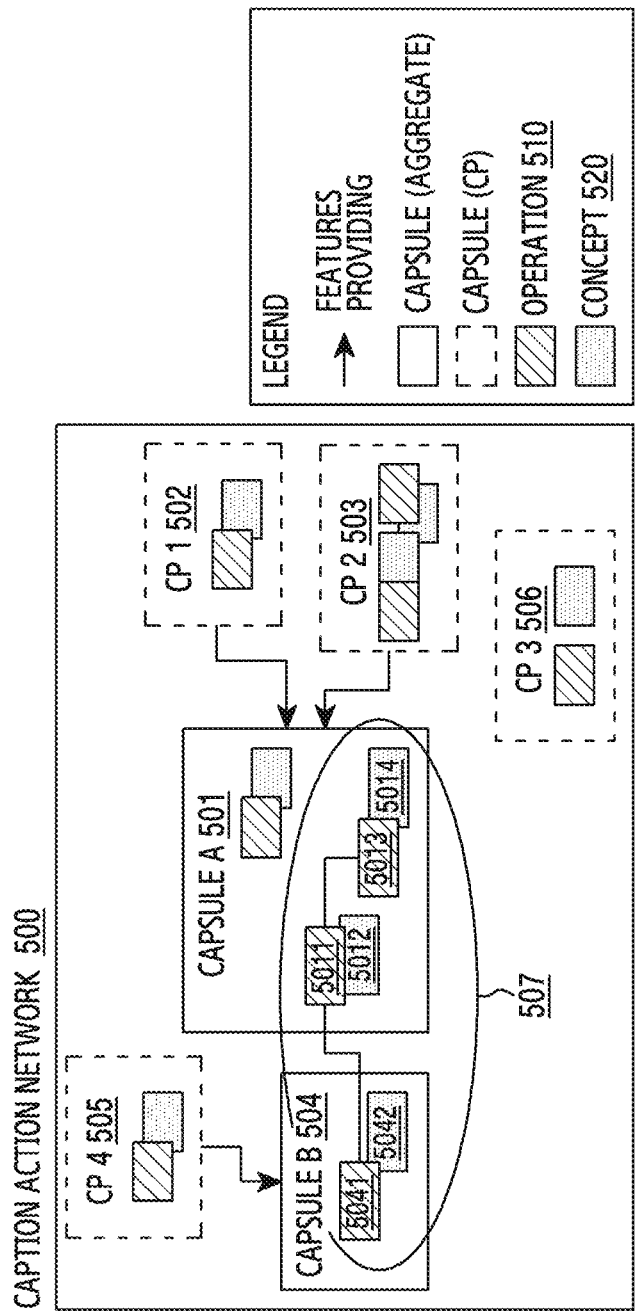
FIG. 3 illustrates a view illustrating a form of relationship information between a concept and an action that is stored in a database according to an embodiment.

FIG. 3 illustrates an example view showing a form of relationship information between concepts and operations that is stored in a database according to various embodiments.

Referring to FIGS. 2 and 3, a capsule database (for example, the capsule database 230) of the intelligent server 200 may store capsules in the form of a CAN. The capsule database may store an operation for processing a task corresponding to a user voice input, and a parameter necessary for the operation in the form of the CAN.

The capsule database may store a plurality of capsules (capsule A 501, capsule B 504) corresponding to a plurality of domains (for example, applications), respectively. According to an embodiment, one capsule (for example, capsule A 501) may correspond to one domain (for example, geo, application). In addition, one capsule may correspond to at least one service provider (for example, CP 1 502, CP 2 503, or CP 3 506) for performing a function regarding the domain related to the capsule. According to an embodiment, one capsule may include at least one operation 510 and at least one concept 520 for performing a designated function.

The natural language platform 220 may generate a plan for performing a task corresponding to a received voice input by using a capsule stored in the capsule database. For example, the planner module 225 of the natural language platform may generate the plan by using the capsule stored in the capsule database. For example, a plan 507 may be generated by using operations 5011, 5013 and concepts 5012, 5014 of the capsule A 501, and an operation 5041 and a concept 5042 of the capsule B 504.

Figure 4:
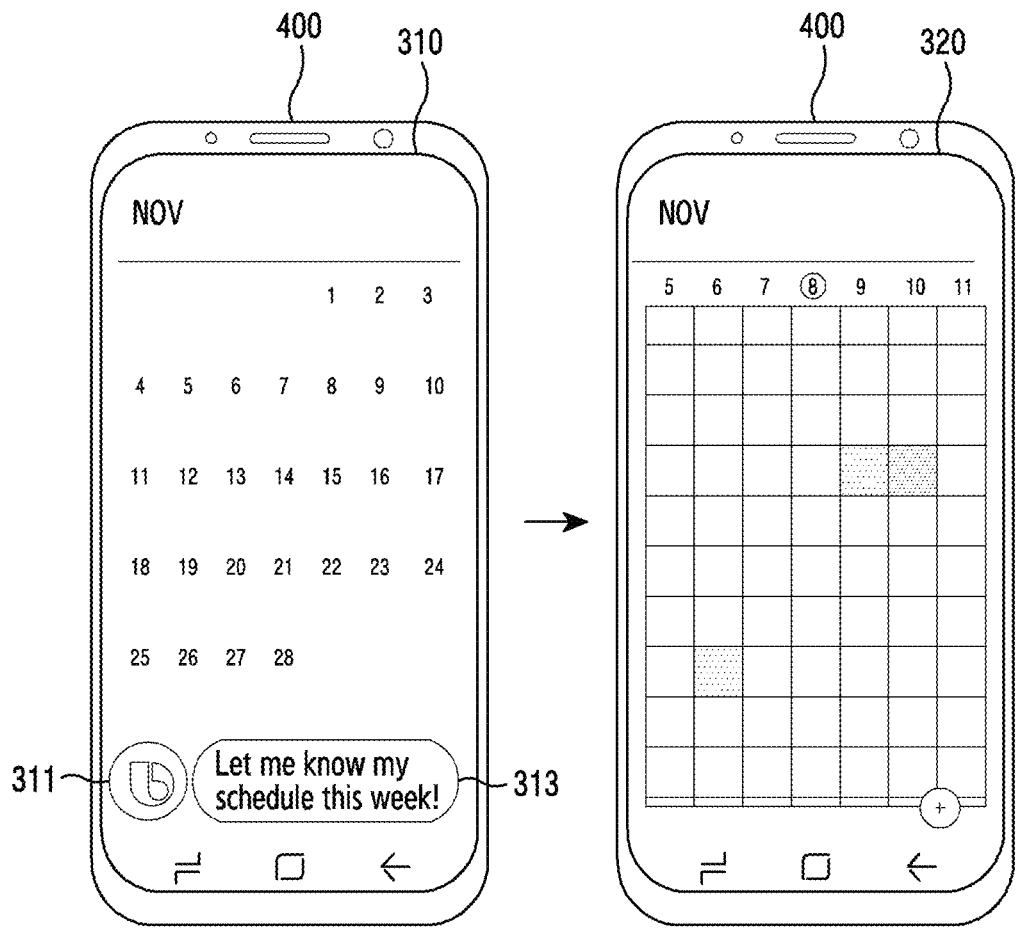
FIG. 4 illustrates a view of an example user terminal which displays a screen for processing a voice input received through an intelligent application according to an embodiment.

FIG. 4 illustrates an example view of a screen for processing a voice input received through an intelligent application in a user terminal according to various embodiments.

Referring to FIG. 4, the user terminal 400 may execute an intelligent application for processing a user input through the intelligent server 200.

According to an embodiment, when the user terminal 400 recognizes a designated voice input (for example, "Wake up!") or receives an input through a hardware key (for example, a dedicated hardware key) on a screen 310, the user terminal 400 may execute an intelligent application for processing the voice input. For example, the user terminal 400 may execute the intelligent application while executing a schedule application. According to an embodiment, the user terminal 400 may display an object (for example, an icon) 311 corresponding to the intelligent application on the display 440. According to an embodiment, the user terminal 400 may receive a voice input by a user utterance. For example, the user terminal 400 may receive a voice input saying, "Let me know my schedule this week". According to an embodiment, the user terminal 400 may display a UI 313 (for example, an input window) of the intelligent application displaying text data of the received voice input on the display.

According to an embodiment, on a screen 320, the user terminal 400 may display a result corresponding to the received voice input. For example, the user terminal 400 may receive a plan corresponding to the received user input, and may display "schedule of this week" on the display according to the plan.

Figure 5:
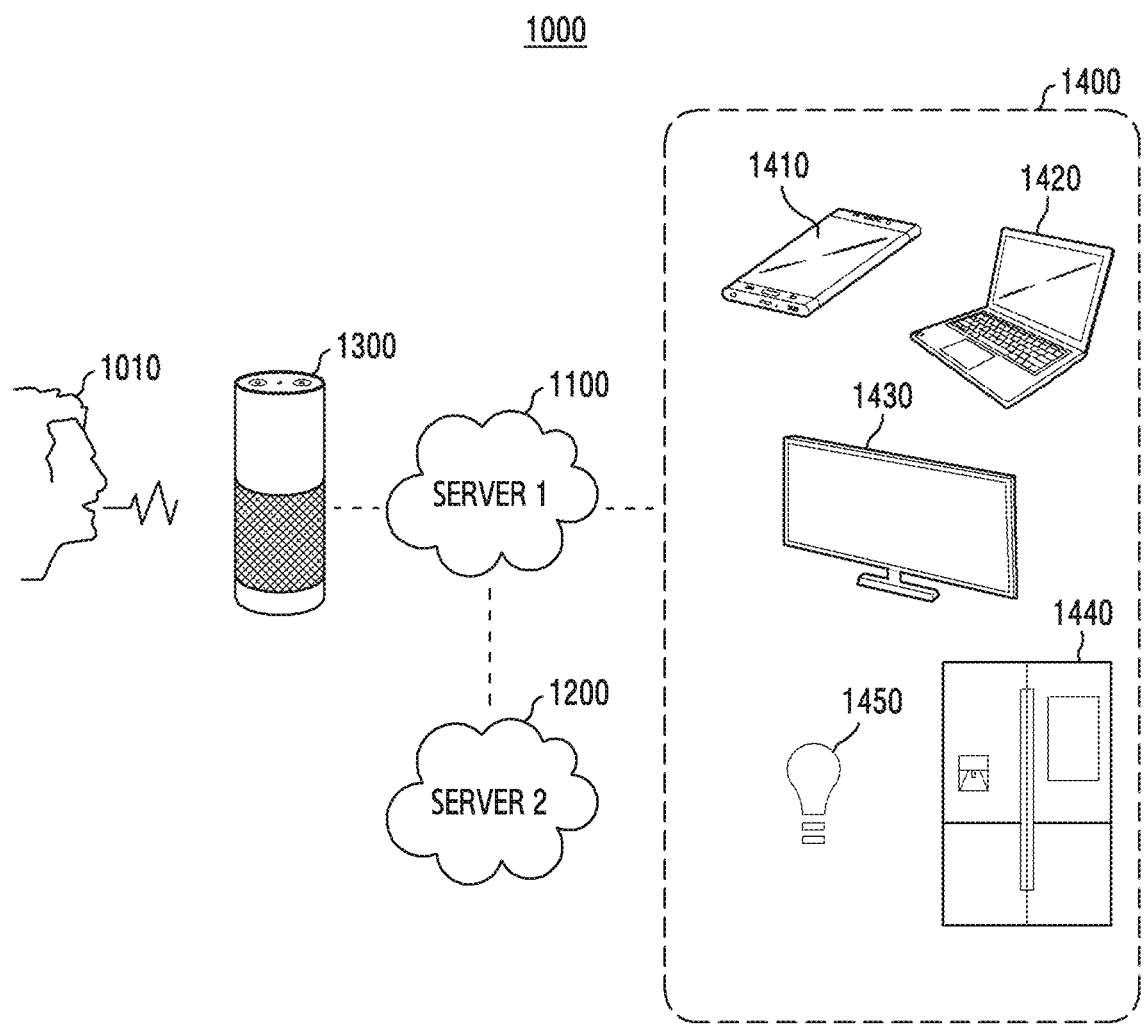
FIG. 5 illustrates a view of an example intelligent assistance system according to various embodiments.

FIG. 5 illustrates a view of an example intelligent assistance system 1000 according to various embodiments.

Referring to FIG. 5, the intelligent assistance system 1000 may include a first server 1100 (for example, the server 108 of FIG. 1 or the intelligent server 200 of FIG. 2), a second server 1200 (for example, the server 108 of FIG. 1), a receiver 1300 (for example, an AI speaker), and a plurality of executors 1400. In FIG. 5, one receiver 1300 is illustrated, but a plurality of receivers 1300 may be disposed in a predetermined space. The first server 1100 and the receiver 1300 may be connected with each other by using a wired or wireless network. The first server 1100 and the second server 1200 may be connected with each other by using a wired or wireless network. The first server 1100 and the plurality of executors 1400 may be connected with each other in a wired or wireless network. The receiver 1300 and the plurality of executors 1400 may be connected with each other through the first server 1100. However, this should not be considered as limiting, and the receiver 1300 and the plurality of executors 1400 may be connected with each other in a D2D method.

According to various embodiments, the receiver 1300 may include various devices including a configuration related to voice recognition and a voice input device (for example, a microphone). For example, the receiver 1300 may include the electronic device 101 of FIG. 1 or the user terminal 400 of FIG. 2. The receiver 1300 may acquire an utterance from a user 1010 through the voice input device. The utterance may include a wake-up utterance instructing to enable and/or invoke an intelligent assistance service, and/or a control utterance instructing an operation (for example, power control, volume control) of a hardware/software configuration included in the plurality of executors 1400.

The wake-up utterance may be a pre-set keyword, such as "Hi", "Hello", "Hi, ABC". For example, "ABC" in the wake-up utterance may be a name (for example, "Bixby") given to the receiver 1300 (or a voice recognition agent of the receiver 1300 (or AI)), like galaxy.

The control utterance may be acquired in the state where the intelligent assistance service is enabled or invoked by the wake-up utterance. However, this is merely an example, and embodiments of the present disclosure are not limited thereto. For example, the control utterance may be acquired along with the wake-up utterance.

According to various embodiments, the receiver 1300 may generate a control message (or a control instruction) based on at least a portion of the acquired utterance (or utterance data). The receiver 1300 may transmit the generated control message to a target executor to perform an operation corresponding to the utterance, from among the plurality of executors 1410, 1420, 1430, 1440, or 1450, by using the first server 1100. The control message may be generated based on a result of processing the utterance data.

The processing of the utterance data may be performed through natural language processing by the receiver 1300 and/or natural language processing by the first server 1100. For example, the receiver 1300 may process the utterance data by itself by using a voice processing module included in the receiver 1300, as will be described below with reference to FIG. 6.

In addition, the receiver 1300 may transmit the utterance data to the first server 1100, and may request a result of processing the utterance data, as will be described below with reference to FIG. 7. For example, the receiver 1300 may include an utterance data processing capability of a first level, for example, a voice recognition module and an NLU module of the first level. In addition, the first server 1100 may include an utterance data processing capability of a second level higher than the first level, for example, a voice recognition module and an NLU module of the second level.

According to various embodiments, the plurality of executors 1400 may include a smartphone 1410, a computer 1420 (for example, a personal computer, a notebook computer, or the like), a television 1430, a refrigerator 1440, and/or an illumination device 1450. The executors 1400 according to various embodiments may further include an air conditioner, a thermostat, an alarm device, a gas valve control device, or a door lock device although they are not illustrated in FIG. 5.

According to an embodiment, each of the plurality of executors 1400 may include a communication circuit to establish communication with the first server 1100 by using a designated protocol (for example, Bluetooth, Wi-Fi, or Zigbee), and to transmit and receive a variety of information. According to an embodiment, the plurality of executors 1400 may transmit information on their own operation states (for example, on/off information of a device) to the receiver 1300 or the first server 1100. In addition, the plurality of executors 1400 may receive a control message (for example, an on/off control command of a device, or other operation control commands of a device) from the receiver 1300 or the first server 1100. The plurality of executors 1400 may execute an operation corresponding to the control message. In addition, the plurality of executors 1400 may transmit a result of executing the operation corresponding to the control message to the receiver 1300 or the first server 1100.

The first server 1100 may form a connection binding between the receiver 1300 and the plurality of executors 1400 to cause the operation corresponding to the utterance obtained at the receiver 1300 to be performed. The first server 1100 may form a first channel for communicating with the receiver 1300, and may form a second channel for communicating with at least one of the plurality of executors 1400. The first server 1100 may form the connection binding between the receiver 1300 and the executor 1400, by using first device information of the receiver 1300 received through the first channel and second device information of the plurality of executors 1400 received through the second channel. In addition, the first server 1100 may control maintenance, termination, and/or reconnection of the connection binding between the receiver 1300 and the plurality of executors 1400. In addition, the first server 1100 may control exchange of information and distribution of information between the receiver 1300 and the plurality of executors 1400. The first server 1100 will be described in detail below with reference to FIGS. 7 and 8.

According to various embodiments, the first server 1100 may connection-bind one receiver 1300 and one executor (for example, 1430). However, this should not be considered as limiting, and the first server 1100 may connection-bind one receiver 1300 and a plurality of executors (for example, 1430, 1440). The receiver 1300 may receive an utterance to be performed at the plurality of executors 1400. Herein, when the utterance of the user 1010 indicates a plurality of target executors, the first server 1100 may connection-bind the plurality of executors (for example, the TV 1430 and the refrigerator 1440) to one receiver 1300.

For example, when an utterance saying "Play the Infinite Challenge on the TV 1430, and tell me the weather information on the refrigerator 1440" is received at the receiver 1300 (for example, a speaker), the TV 1430 and the refrigerator 1440 may perform operations corresponding to the utterance of the user 1010 as a plurality of executors. That is, the first server 1100 may connection-bind one receiver 1300 and the plurality of executors (for example, the TV 1430 and the refrigerator 1440).

To connection-bind the receiver 1300 and the plurality of executors 1400, the receiver 1300 may transmit first device information thereof to the second server 1200. Each of the plurality of executors 1400 may transmit their own second device information to the second server 1200. For example, the first device information may include state information, necessary response information, or identification information of the receiver 1300. The second device information may include state information, necessary response information, or identification information of the executor 1400. The second server 1200 may store and manage the first device information and the second device information for connection-binding between the receiver 1300 and the plurality of executors 1400. The second server 1200 may provide the first device information on the receiver 1300 and the second device information on each of the plurality of executors 1400 to the first server 1100. The first server 1100 and the second server 1200 may be disposed with different configurations. However, this should not be considered as limiting, and the first server 1100 and the second server 1200 may be disposed with the same configuration. Although FIG. 5 illustrates that the first server 1100 and the second server 1200 are configured separately by way of an example, the first server 1100 and the second server 1200 may be integrated into one server.

Figure 6:
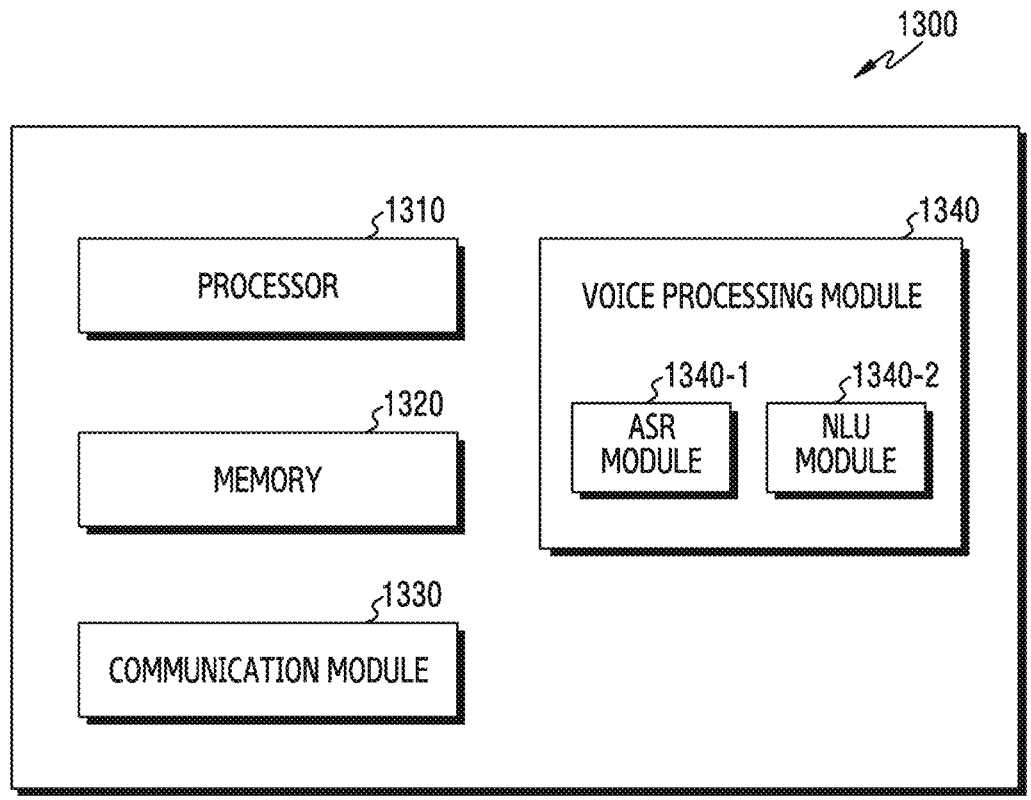
FIG. 6 illustrates a view of an example configuration of a receiver according to various embodiments.

FIG. 6 illustrates a view of an example configuration of the receiver according to various embodiments.

Referring to FIGS. 5 and 6, the receiver 1300 may include a processor 1310, a memory 1320, a communication module 1330, and/or a voice processing module 1340.

According to various embodiments, in response to an utterance being received, the processor 1310 may control the received utterance to be processed through the receiver 1300 and the first server 1100. According to an embodiment, the processor 1310 may control the voice processing module 1340 to perform natural language processing with respect to utterance data received from the user 1010. For example, the processor 1310 may control the voice processing module 1340 to acquire at least one of an intent of the utterance of the user 1010, a domain for executing a task, or data (for example, a slot or a task parameter) necessary for understanding the intent of the user 1010. In addition, the processor 1310 may control the communication module 1330 to provide the received utterance to the first server 1100, thereby causing the received utterance to be processed through the first server 1100.

According to various embodiments, the receiver 1300 may perform a function of a listener of receiving a user voice. The receiver 1300 may include a voice input device (not shown) (for example, a microphone) to receive a user voice. In addition, the receiver 1300 may provide a result of performing an operation corresponding to the utterance of the user. The receiver 1300 may include a sound output device (not shown) (for example, a speaker), a display (not shown), and/or one or more lamps (not shown) to provide the result of performing the operation corresponding to the utterance.

According to various embodiments, the processor 1310 may control to generate a control message (or a control instruction), based on at least one of a first processing result of the utterance data performed through the receiver 1300 and a second processing result of the utterance data performed through the first server 1100. According to an embodiment, the processor 1310 may select a processing result to be used for generating the control message, based on pre-stored intent masking information. The intent masking information may be information in which an utterance processing object is designated for an intent. For example, the processor 1310 may identify an intent by processing a received utterance, and may determine whether the utterance related to the identified intent is defined to be processed through the receiver 1300 or is defined to be processed through the first server 1100, based on the intent masking information.

According to another embodiment, the processor 1310 may process the intent masking information stored in the memory 1320 to be refined. According to an embodiment, the processor 1310 may control to provide the result of processing the received utterance to the first server 1100. For example, the processor 1310 may transmit the result of processing the utterance data, performed by the receiver 1300 (for example, the voice processing module 1340), to the first server 1100, such that intent masking information corresponding to the result of processing can be received. In addition, the processor 1310 may process the intent masking information stored in the memory 1320 to be refined, based on at least a portion of the intent masking information received from the first server 1100.

According to various embodiments, the voice processing module 1340 may understand an intent and/or a domain regarding the input of the user 1010, by performing natural language processing with respect to the utterance acquired from the user 1010. In addition, the voice processing module 1340 may generate a result of natural language processing by natural language understanding with respect to the input of the user 1010. According to an embodiment, the voice processing module 1340 may include a voice recognition module (an ASR module) 1340-1 and/or an NLU module 1340-2. In addition, the voice processing module 1340 may further include an NLG module and a TTS module, although they are not illustrated.

According to an embodiment, the voice recognition module 1340-1 may generate text data expressing the received utterance in a designated language. The voice recognition module 1340-1 may generate text data by using an acoustic model and/or a language model. The acoustic model may include information regarding vocalization, and the language model may include unit phoneme information and/or information of a combination of unit phoneme information. For example, the voice recognition module 1340-1 may convert the utterance of the user 1010 into text data by using the information on vocalization and/or the information related to unit phoneme information.

According to an embodiment, the NLU module 1340-2 may understand an intent regarding the input of the user 1010 or may understand a matching domain, by using a natural language processing model with respect to the text data generated by the voice recognition module 1340-1. The NLU module 1340-2 may acquire an element (for example, a slot or a task parameter) necessary for expressing the intent of the user 1010. For example, the NLU module 1340-2 may process utterance data, based on syntactic analysis and/or semantic analysis. Based on a result of processing, a domain or an intent corresponding to the utterance may be determined, and an element necessary for expressing the intent of the user 1010 may be acquired. According to an embodiment, the NLU module 1340-2 may include a plurality of NLU modules. The plurality of NLU modules may correspond to the plurality of executors 1400, respectively. For example, each of the NLU modules may understand an intent regarding the input of the user 1010 or may understand a matching domain with reference to a natural language understanding database corresponding to each of the executors 1410, 1420, 1440, or 1450.

According to an embodiment, the voice processing module 1340 (for example, the NLG module) may generate data created in the middle of natural language processing in the form of a natural language. The data generated in the form of the natural language may be a result of natural language understanding. In addition, the NLG module may generate a result of executing indicating whether a control operation corresponding to a control utterance is performed by the plurality of executors 1400, in the form of a natural language.

Figure 7:
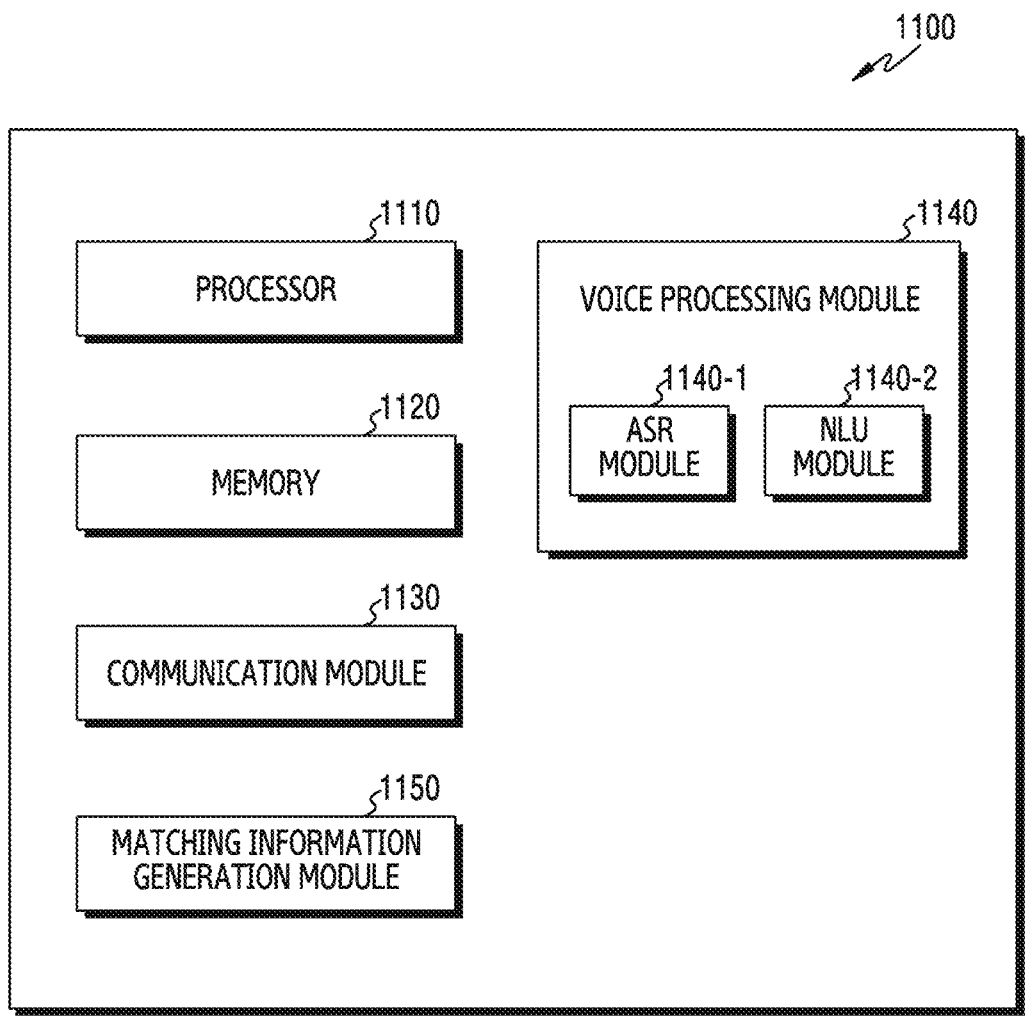
FIG. 7 illustrates a view of an example configuration of a first server (electronic device) according to various embodiments.
Figure 8:
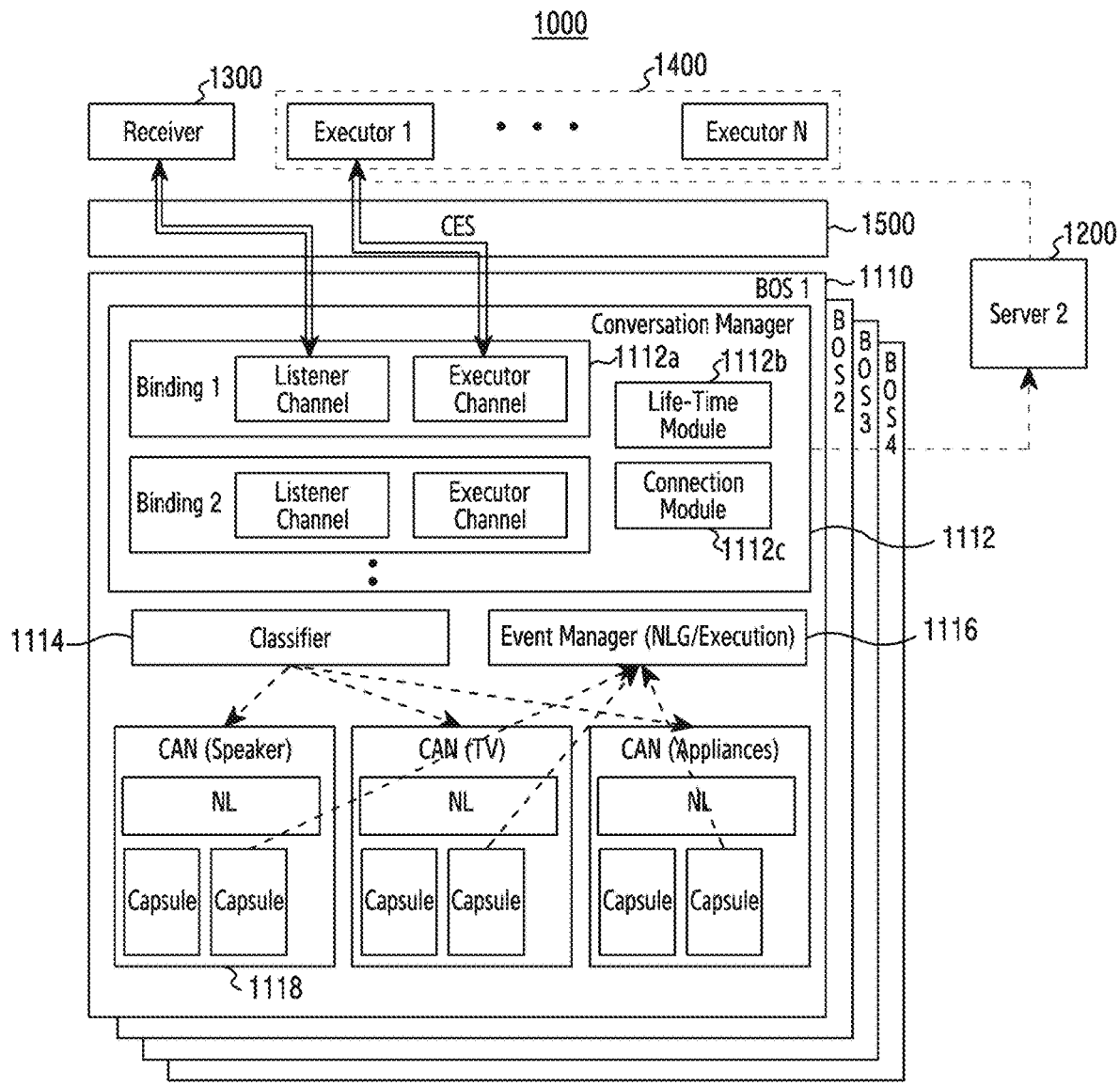
FIG. 8 illustrates a view of an example intelligent assistance system including a first server, and an operation of the first server according to an embodiment.

FIG. 7 illustrates a view of an example configuration of the first server 1100 (electronic device) according to various embodiments. FIG. 8 illustrates an example view to explain an intelligent assistance system including the first server and an operation of the first server according to an embodiment.

Referring to FIGS. 5, 7, and 8, at least some components of the first server 1100 may correspond to at least some components of the receiver 1300. For example, the first server 1100 may include a processor 1110, a memory 1120, a communication module 1130, and/or a voice processing module 1140, and additionally or selectively, may further include a matching information generation module 1150. Accordingly, components of the first server 1100 corresponding to components of the receiver 1300 will not be described in detail. The intelligent assistance system 1000 may include a plurality of first servers 1100 according to a capacity for processing an utterance of the user 1010.

According to various embodiments, the processor 1110 of the first server 1100 may control the voice processing module 1140 to process utterance data received from the receiver 1300. In addition, the processor 1110 may provide a result of processing the utterance data to the receiver 1300. For example, the result of processing may include at least one of an intent of the input of the user 1010, a domain for executing a task, or data (for example, a slot or a task parameter) necessary for understanding the intent of the user 1010.

According to various embodiments, the processor 1110 of the first server 1100 may control to provide intent masking information to the receiver 1300 as a result of processing. As described above, the intent masking information may be information in which an utterance processing object is designated for an intent. In addition, the intent masking information may be generated by the matching information generation module 1150 as will be described below.

According to various embodiments, the voice processing module 1140 of the first server 1100 may include a voice recognition module 1140-1 and an NLU module 1140-2, similarly to the voice processing module 1340 of the receiver 1300. According to an embodiment, the voice processing module 1140 of the first server 1100 may have a higher processing capability than the utterance data processing capability of the receiver 1300. For example, the result of processing the utterance (or utterance data) by the voice processing module 1140 of the first server 1100 may have higher accuracy than that of the result of processing the utterance by the voice processing module 1340 of the receiver 1300.

According to various embodiments, the matching information generation module 1150 of the first server 1100 may generate intent masking information based on the result of processing by the receiver 1300 (for example, the voice processing module 1340). The intent masking information may be associated with a matching rate between a first processing result of utterance data performed by the receiver 1300 (for example, the voice processing module 1340), and a second processing result of the utterance data performed by the first server 1100 (for example, the voice processing module 1140). According to an embodiment, the first server 1100 may receive the first processing result from the receiver 1300, and the matching information generation module 1150 may identify a matching rate on the first processing result by comparing the received first processing result and the second processing result performed by the first server 1100. In addition, the matching information generation module 1150 may generate intent masking information indicating one of the receiver 1300 or the first server 1100 as an object to process a received utterance, based on the identified matching rate.

The receiver 1300 and the first server 1100 may transmit and/or receive data through a capsule execution service (CES) 1500. In addition, the executor 1400 and the first server 1100 may transmit and/or receive data through the CES 1500. The CES 1500 may support management of a first channel connecting the receiver 1300 and the first server 1100, and management of a second channel connecting the executor 1400 and the first server 1100. The CES 1500 may indicate, to the receiver 1300, the first server 1100 to be connected from among a plurality of servers, and may indicate, to the executor 1400, the first server 1100 to be connected from among the plurality of servers. That is, the CES 1500 may inform the receiver 1300 and the executor 1400 of which server should be connected from among the plurality of servers.

According to various embodiments, the processor 1110 of the first server 1100 may include a conversation manager 1112, a classifier 1114, an event manager 1116, and/or a plurality of CANs 1118.

According to various embodiments, the conversation manager 1112 may generate, maintain and/or manage a plurality of connection bindings 1112a. The conversation manager 1112 may include a life-time module 1112b and/or a connection module 1112c. The conversation manager 1112 may generate, maintain, and/or manage the connection binding 1112a between the receiver 1300 and the executor 1400, such that communication can be established between the receiver 1300 and the executor 1400 after an utterance is acquired at the receiver 1300.

According to various embodiments, the life-time module 1112b may set a connection maintaining time (for example, 3 seconds, 5 seconds, 8 seconds, 15 seconds, 30 seconds, 1 minute, 3 minutes, 5 minutes, 10 minutes, 30 minutes, or 60 minutes) for determining whether to sustain or terminate the connection binding 1112a. The life-time module 1112b may count a time from a time that the first channel is generated, and may determine whether the connection maintaining time (for example, a receiver connection maintaining time) is exceeded after the first channel is generated. In addition, the life-time module 1112b may count a time from a time that the second channel is generated, and may determine whether the connection maintaining time (for example, an executor connection maintaining time) is exceeded after the second channel is generated. In addition, the life-time module 1112b may count a time from a time that an utterance is acquired at the receiver 1300, and may determine whether the connection maintaining time (for example, an additional information input waiting time) is exceeded after the utterance is acquired. In addition, the life-time module 1112b may count a time from a time that the utterance is performed at the executor 1400, and may determine whether the connection maintaining time (for example, a follow-up utterance waiting time) is exceed after the utterance is performed.

According to various embodiments, the connection module 1112c may maintain or terminate the connection binding between the receiver 1300 and the executor 1400, based on determination of the connection maintaining time by the life-time module 1112b.

Referring to table 1, a plurality of data types may be used when the receiver 1300 and the executor 1400 are connection-bound. The conversation manager 1112 may generate, maintain, and/or manage the connection binding between the receiver 1300 and the executor 1400 by using data types described in table 1.

TABLE 1

| Field Name | Description | Example |
| --- | --- | --- |
| conversationId | ID value regarding each conversation (various continuous utterances have the same conversationId value) | tr-20190221T152049.695Z-f9ad5475 |
| requestId | ID value regarding each utterance request | 1550730251231 |
| referenceRequestId | Value for referring to information on a previous utterance | 1550730257819 |
| Intent (Utterance) | Utterance data | "Turn on the TV" |
| installedCampanionApps | Information of Apps installed in a device sending a request | {"com.samsung.audio-player": 1001035, . . .} |
| Geo | Position information of a device sending a request | {"latitude": 37.466590881347656, "longitude": 127.02281951904297, "accuracy": 0.0} |
| accountId(userId) | User account information of Samsung Account | "pqrlauwoyq" |
| viewportId | Conversation list ID value used in the Bixby server | "e604f0a5e8e053f54202d99817f014656ce2ed16ac8abfd5086e8dab1999e451" |
| deviceId | Device ID value used in the IoT server | "3c28b364-c92a-8a7e-e893-d6c5607fcaa2" |
| svcId | Unique ID value of userId & deviceId join | "US1MOSPK135BFC73FDFC4700852EB79C2D6413C3" |
| "deviceModel | Model information of a device sending a request | "SM-V310" |
| canTypeId (deviceType) | Device type of a device sending a request | "speaker" |
| Language | Setting of a language of a device sending a request | "en-US" |

For example, "conversationId" may refer to an ID value regarding each conversation. Herein, various continuous utterances may have the same conversationId value. "requestId" may refer to an ID value regarding each utterance request. "referenceRequestId" may refer to a value for referring to information regarding a previous utterance, and may be configured with requestId of the previous utterance. "Intent (Utterance)" may refer to utterance data. "installedCampanionApps" may refer to information of Apps installed in a device (or the receiver 1300) sending a request. "Geo" may refer to position information of a device sending a request. "accountId (userId)" may refer to account user account information.

"viewportId" may refer to a conversation list ID value used at the first server 1100 (for example, the Bixby server). "deviceId" may refer to a device ID value used at the second server 1200 (for example, an IoT server). "svcId" may refer to a unique ID value of userId & deviceId join. "deviceModel" may refer to model information of a device sending a request. "canTypeId (deviceType)" may refer to a type of a device sending a request. "Language" may refer to setting of a language of a device sending a request.

Referring back to FIGS. 7 and 8, the conversation manager 1112 may form the first channel (for example, a listener channel) for communicating between the receiver 1300 and the first server 1100 to form the connection binding, based on a request of the receiver 1300. When the first channel is formed between the receiver 1300 and the first server 1100, the receiver 1300 may transmit utterance information and the first device information of the receiver 1300 to the first server 1100 by using the first channel. Herein, the receiver 1300 may transmit the first device information to the second server 1200. In this case, the receiver 1300 may transmit the first device information to the second server 1200 via the first server 1100. However, this should not be considered as limiting. The receiver 1300 may directly transmit the first device information to the second server 1200. For example, when an utterance is received from the receiver 1300, the conversation manager 1112 may determine whether the corresponding utterance can be processed at the receiver 1300 or can be processed at the executor 1400. When the utterance can be processed at the executor 1400, the first server 110 may transmit the first device information to the second server 1200.

In addition, the conversation manager 1112 may form the second channel (for example, an executor channel) for communicating between the executor 1400 and the first server 1100. The executor 1400 may generate second device information (for example, state information of the executor 1400, necessary response information, or identification information). When the second channel is formed between the executor 1400 and the first server 1100, the executor 1400 may transmit the second device information to the first server 1100 through the second channel.

After the first channel and the second channel are formed, the first server 1100 may connection-bind the receiver 1300 and the executor 1400, based on the first device information received from the receiver 1300 and the second device information received from the executor 1400. In this case, the first server 1100 may maintain and terminate the connection binding between the receiver 1300 and the executor 1400, based on a pre-set value.

In the above-described example, the first device information and the second device information may be transmitted and/or received through the first server 1100 and/or the second server 1200. However, this should not be considered as limiting, and the first device information and the second device information may be transmitted and/or received between the receiver 1300 and the executor 1400 in a D2D method.

The classifier 1114 may classify to determine which executor 1400 performs the utterance requested by the receiver 1300 from among the plurality of executors 1400. The classifier 1114 may cause utterance information to be transmitted to the executor 1400 to perform the utterance requested at the receiver 1300, that is, to a target executor. In addition, the classifier 1114 may cause a result of performing the utterance to be transmitted to the corresponding receiver 1300 after an operation corresponding to the utterance is performed at the executor 1400.

The event manager 1116 may cause the result of performing the utterance to be transmitted to the receiver 1300 and/or the executor 1400 after the operation corresponding to the utterance is performed. The event manager 1116 may determine through which channel the result of performing the utterance is transmitted to the receiver 1300 and/or the executor 1400. The event manager 1116 may determine whether to transmit the result of performing the utterance without processing, or whether to correct the result of performing the utterance according to a UI form of the receiver 1300 and/or the executor 1400, and to transmit the result. When the result of performing the utterance should be corrected, the event manager 1116 may correct contents of the utterance according to the UI form of the receiver 1300 and/or the executor 1400, and may transmit the corrected result of performing the utterance to the receiver 1300 and/or the executor 1400.

Figure 9:
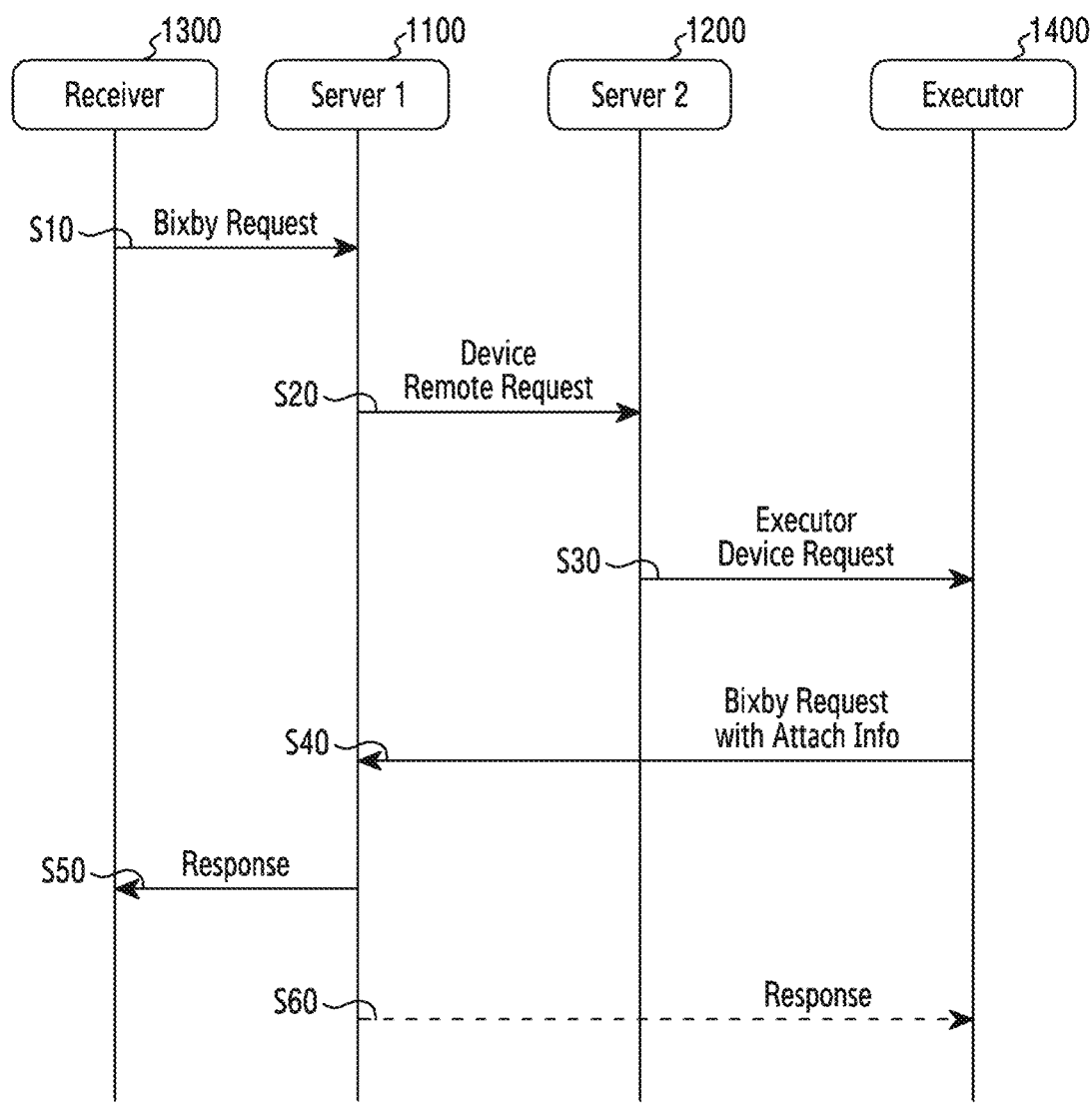
FIG. 9 illustrates a view of an example of the first server which connection-binds a receiver and an executor.

FIG. 9 illustrates a view of an example of connection-binding the receiver 1300 and the executor 1400 by the first server 1100. In the following embodiment, respective operations may be performed in sequence, but may not necessarily be performed in sequence. For example, the order of the respective operations may be changed or at least two operations may be performed in parallel.

Referring to FIG. 9, in operation S10, the receiver 1300 may transmit an operation request (for example, a Bixby request) corresponding to a received utterance to the first server 1100. In this case, when the operation request corresponding to the utterance is made, data types described in table 1 may be used. The first server 110 may analyze the operation request (for example, the Bixby request) corresponding to the received utterance.

In operation S20, the first server 1100 may recognize which executor 1400 should perform the operation corresponding to the utterance, by analyzing the operation request corresponding to the utterance. The first server 1100 may transmit a device remote request to the second server 1200 to cause the operation corresponding to the utterance to be performed at the target executor 1400. Herein, the second server 1200 may identify the target executor 1400 with reference to a userId value and a deviceId value The first server 1100 may include data for generating a connection binding between the receiver 1300 and the target executor 1400 in a payload, and may transmit the data to the second server 1200.

In operation S30, the second server 1200 may transmit an executor device request to the target executor 1400, based on the userId value and the deviceId value received from the first server 1100. In this case, the second server 1200 may transmit the data for generating the connection binding, included in the payload, to the executor 1400 from the first server 1100.

In operation S40, the executor 1400 may request the data for generating the connection binding, included in the received payload, from the first server 1100 (Bixby Request with Attach Info). In this case, requests for operations corresponding to different utterances may be made between the receiver 1300 and the plurality of first servers 1100. In response to the request corresponding to each utterance, data should be transmitted to the first server 1100. To achieve this, InstanceId may be used to request the same Instance of the first server 110 requested by the receiver 1300.

In operation S50, the first server 1100 may generate a connection binding with the receiver 1300 through conversationId, viewportId, requestId received from the executor 1400. That is, the first server 1100 may generate a connection binding with each of the executors 1400 according to each of the utterance requests made at the receiver 1300.

In operation S60, the first server 1100 may transmit a response to generation of the connection binding to the executor 1400, and may maintain the connection binding between the receiver 1300 and the executor 1400 for a predetermined time. The first server 1100 may terminate the connection binding between the receiver 1300 and the executor 1400 after the predetermined time is elapsed.

Figure 10:
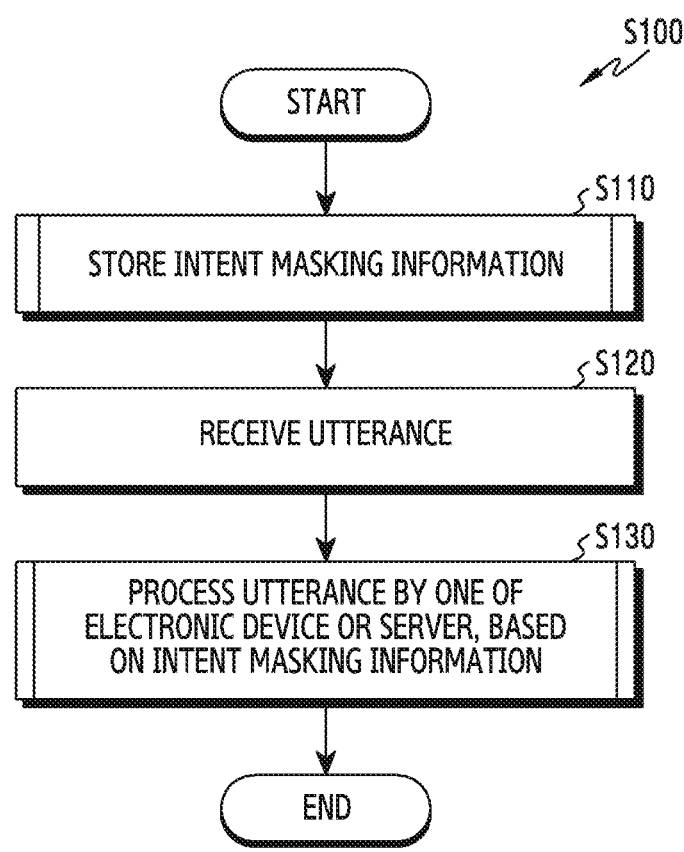
FIG. 10 illustrates an example flowchart for providing an intelligent assistance service at the receiver according to various embodiments.

FIG. 10 illustrates an example flowchart S100 for providing an intelligent assistance service at the receiver according to various embodiments.

Referring to FIGS. 8 and 10, according to various embodiments, in operation S110, the receiver 1300 (for example, the processor 1310 of FIG. 6) may store intent masking information. The intent masking information may be information in which an utterance processing object is designated for an intent. For example, the intent masking information may be information that is defined to cause an utterance related to at least one intent to be processed through the receiver 1300 or the first server 1100.

According to various embodiments, in operation S120, the receiver 1300 (for example, the processor 1310 of FIG. 6) may receive (or acquire) an utterance from the user 1010 through the input device (for example, a microphone). As described above, the utterance may include a wake-up utterance instructing to enable and/or invoke an intelligent assistance service, and/or a control utterance instructing an operation (for example, power control, volume control) of a hardware/software configuration included in the plurality of executors 1400. According to an embodiment, the utterance may be received when the receiver 1300 operates in a low power mode. The low power mode may refer to a mode in which a first processor (for example, an auxiliary processor) for receiving a wake-up utterance is enabled and a second processor (for example, a main processor) for controlling the intelligent assistance service is disabled. However, this is merely an example, and the disclosure is not limited thereto. For example, the utterance may be received when both the first processor and the second processor are enabled.

According to various embodiments, in operation S130, the receiver 1300 (for example, the processor 1310 of FIG. 6) may determine one of the receiver 1300 or the first server 1100 as an object to process the utterance, based on the intent masking information. According to an embodiment, the processor 1310 may identify an intent regarding the received utterance. In addition, the processor 1310 may determine whether the object to process the identified intent is the receiver 1300 or the first server 1100, based on the stored intent masking information. For example, the processor 1310 may process the received utterance by using the determined object to process. For example, the processor 1310 may provide a service based on a result of processing the utterance by the determined processing object.

Figure 11:
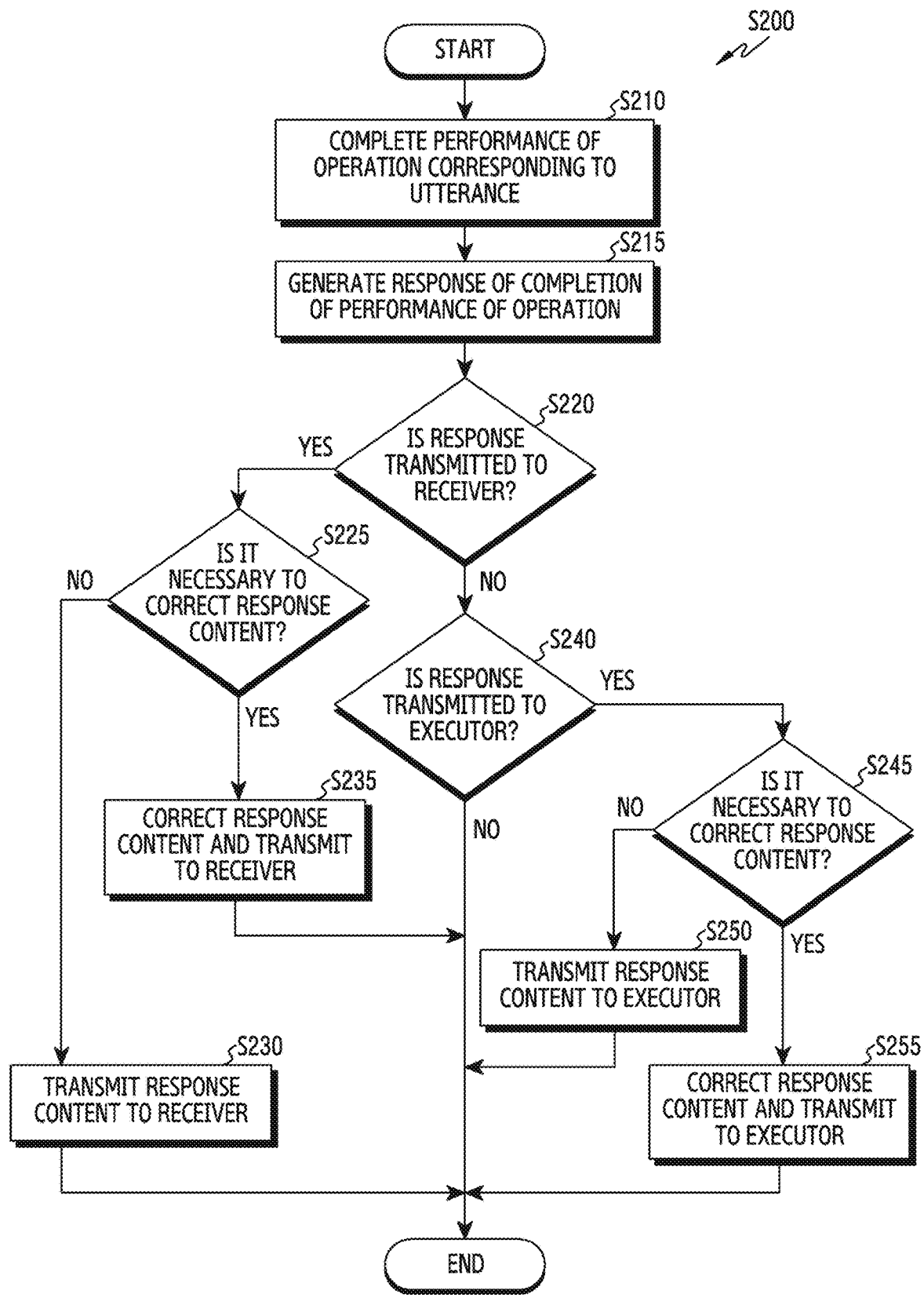
FIG. 11 illustrates an example flowchart illustrating an example of the first server distributing connection state information to the receiver and the executor.

FIG. 11 illustrates a flowchart S200 of an example of distributing connection state information to the receiver and the executor by the first server.

Referring to FIGS. 8 and 11, the event manager 1116 of the first server 1100 may cause a result of performing an utterance to be transmitted to the receiver 1300 and/or the executor 1400 after an operation corresponding to the utterance is performed. The event manager 1116 may determine through which channel the result of performing the utterance will be transmitted to the receiver 1300 and/or the executor 1400. The event manager 1116 may determine whether to transmit the result of performing the utterance without processing, or may determine whether to correct the result of performing the utterance according to a UI form of the receiver 1300 and/or the executor 1400, and to transmit the result. When the result of performing the utterance should be corrected, the event manager 1116 may correct the result of performing the utterance according to the UI form of the receiver 1300 and/or the executor 1400, and may transmit the corrected result of performing the utterance to the receiver 1300 and/or the executor 1400.

According to various embodiments, in operation S210, performance of the operation corresponding to the utterance may be completed at the executor 1400.

In operation S215, the event manager 1116 of the first server 1100 may generate a response of the completion of the operation performance. The event manager 1116 may transmit the response of the operation performance completion to the receiver 1300 and/or the executor 1400.

Herein, processing of the response performed at the first server 1100 may be appropriately distributed to the receiver 1300 and the executor 1400. The response may be provided in a UI form that can be expressed by each receiver 1300. In addition, the response may be provided in a UI form that can be expressed by each executor 1400. In addition, the first server 1100 may transmit the response to the receiver 1300 and/or the executor 1400 as it is without correcting contents of the response. In addition, the first server 110 may correct the contents of the response and may transmit the response to the receiver 1300 and/or the executor 1400.

In operation S220, the first server 1100 may determine whether the response should be transmitted to the receiver 1300.

When the response should be transmitted to the receiver 1300 as a result of determining in operation S220 ("Yes" in operation S220), the first server 1100 may determine whether it is necessary to correct contents of the response in operation S225.

When it is not necessary to correct the contents of the response as a result of determining in operation S225 ("No" in operation S225), the first server 1100 may transmit the response to the receiver 1300 as it is without correcting the contents of the response in operation S230.

When it is necessary to correct the contents of the response as a result of determining in operation S225 ("Yes" in operation S225), the first server 1100 may correct the contents of the response and may transmit the response to the receiver 1300.

Through operations S220 to S235, the first server 1100 may change the result of performing by the executor 1400 to an articulate phrase or graphic, and may provide the result to the user who uttered toward the receiver 1300. For example, when the result of performing the utterance is displayed on a screen of a display device (for example, the receiver 1300) in the form of a UI, there may be a difference in a screen size or a resolution according to the display device. Accordingly, the UI may be changed according to a screen size and a resolution of the display device, and may be displayed on the screen. For example, when a TV (the executor 1400) is controlled through a speaker (for example, the receiver 1300), a response regarding the result of performing by the TV may sound awkward when it is said by the speaker. In this case, contents of the response may be corrected like "The 000 command performed by the TV has been well carried out." and may be provided through the speaker (for example, the receiver 1300).

When the response is not to be transmitted to the receiver 1300 as a result of determining in operation S220 ("No" in operation S220), the first server 1100 may determine whether the response should be transmitted to the executor 1400 in operation S240.

When it is not necessary to transmit the response to the executor 1400 as a result of determining in operation S240 ("No" in operation S240), the first server 1100 may finish the operation.

When the response should be transmitted to the executor 1400 as a result of determining in operation S240 ("Yes" in operation S240), the first server 110 may determine whether it is necessary to correct the contents of the response in operation S245.

When it is not necessary to correct the contents of the response as a result of determining in operation S245 ("No" in operation S245), the first server 1100 may not correct the contents of the response and may transmit the response to the executor 1400 as it is in operation S250.

When it is necessary to correct the contents of the response as a result of determining in operation S245 ("Yes" in operation S245), the first server 1100 may correct the contents of the response and may transmit the response to the executor 1400 in operation S255.

According to various embodiments, when the response is generated in response to the result of performing the utterance, the event manager 1116 of the first server 1100 may process the response in different conditions with respect to the receiver 1300 and the executor 1400, respectively. For example, the receiver 1300 may transmit a request including an utterance to the first server 1100. In this case, the receiver 1300 may declare what response is needed to the first server 1100 (for example, when a user utters "Tell me the weather on the TV" to the speaker, there is no need to give weather screen information to the speaker). The receiver 1300 may include, in the request, information on a response type, a device type, necessary according to a state of the receiver 1300 to suit to a format of the request containing the user utterance, and may transmit the request to the first server 1100. When processing the response of the result of performing, the event manager 1116 may only select a necessary response according to the declared content, and may transmit the response to the receiver 1300.

According to various embodiments, when a connection binding is formed between the receiver 1300 and the executor 1400, the receiver 1300 may pre-determine what response is needed according to a device type (for example, according to presence/absence of a display, presence/absence of a speaker, or presence/absence of hardware), and may transmit the pre-determined response format to the first server 1100. The first server 1100 may transmit a pre-determined first response format to the executor 1400 from the receiver 1300. The first server 1100 may generate a response based on the first response format pre-determined at the receiver 1300, and may transmit the response to the receiver 1300.

According to various embodiments, when the connection binding is formed between the receiver 1300 and the executor 1400, the executor 1400 may pre-determine what response is needed according to a device type (according to presence/absence of a display, presence/absence of a speaker, presence/absence of hardware), and may transmit the pre-determined response format to the first server 1100. The first server 1100 may transmit a pre-determined second response format to the receiver 1300 from the executor 1400. The first server 1100 may generate a response based on the second response format pre-determined at the executor 1400, and may transmit the response to the executor 1400.

According to various embodiments, when the connection binding with the executor 1400 is formed, the executor 1400 may declare a necessary response within the second device information and/or context information (for example, a response type or a device type), and may transmit the response to the first server 1100.

When the executor 1400 declares the response and transmits the response to the first server 1100, the refrigerator may declare like "Tell the weather at the air conditioner". In this case, the refrigerator may explain through an NLG and a screen, and the air conditioner which is the executor may not show screen information. The information transmitted from the executor 1400 to the first server 1100 may include information on a response type or a type (for example, refer to the data type of FIG. 9) which is necessary according to a current state, and may be transmitted. When processing the response of the performed utterance, the event manager 1116 may select necessary responses declared at the executor 1400, and may transmit the selected responses to the executor 1400.

According to various embodiments, even when the receiver 1300 or the executor 1400 does not declare regarding the response, the event manager 1116 may correct the response according to a UI form of the receiver 1300 or the executor 1400, and may transmit the response. The event manager 1116 may already know the first device information of the receiver 1300 currently connection-bound, and the second device information of the executor 1400. In addition, the event manager 1116 may select a response of the result of performing the utterance according to a device type and a type (for example, presence/absence of a display, presence/absence of a microphone, or presence/absence of an additionally expressible function such as an LED) of the receiver 1300 and the executor 1400, based on the previously recognized first device information and second device information. The event manager 1116 may transmit the selected response of the result to the receiver 1300 or the executor 1400. For example, when an utterance saying "Tell me the weather today in Suwon on the TV (executor 1400)" is received at the speaker (receiver 1300), there may not be a need to transmit screen information of the weather to the speaker (receiver 1300) without a display device. In this case, the event manager 1116 may select a response regarding the result of performing the utterance according to a UI form of the speaker (receiver 1300), and may transmit the response to the speaker (receiver 1300).

According to various embodiments, there may be a need to correct contents of the response of the natural language generator (generation?) (NLG) in common with respect to the receiver 1300 and the executor 1400. For example, NLG or an additional operation (for example, an LED operation) occurring may be changed according to a device type and a type of the receiver 1300 and the executor 1400, and may be transmitted to the receiver 1300 and the executor 1400.

For example, an utterance saying, "Can you play the Infinite Challenge on the TV (executor 1400)?" may be received at the speaker (receiver 1300). In this case, when NLG of the result of performing the utterance by the TV (executor 1400) is "I played it", the event manager 1116 may correct the NLG to "I played the Infinite Challenge on the TV" and may transmit the corrected NLG to the speaker (receiver 1300). In addition, the event manager 1116 may not generate any NLG for the TV (executor 1400).

For example, when an utterance saying "Tell me how to save energy in the air conditioner (executor 1400)" may be received at the refrigerator (receiver 1300). In this case, the event manager 1116 may transmit NLG of the result of performing the utterance for the air conditioner (executor 1400) only to the refrigerator (receiver 1300), and may not cause the air conditioner (executor 1400) to perform a separate follow-up operation.

According to various embodiments, the first server 1100 may maintain and/or terminate the connection binding between the receiver 1300 and the executor 1400. For example, when the first channel with the receiver 1300 and the second channel with the executor 1400 are connection-bound, the first server 1100 may start counting the connection maintaining time of each of the first channel and the second channel. For example, while an utterance processing maintaining time of the receiver 1300 is being maintained, the first server 1100 may transmit a continuous and connective utterance received at the receiver 1300 to the executor 1400. In this case, the connection binding between the receiver 1300 and the executor 1400 may be maintained for a predetermined connection maintaining time.

For example, after the utterance processing maintaining time of the receiver 1300 is ended, the first server 1100 may let a new receiver 1300 join the existing connection. The first server 110 may request the same executor 1400 to perform the operation corresponding to the utterance while changing the receiver 1300. That is, the first server 1100 may cause the utterance to be processed while changing the receiver 1300, without changing the executor 1400. For example, the first server 1100 may cause the utterance to be processed while changing the executor 1400, without changing the receiver 1300.

Figure 12:
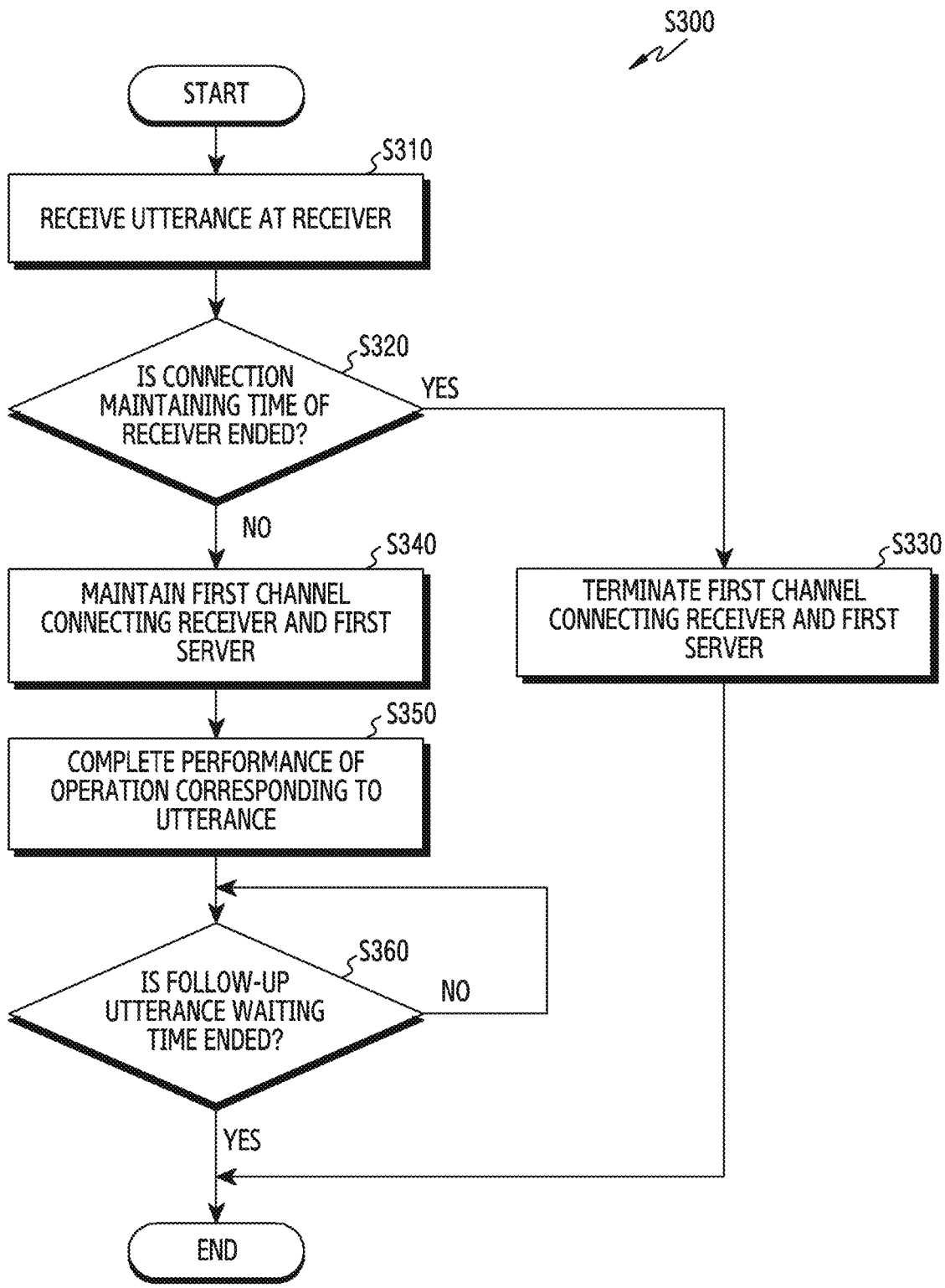
FIG. 12 illustrates an example flowchart illustrating an example of the receiver maintaining and terminating a connection binding.

FIG. 12 illustrates an example flowchart S300 of an example of maintaining and terminating the connection binding of the receiver. Table 2 shows examples of a connection maintaining time of the receiver 1300, a connection maintaining time of the executor 1400, an additional information input waiting time, and a follow-up utterance waiting time.

TABLE 2

| Types of connection maintaining time | Description |
| --- | --- |
| Connection maintaining time of the receiver (Conversation Life Time in Listener) | This time is counted when a user utterance is received, and is extinguished after a given time (for example, 8 seconds, 10 minutes) or when a user terminates. |
| Connection maintaining time of the executor (Conversation Life Time in Executor) | This time is counted when connection information is received from the receiver and a connection is established, and is the same as time counted from the time that a user utters to the device. |

TABLE 2-continued

| Types of connection maintaining time | Description |
| --- | --- |
| Additional information input waiting time (Prompt Waiting Time) | This time is a waiting time (for example, 8 seconds) until necessary information is received after the necessary information is requested from a user because additional information is required in processing an utterance. This time is extinguished when a user utters additional information, a time is elapsed, or the user terminates. |
| Follow-up utterance waiting time (Continuous utterance waiting time) | This time is a waiting time to process an additional continuous utterance after one utterance is processed. This time is refreshed when the additional utterance is received and processed, and is extinguished when a time is elapsed or the user terminates. |

Referring to FIGS. 8 and 12 and table 2, according to various embodiments, the receiver 1300 may receive an utterance in operation S310. When the utterance is received at the receiver 1300, the first channel may be generated between the first server 1100 and the receiver 1300.

In operation S320, the first server 1100 may count a time from a time that the receiver 1300 receives the utterance. The first server 1100 may determine whether the connection maintaining time with the receiver 1300 is ended.

As a result of determining in operation S320, the time may be elapsed after the time that the utterance is received at the receiver 1300, and the connection maintaining time may be ended. When the connection maintaining time of the receiver 1300 is ended ("Yes" in operation S320), the first channel connecting the receiver 1300 and the first server 110 may be terminated in operation S330. Herein, the first channel may be terminated by the first server 1100. However, this should not be considered as limiting, and the first channel may be terminated by the receiver 1300.

As a result of determining in operation S320, when the connection maintaining time is not ended ("No" in operation S320), the first channel connecting the receiver 1300 and the first server 110 may be maintained in operation S340.

In operation S350, performance of an operation corresponding to the utterance may be completed at the executor 1400. In this case, the first server 1100 may count a time from a time that the performance of the operation corresponding to the utterance is completed.

In operation S360, the first server 1100 may determine whether the follow-up utterance waiting time (continuous utterance waiting time) for a follow-up utterance is ended after the performance of the operation corresponding to the utterance is completed.

When the follow-up utterance waiting time is ended as a result of determining in operation S360 ("Yes" in operation S360), the first server 110 may terminate the first channel between the receiver 1300 and the first server 1100.

When the follow-up utterance waiting time for the follow-up utterance is not ended as a result of determining in operation S360 ("No" in operation S360), the first server 1100 may maintain the first channel within the follow-up utterance waiting time, and may wait for the follow-up utterance.

Figure 13:
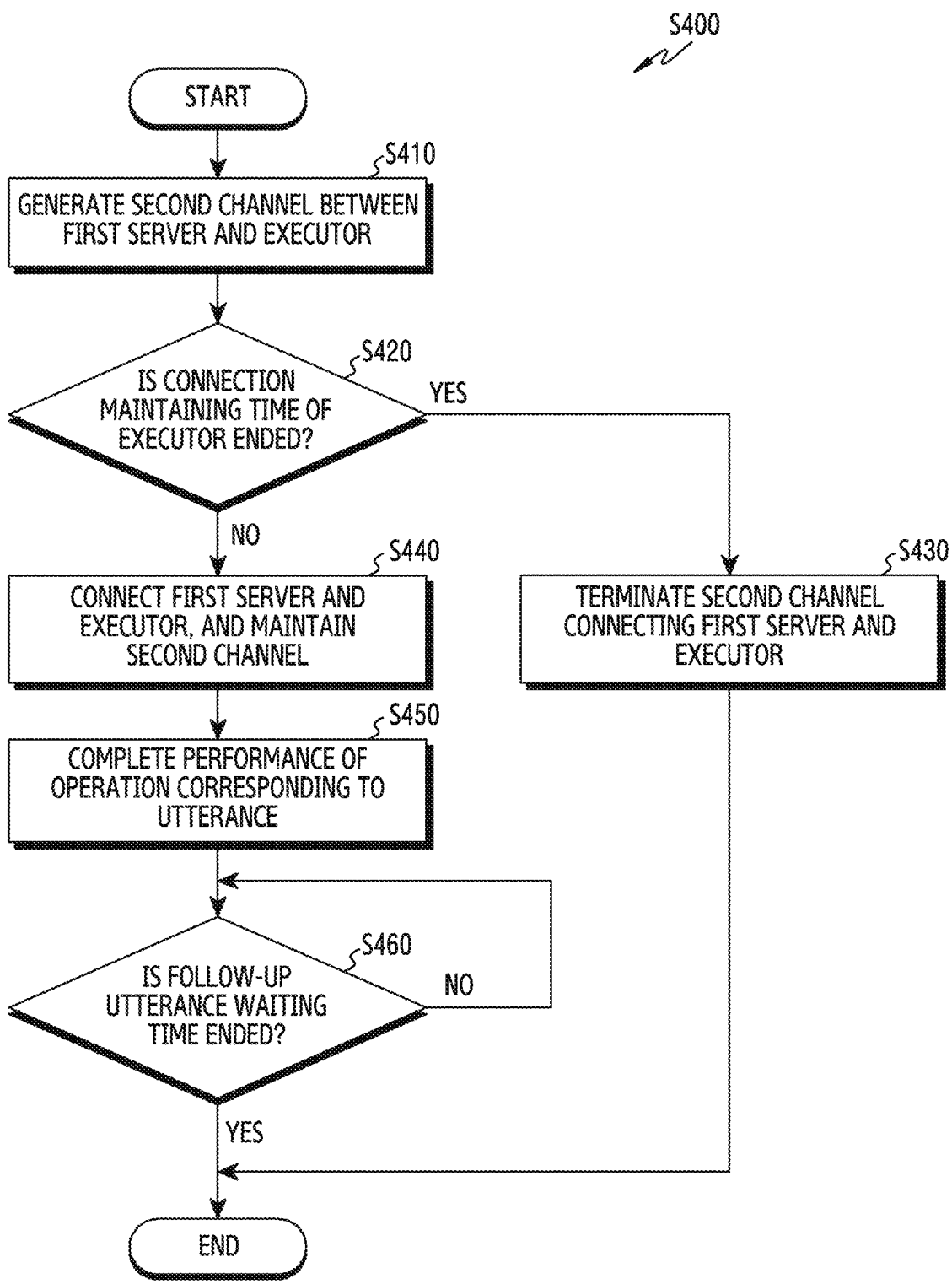
FIG. 13 illustrates an example flowchart illustrating an example of the executor maintaining and terminating a connection binding.

FIG. 13 illustrates a flowchart S400 illustrating of an example of maintaining and terminating the connection binding of the executor.

Referring to FIGS. 8 and 13 and table 2, according to various embodiments, in operation S410, an utterance processing request from the receiver 1300 may be received at the first server 1100 and the second channel may be generated between the first server 1100 and the executor 1400.

In operation S420, the first server 1100 may count a time from a time that the second channel is generated between the first server 1100 and the executor 1400. The first server 1100 may determine whether the connection maintaining time with the executor 1400 is ended from the time that the second channel is generated.

As a result of determining in operation S420, the time may be elapsed after the time that the second channel is generated, and the connection maintaining time may be ended. When the connection maintaining time of the second channel is ended ("Yes" in operation S420), the first server 1100 may terminate the second channel connecting the executor 1400 and the first server 1100 in operation S430.

When the connection maintaining time is not ended as a result of determining in operation S420 ("No" in operation S420), the first server 1100 may maintain the second channel connecting the executor 1400 and the first server 1100 in operation S440.

In operation S450, performance of an operation corresponding to an utterance may be completed at the executor 1400. In this case, the first server 1100 may count a time from a time that the performance of the operation corresponding to the utterance is completed.

In operation S460, the first server 1100 may determine whether the follow-up utterance waiting time for a follow-up utterance is ended after the time that the performance of the operation corresponding to the utterance is completed.

When the follow-up utterance waiting time for the follow-up utterance is ended as a result of determining in operation S460 ("Yes" in operation S460), the first server 1100 may terminate the second channel between the executor 1400 and the first server 1100. However, this should not be considered as limiting, and the second channel may be terminated by the executor 1400.

When the follow-up utterance waiting time for the follow-up utterance is not ended as a result of determining in operation S460 ("No" in operation S460), the first server 110 may maintain the second channel within the follow-up utterance waiting time and may wait for the follow-up utterance.

According to various embodiments, the first server 1100 may maintain the connection binding between the receiver 1300 and the executor 1400 for the additional information input waiting time (prompt waiting time).

Herein, the additional information input waiting time may be a waiting time (for example, 3 seconds, 5 seconds, 8 seconds, 15 seconds, 30 seconds, 1 minute, 3 minutes, 5 minutes, 10 minutes, 30 minutes, or 60 minutes) until necessary information is received from a user after the necessary information is requested from the user since additional information is required in processing an utterance.

For example, the first server 1100 may end the additional information input waiting time when the user utters additional information within the additional information input waiting time. For example, the first server 110 may terminate the connection binding between the receiver 1300 and the executor 1400 when a pre-set additional information input waiting time is exceeded.

Referring to FIG. 8 with table 2, connection maintaining times of the first channel and the second channel generated at the conversation manager 1112 may be different depending on a condition. For example, maintenance and termination of the first channel based on a first connection maintaining time between the receiver 1300 and the first server 1100 may be set variously. In addition, maintenance and termination of the second channel based on a second connection maintaining time between the executor 1400 and the first server 1100 may be set variously. For example, the receiver 1300 may be changed according to a movement of the user or an intensity of an utterance voice, and the same executor 1400 may be designated to process the utterance while the receiver 1300 is being changed. That is, when a first receiver is changed to a second receiver, a third channel may be generated between the first server 110 and the second receiver. The first server 1100 may transmit and receive device information of the second receiver and utterance information by using the third channel. The first server 110 may connection-bind the changed second receiver and the executor 1400. Even when the receiver 1300 is changed, the first server 1100 may additionally form a connection binding with the same executor 1400, and may cause an operation corresponding to the utterance to be performed. Herein, when the receiver 1300 is changed, the first server 1100 may terminate the first channel with the first receiver after the third channel is generated between the first server 1100 and the second receiver. However, this should not be considered as limiting, and the first server 1100 may maintain multi channels with the plurality of receivers 1300 with respect to the same executor 1400. The first server 1100 may maintain the first channel with the first receiver for a pre-set connection maintaining time even after the third channel is generated between the first server 1100 and the second receiver.

For example, the executor 1400 may be changed while the receiver 1300 is being maintained, and an utterance may be processed while the executor 1400 is being changed. That is, an utterance may be received through the same receiver 1300, and the executor 1400 performing an operation corresponding to the utterance may change from a first executor to a second executor. In this case, the third channel may be generated between the first server 1100 and the second executor. The first server 1100 may transmit and receive device information of the second executor and utterance information by using the third channel. The first server 1100 may connection-bind the changed second executor and the receiver 1300. The first server 1100 may additionally form a connection binding with the same receiver 1300 even when the executor 1400 is changed, and may cause the operation corresponding to the utterance to be performed. Herein, when the executor 1400 is changed, the first server 1100 may terminate the second channel with the first executor after the third channel is generated between the first server 1100 and the second executor. However, this should not be considered as limiting, and the first server 1100 may maintain multi channels with the plurality of executors 1400 with respect to the same receiver 1300. The first server 1100 may maintain the second channel with the first executor for a pre-set connection maintaining time even after the third channel is generated between the first server 1100 and the second executor.

For example, the receiver 1300 and the executor 1400 may be changed according to a movement of a user or an intensity of an utterance voice, and the utterance may be processed while the receiver 1300 and the executor 1400 are being changed. That is, when the receiver changes from the first receiver to the second receiver and the executor changes from the first executor to the second executor, the first server 1100 may generate the third channel between the first server 1100 and the second receiver, and may generate a fourth channel between the first server 1100 and the second executor. The first server 1100 may transmit and receive device information of the second receiver and the second executor and utterance information by using the third channel and the fourth channel. The first server 1100 may connection-bind the second receiver and the second executor. The first server 1100 may additionally form a connection binding even when the receiver 1300 and the executor 1400 are changed, and may cause an operation corresponding to the utterance to be performed. Herein, the first server 1100 may terminate the first channel with the first receiver after the third channel is generated between the first server 1100 and the second receiver. In addition, the first server 1100 may terminate the second channel with the first executor after the fourth channel is generated between the first server 1100 and the second executor. However, this should not be considered as limiting, and the first server 1100 may maintain multi channels with the plurality of receivers (for example, the first receiver and the second receiver) and the plurality of executors (for example, the first executor and the second executor). The first server 1100 may maintain the first channel with the first receiver for a pre-set connection maintaining time even after the third channel is generated between the first server 1100 and the second receiver. In addition, the first server 1100 may maintain the second channel with the first executor for a pre-set connection maintaining time even after the fourth channel is generated between the first server 1100 and the second executor.

According to various embodiments, in a state where the receiver 1300 and the executor 1400 are connection-bound to each other, the first server 1100 may process an utterance operation for waiting for an input requesting additional information. For example, an utterance saying "Change the channel on the TV (executor 1400)" may be received at the refrigerator (receiver 1300). In this case, in a state (prompt) where an additional input is requested like "What channel do you want to change to?", when an additional utterance like "Number 58" is received, the first server 1100 may transmit the additional utterance to the TV (executor 1400) from the refrigerator (receiver 1300), and may cause an operation corresponding to the additional utterance to be performed at the TV (executor 1400). For example, the first server 110 may continuously process an additional utterance in the connection binding state of the receiver 1300 and the executor 1400. An utterance saying "Change to channel 58 on the TV (executor 1400)" may be received at the speaker (receiver 1300). In this case, after the TV (executor 1400) normally changes to channel 58, a continuous utterance like "Change channel up" or "Change to channel 52" may be additionally received. After the TV (executor 1400) normally changes to channel 58, when the continuous utterance like "Change channel up" or "Change to channel 52" is additionally inputted, the first server 1100 may transmit the continuous utterance to the executor 1400. By doing so, the continuous utterance like "Change channel up" or "Change to channel 52" may be additionally processed.

According to various embodiments, in the connection binding state of the receiver 1300 and the executor 1400, the first server 1100 may perform an utterance operation for controlling the same executor 1400 while changing the receiver 1300.

For example, an utterance saying "Find the Infinite Challenge on the TV (executor 1400)" may be received at the speaker (receiver 1300) positioned in a living room. Concurrently, the user may move to a kitchen in the state in which a list of episodes of the Infinite Challenge is displayed on the TV (executor 1400). A continuous utterance saying "Play the second episode" may continue at the refrigerator (receiver 1300) positioned in the kitchen. In this case, the first server 1100 may transmit the continuous utterance to the TV (executor 1400) such that the second episode of the Infinite Challenge can be played on the TV (executor 1400). The continuous utterance may be processed within the follow-up utterance waiting time after the previous utterance is inputted. For example, when the follow-up utterance waiting time is exceeded, the utterance saying "Play the second episode on the TV (executor 1400)" may be received at the refrigerator (receiver 1300) positioned in the kitchen. In this case, when the connection maintaining time of the TV (executor 1400) is maintained, the follow-up utterance may be processed. On the other hand, when the connection maintaining time of the TV (executor 1400) is ended, the follow-up utterance may not be processed, and the follow-up utterance may be processed after a new connection is generated. For example, in the connection binding state of the receiver 1300 and the executor 1400, the first server 1100 may process an utterance while changing the executor 1400. In this case, an utterance saying " . . . on the TV (executor 1400)" may be received at the speaker (receiver 1300) and then an utterance saying " . . . on the refrigerator (executor 1400)" may be continuously received at the speaker (receiver 1300). Thereafter, an utterance " . . . on the TV (executor 1400)" may continuously occur at the speaker (receiver 1300). In this case, the first server 1100 may continuously transmit a request for an utterance to the TV (executor 1400). By doing so, the continuous utterance may be continuously performed at the TV (executor 1400).

According to various embodiments, the first server 110 may control the operation of the same executor 1400 in a state where the connection with the receiver 1300 is terminated. The first server 110 may cause an utterance operation to be performed. In addition, the first server 1100 may control the operation of the same receiver 1300 in a state where the connection with the executor 1400 is terminated.

Figure 14A:
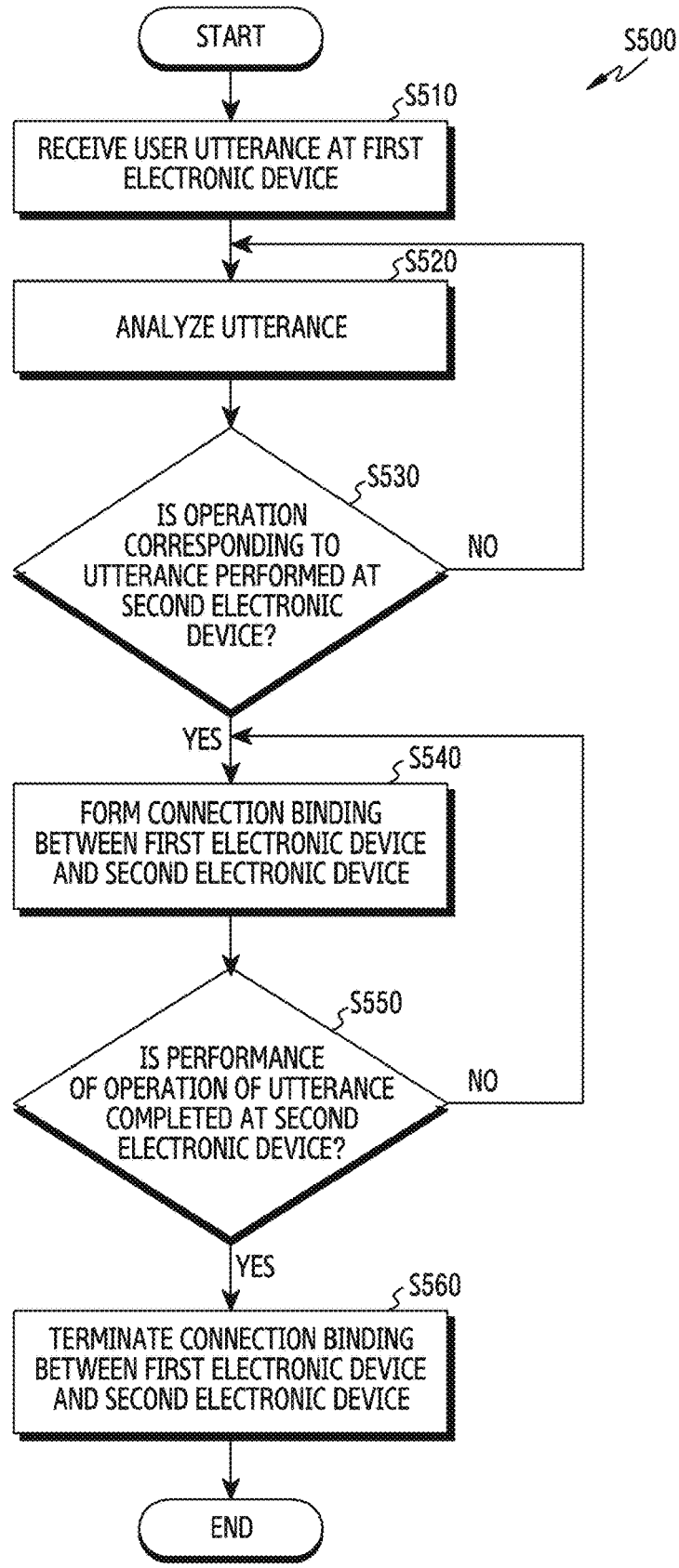
FIG. 14A illustrates an example flowchart for providing an intelligent assistance service at the first server according to various embodiments.

FIG. 14A illustrates an example flowchart S500 for providing an intelligent assistance service at the first server 1100 according to various embodiments.

Referring to FIGS. 5, 8, and 14A, in operation S510, a first electronic device (for example, the receiver 1300) may receive a user utterance. The first server 1100 may generate a first channel with the first electronic device (for example, the receiver 1300).

In operation S520, the first electronic device (for example, the receiver 1300) may transmit a request corresponding to the utterance to the first server 1100, and the first server 1100 may analyze the utterance.

In operation S530, the first server 1100 may determine which executor should perform an operation corresponding to the utterance from among a plurality of electronic devices. For example, the first server 1100 may determine whether the operation of the utterance should be performed at a second electronic device (for example, the executor 1400) from among the plurality of electronic devices.

When the operation of the utterance is performed at the second electronic device (for example, the executor 1400) ("Yes" in operation S530), the first server 1100 may generate a second channel with the second electronic device (for example, the executor 1400) in operation S540. The first server 1100 may form a connection binding with the first electronic device and the second electronic device by using first device information of the first electronic device (for example, the receiver 1300), which is received through the first channel, and second device information of the second electronic device (for example, the executor 1400), which is received through the second channel.

In operation S550, the first server 1100 may determine whether performance of the operation corresponding to the utterance is completed at the second electronic device (for example, the executor 1400).

When the performance of the operation corresponding to the utterance is completed at the second electronic device (for example, the executor 1400) ("Yes" in operation S550), the first server 1100 may terminate the connection binding with the first electronic device (for example, the receiver 1300) and the second electronic device (for example, the executor 1400) in operation S560.

Figure 14B:
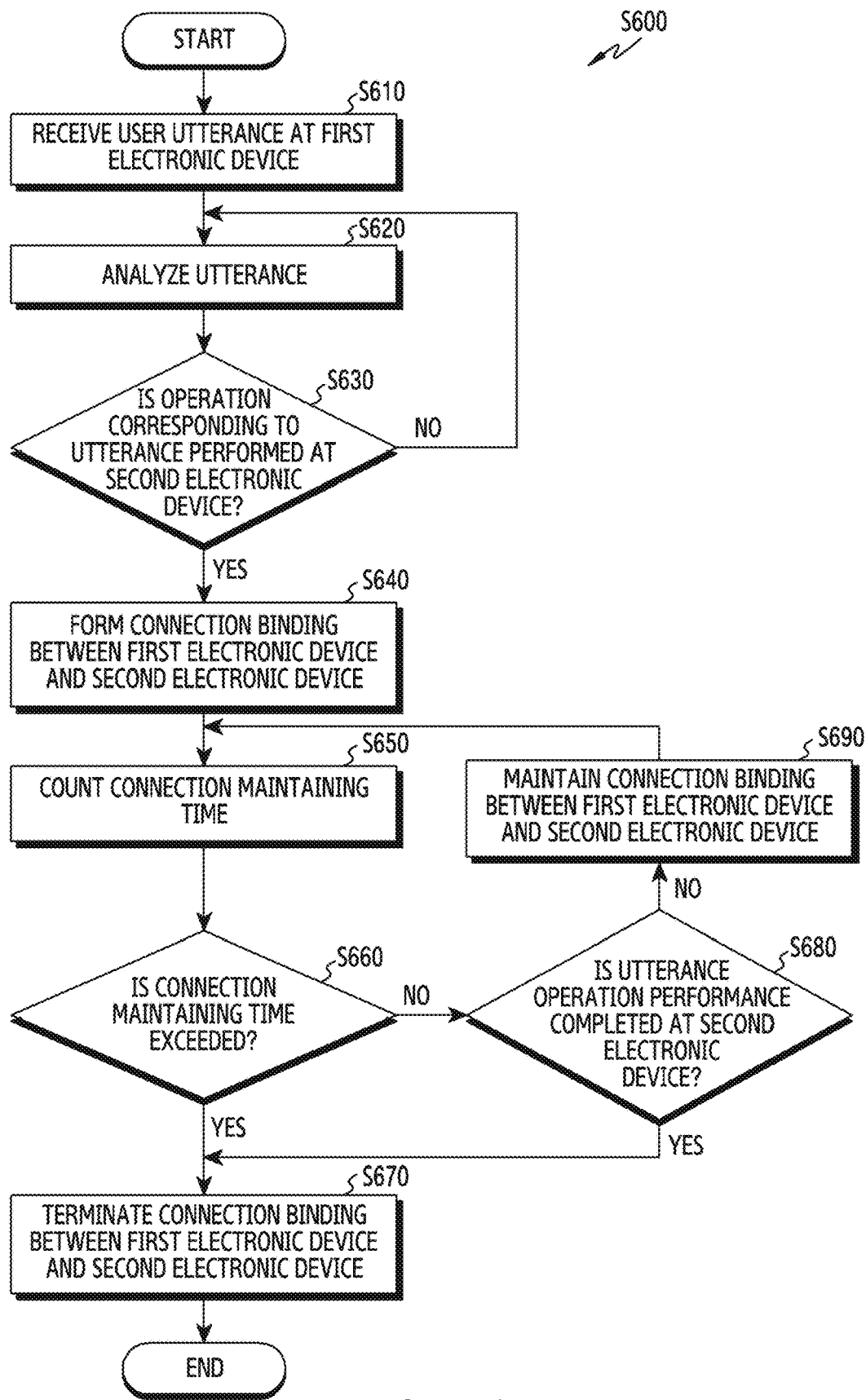
FIG. 14B illustrates an example flowchart for providing an intelligent assistance service at the first server according to various embodiments.

FIG. 14B illustrates an example flowchart S600 for providing an intelligent assistance service at the first server 1100 according to various embodiments.

Referring to FIGS. 5, 8, and 14B, in operation S610, the first electronic device (for example, the receiver 1300) may receive a user utterance. The first server 1100 may generate the first channel with the first electronic device.

In operation 620, the first electronic device may transmit a request corresponding to the utterance to the first server 1100, and the first server 1100 may analyze the utterance.

In operation 630, the first server 1100 may determine which executor should perform an operation corresponding to the utterance from among the plurality of electronic devices. For example, the first server 1100 may determine whether the operation corresponding to the utterance should be performed at the second electronic device (for example, the executor 1400) from among the plurality of electronic devices.

When the operation corresponding to the utterance is performed at the second electronic device (for example, the executor 1400) as a result of determining in operation S630 ("Yes" in operation S630), the first server 1100 may generate the second channel with the second electronic device (for example, the executor 1400) in operation S640. The first server 1100 may form a connection binding with the first electronic device and the second electronic device by using the first device information of the first electronic device (for example, the receiver 1300), which is received through the first channel, and the second device information of the second electronic device (for example, the executor 1400), which is received through the second channel.

In operation 650, the first server 1100 may count a connection maintaining time with the first electronic device (for example, the receiver 1300) and the second electronic device (for example, the executor 1400), from the time that the connection binding is formed based on information received from the second electronic device (for example, the executor 1400).

In operation 660, the first server 1100 may determine whether the connection maintaining time with the first electronic device (for example, the receiver 1300) and the second electronic device (for example, the executor 1400) is exceeded. Herein, the first server 1100 may count a first connection maintaining time with respect to the connection with the first electronic device (for example, the receiver 1300), and may determine whether the first connection maintaining time is exceeded. In addition, the first server 1100 may count a second connection maintaining time with respect to the connection with the second electronic device (for example, the executor 1400), and may determine whether the second connection maintaining time is exceeded.

When the connection maintaining time with the first electronic device (for example, the receiver 1300) and the second electronic device (for example, the executor 1400) is exceeded as a result of determining in operation S660 ("Yes" in operation S660), the first server 1100 may terminate the connection with the first electronic device (for example, the receiver 1300) and the second electronic device (for example, the executor 1400) in operation S670.

When the connection maintaining time with the first electronic device (for example, the receiver 1300) and the second electronic device (for example, the executor 1400) is not exceeded as a result of determining in operation S660 ("No" in operation S660), the first server 1100 may maintain the connection binding with the first electronic device (for example, the receiver 1300) and the second electronic device (for example, the executor 1400). Thereafter, the first server 1100 may determine whether performance of the operation corresponding to the utterance is completed at the second electronic device (for example, the executor 1400) in operation S680.

When the performance of the operation corresponding to the utterance is completed at the second electronic device (for example, the executor 1400) as a result of determining in operation S680 ("Yes" in operation S680), the first server 1100 may terminate the connection binding with the first electronic device (for example, the receiver 1300) and the second electronic device (for example, the executor 1400).

When the performance of the operation corresponding to the utterance is not completed at the second electronic device (for example, the executor 1400) as a result of determining in operation S680 ("No" in operation S680), the first server 1100 may maintain the connection binding with the first electronic device (for example, the receiver 1300) and the second electronic device (for example, the executor 1400) in operation S690.

Figure 15:
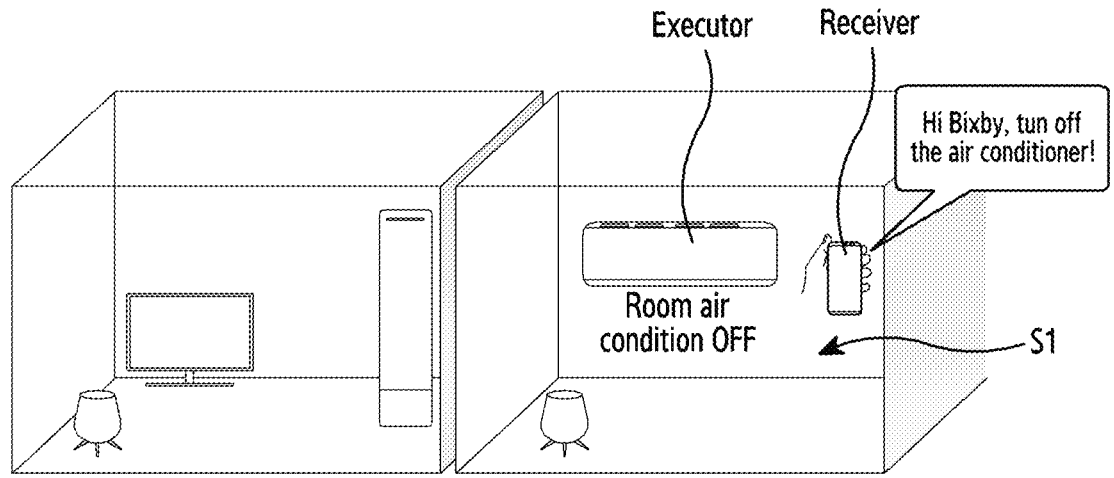
FIG. 15 illustrates a view of an example of processing an utterance that does not clearly say a space where an executor is positioned.
Figure 15:
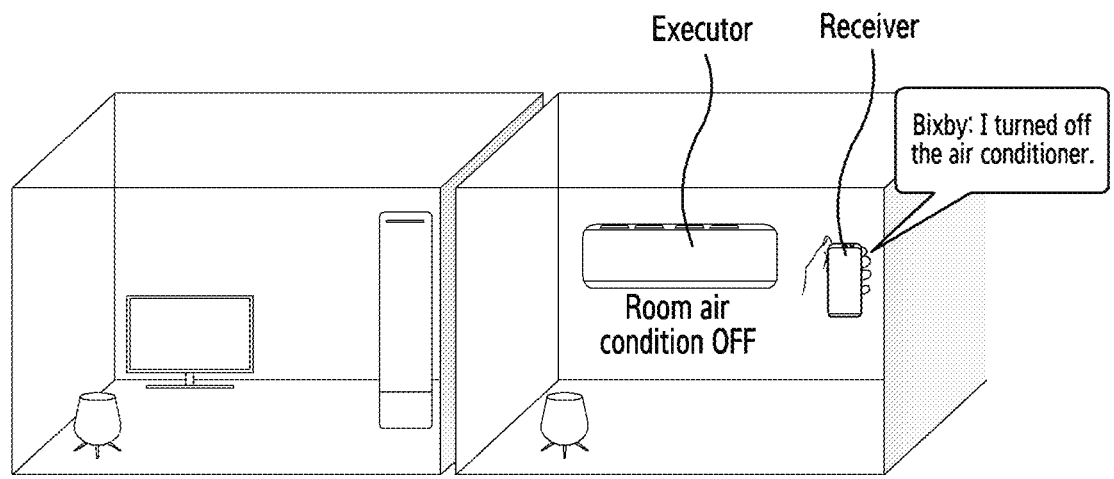

FIG. 15 illustrates an example view of an example of processing an utterance that does not clearly say a space where an executor is positioned.

Referring to FIGS. 8 and 15, when the receiver 1300 and the executor 1400 are positioned in the same first space 51, the first server 1100 may process an utterance that does not clearly say the position space of the receiver 1300 and the executor 1400, such that an operation corresponding to the utterance is performed. Since the first server 1100 already recognizes where the receiver 1300 and the executor 1400 are positioned, the first server 1100 may process the utterance even when a user does not clearly say the position space Si of the receiver 1300 and the executor 1400. For example, when the user utters "Hi Bixby, turn off the air conditioner" to the receiver 1300 positioned in the same space Si to control the executor 1400, the first server 1100 may generate a first channel with the receiver 1300 based on the utterance acquired at the receiver 1300. In addition, the first server 1100 may generate a second channel with the executor 1400. The first server 1100 may connection-bind the receiver 1300 and the executor 1400 through the first channel and the second channel. The first server 1100 may determine the executor 1400 by using the utterance acquired at the receiver 1300. The first server 1100 may transmit deep link information or information on the utterance to the executor 1400, such that an operation corresponding to the utterance can be performed at the executor 1400 (for example, the air conditioner is turned off).

When performance of the operation corresponding to the utterance (for example, the air conditioner is turned off) is completed at the executor 1400, the executor 1400 may transmit information regarding the completion of the performance of the operation corresponding to the utterance to the first server 1100. The first server 110 may transmit the information regarding the completion of the performance of the operation corresponding to the utterance to the receiver 1300. The receiver 1300 may provide a message saying "I turned off the air conditioner" in response to the completion of the performance of the operation corresponding to the utterance saying "Hi, Bixby, turn off the air conditioner".

Figure 16:
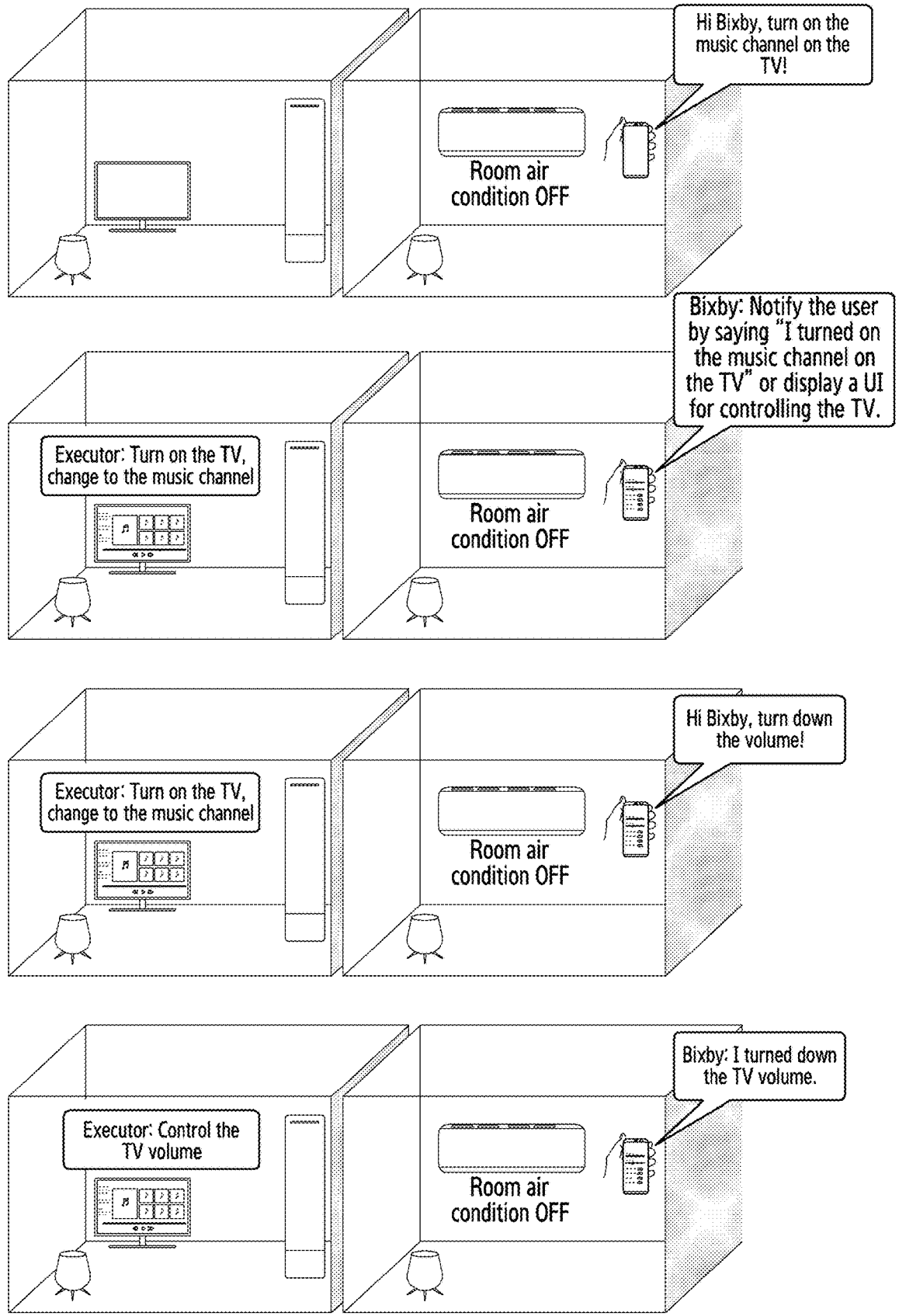
FIG. 16 illustrates a view of an example of processing an utterance that does not clearly say a space where an executor is positioned.

FIG. 16 illustrates a view of an example of processing an utterance that does not clearly say a space where an executor is positioned.

Referring to FIGS. 8 and 16, when the receiver 1300 and the executor 1400 are positioned in different spaces, the first server 1100 may process an utterance that does not clearly say position spaces of the receiver 1300 (for example, a mobile phone) and the executor 1400 (for example, a TV), such that an operation corresponding to the utterance is performed. Since the first server 1100 already recognizes where the receiver 1300 and the executor 1400 are positioned, the first server 1100 may process the utterance even when the user does not clearly say the position spaces of the receiver 1300 and the executor 1400. For example, the user may utter "Hi Bixby, play the music channel on the TV" to the receiver 1300 positioned in a first space (for example, a room), in order to control the TV (executor 1400) positioned in a second space (for example, a living room). In this case, the first server 1100 may generate a first channel with the receiver 1300 based on the utterance acquired at the receiver 1300. In addition, the first server 1100 may generate a second channel with the executor 1400. Herein, the first server 1100 may determine the executor 1400 by using the utterance acquired at the receiver 1300, and may generate the second channel with the executor 1400. The first server 1100 may form a connection binding between the receiver 1300 (for example, the mobile phone) and the executor 1400 (for example, the TV) by using the first channel and the second channel. The first server 1100 may transmit an operation (action) regarding the utterance or deep link information to the executor 1400 based on context information received from the executor 1400 (for example, the TV). By doing so, the first server 1100 may cause the operation (for example, turning on the TV and changing to the music channel) corresponding to the utterance to be performed at the executor 1400 (for example, the TV).

When performance of the operation corresponding to the utterance is completed at the executor 1400 (for example, the TV), the executor 1400 (for example, the TV) may transmit information indicating that the performance of the operation corresponding to the utterance is completed to the first server 1100. The first server 1100 may transmit the information indicating that the performance of the operation corresponding to the utterance is completed to the receiver 1300 (for example, the mobile phone). The receiver 1300 (for example, the mobile phone) may display a message saying "I turned on the music channel on the TV" in response to the performance of the operation corresponding to the utterance "Hi Bixby, play the music channel on the TV" being completed.

For example, the first server 1100 may maintain the connection binding between the receiver 1300 and the executor 1400 within an additional input waiting time after the operation corresponding to the first utterance of the user is performed. In this case, information regarding the existence of the executor 1400 connected may be provided through a UI (for example, a display, a speaker, or illumination) while the additional input waiting time is maintained.

For example, in a state where the first channel and the second channel are connected, a user's follow-up utterance may be received at the receiver 1300 (for example, the mobile phone). For example, a follow-up utterance saying "Hi Bixby, turn down the volume" may be received at the receiver 1300 (for example, the mobile phone). The first server 1100 may transmit the follow-up utterance acquired at the receiver 1300 (for example, the mobile phone) positioned in the first space to the executor 1400 (for example, the TV) positioned in the second space, such that an operation (for example, turning down the TV volume) corresponding to the follow-up utterance can be performed at the executor 1400 (for example, the TV). When performance of the operation corresponding to the follow-up utterance is completed at the executor 1400 (for example, the TV), the executor 1400 (for example, the TV) may transmit information indicating that the performance of the operation corresponding to the follow-up utterance is completed to the first server 1100. The first server 1100 may transmit the information indicating that the performance of the operation corresponding to the follow-up utterance is completed to the receiver 1300 (for example, the mobile phone). The receiver 1300 (for example, the mobile phone) may display a message saying "I turned down the TV volume" in response to the performance of the operation corresponding to the utterance "Hi Bixby, turn down the volume" being completed. Herein, when the message saying "I turned down the TV volume" cannot be displayed through a sound, the message may be displayed by text through a display screen or a flashing lamp.

For example, a follow-up utterance that does not indicate the executor 1400 may be received at the receiver 1300 (for example, the mobile phone). Herein, the first server 1100 may receive state information of the receiver 1300 (for example, the mobile phone) through the first channel connected with the receiver 1300 (for example, the mobile phone). The first server 1100 may receive state information of the executor 1400 (for example, the TV) through the second channel with the executor 1400 (for example, the TV). The first server 1100 may recognize that the executor 1400 for the follow-up utterance is the TV, based on the state information of the receiver 1300 (for example, the mobile phone) and the executor 1400 (for example, the TV). The first server 1100 may transmit an operation (action) corresponding to the utterance or deep link information to the executor 1400 (for example, the TV), such that the operation corresponding to the utterance can be performed at the executor 1400 (for example, the TV).

Figure 17:
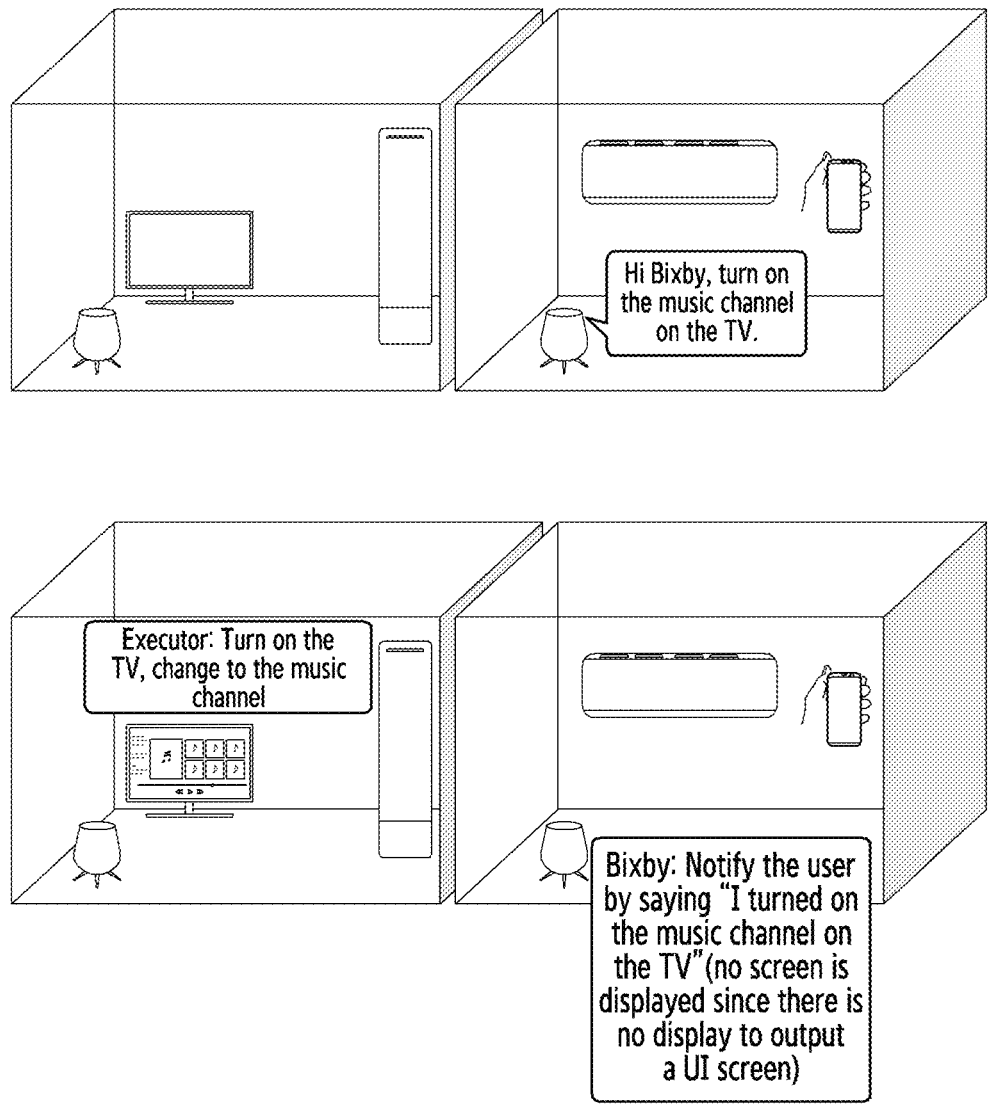
FIG. 17 illustrates a view of an example of providing a response to an utterance at a receiver without a display.

FIG. 17 illustrates a view of an example of providing a response to an utterance at a receiver without a display.

Referring to FIGS. 8 and 17, in the case where the receiver 1300 (for example, a speaker) and the executor 1400 (for example, a TV) are positioned in different spaces, the first server 1100 may process an utterance to cause an operation corresponding to the utterance to be performed when position spaces of the receiver 1300 (for example, the speaker) and the executor 1400 (for example, the TV) are specified. For example, the user may utter "Hi Bixby, turn on the music channel on the TV" to the receiver 1300 (for example, the speaker) positioned in a first space in order to control the TV (for example, the executor 1400) positioned in a second space. In this case, the first server 1100 may generate a first channel with the receiver 1300 (for example, the speaker). The receiver 1300 (for example, the speaker) may transmit utterance information to the first server 1100 through the first channel. In addition, the first server 1100 may analyze the utterance and may determine the executor 1400 to perform the operation corresponding to the utterance, and may generate a second channel with the executor 1400 (for example, the TV). The executor 1400 (for example, the TV) may transmit current context information to the first server 1100 by using the second channel. The first server 1100 may form a connection binding between the receiver 1300 (for example, the speaker) and the executor 1400 (for example, the TV) through the first channel and the second channel. The first server 1100 may determine the operation (action) to be performed at the executor 1400 (for example, the TV) or deep link by using the utterance information received at the receiver 1300 (for example, the speaker) through the first channel. The first server 1100 may transmit the operation (action) to be performed or the deep link to the executor 1400 (for example, the TV) through the second channel, such the operation (action) (for example, tuning on the TV and changing to the music channel) corresponding to the utterance can be performed.

When performance of the operation corresponding to the utterance is completed at the executor 1400 (for example, the TV), the executor 1400 (for example, the TV) may transmit information indicating that the performance of the operation corresponding to the utterance is completed to the first server 1100. The first server 1100 may transmit the information indicating that the performance of the operation corresponding to the utterance is completed to the receiver 1300 (for example, the speaker). The receiver 1300 (for example, the speaker) may provide a response saying "I turned on the music channel on the TV" in response to the performance of the operation corresponding to the utterance "Hi Bixby, turn on the music channel on the TV" being completed.

According to an embodiment, when the receiver 1300 (for example, the speaker) includes a display to display a UI screen, the message "I turned on the music channel on the TV" may be displayed on the UI screen. According to an embodiment, when the receiver 1300 (for example, the speaker) does not include a display to display a UI screen, a screen may not be displayed, and the message "I turned on the music channel on the TV" may be provided as a sound.

Figure 18:
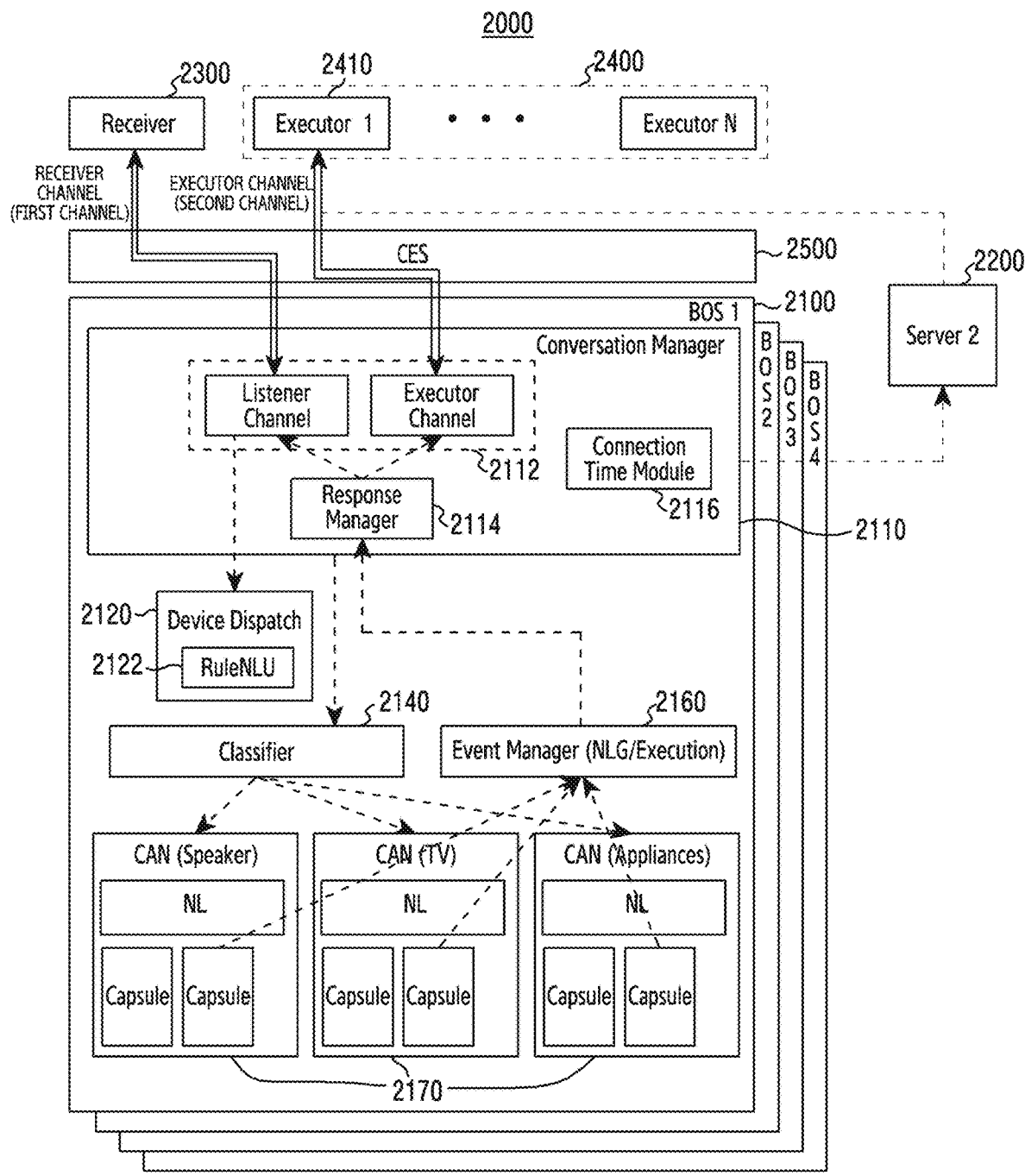
FIG. 18 illustrates a view of an intelligent assistance system including a first server, a receiver, an executor, and an operation of the first server according to an embodiment.

FIG. 18 illustrates an example view of an intelligent assistance system 2000 including a first server 2100, and operations of a receiver 2300, a plurality of executors 2400, and the first server 2100 according to an embodiment.

Referring to FIG. 18, the intelligent assistance system 2000 may include the first server 2100 (for example, the server 108 of FIG. 1, the intelligent server 200 of FIG. 2 or the first server 1100 of FIG. 7), a second server 2200 (for example, the server 108 of FIG. 1 or the second server 1200 of FIG. 8), the receiver 2300 (for example, the receiver 1300 of FIG. 8), and the plurality of executors 2400 (for example, the plurality of executors 1400 of FIG. 8). Although FIG. 18 illustrates that one receiver 2300 is provided, a plurality of receivers 2300 may be disposed in a predetermined space.

The first server 2100 and the receiver 2300 may be connected with each other by using a wired or wireless network. The first server 2100 and the second server 2200 may be connected with each other by using a wired or wireless network. The first server 2100 and the plurality of executors 2400 may be connected with each other by using a wired or wireless network. The receiver 2300 and the plurality of executors 2400 may be connected with each other through the first server 2100.

In an embodiment, a first channel (for example, a receiver channel) may be generated to transmit and receive data between the receiver 2300 and the first server 2100. For example, generation of the first channel may be initiated by the receiver 2300. For example, generation of the first channel may be initiated by the first server 2100. For example, the receiver 2300 may request the first server 2100 to generate the first channel, based on response information received from the first server 2100. The first server 2100 may generate the first channel for communicating with the receiver 2300. Herein, the response information may be managed by a response manager 2114 of the first server 2100.

In an embodiment, a second channel (for example, an executor channel) may be generated to transmit and receive data between at least one executor (for example, the first executor 2410) (target executor) of the plurality of executors 2400, and the first server 2100. For example, generation of the second channel may be initiated by the first server 2100. For example, the first executor 2410 may request the first server 2100 to generate the second channel, based on response information received from the first server 2100. The first server 2100 may generate the second channel for communicating with the first executor 2410. Herein, the response information may be managed by the response manager 2114 of the first server 2100.

However, this should not be considered as limiting. The receiver 2300 and the plurality of executors 2400 may be connected with each other in a D2D method without passing through the first server 2100 and/or the second server 2200.

According to various embodiments, the receiver 2300 may perform a function of a listener of receiving a user voice. The receiver 2300 may include various devices (for example, an AI speaker) including a configuration related to voice recognition and a voice input device (for example, a microphone). For example, the receiver 2300 may include the electronic device 101 of FIG. 1 or the user terminal 400 of FIG. 2. The receiver 2300 may acquire an utterance from a user (for example, the user 1010 of FIG. 5) through a voice input device. The utterance may include a wake-up utterance instructing to enable and/or invoke an intelligent assistance service, and/or a control utterance instructing an operation (for example, power control or volume control) of a hardware and/or software configuration included in the plurality of executors 2400. In an embodiment, the wake-up utterance and the control utterance may be acquired, respectively. In an embodiment, the control utterance may be acquired along with the wake-up utterance.

According to various embodiments, the receiver 2300 may generate a control message (or a control instruction), based on at least a portion of the acquired utterance (or utterance data). The receiver 2300 may transmit the generated control message to the first executor 2410 (for example, the target executor) which will perform the operation corresponding to the utterance from among the plurality of executors 2400 by using the first server 2100. The control message may be generated based on a result of processing utterance data. The first executor 2410 to perform the operation corresponding to the utterance from among the plurality of executors 2400 may be referred to as a target executor.

In an embodiment, processing of the utterance data may be performed through natural language processing by the receiver 2300 and/or natural language processing by the first server 2100. For example, the receiver 2300 may process the utterance data by itself by using a voice processing module (for example, the voice processing module 1340 of FIG. 6). In addition, the receiver 2300 may transmit the utterance data to the first server 2100 and may request a result of processing the utterance data. For example, the receiver 2300 may include an utterance data processing capability of a first level, for example, a voice recognition module (for example, the voice recognition module 1340-1 of FIG. 6), and an NLU module (for example, the NLU module 1340-2 of FIG. 6) of the first level. In addition, the first server 2100 may include an utterance data processing capability of a second level which is higher than the first level, for example, a voice recognition module (for example, the voice recognition module 1140-1 of FIG. 7) and an NLU module (for example, the NLU module 1140-2 of FIG. 7) of the second level. In addition, the receiver 2300 may provide a result of performing the operation corresponding to the user utterance. The receiver 2300 may include a sound output device (for example, a speaker), a display, and/or one or more lamps so as to provide the result of performing the operation corresponding to the utterance.

According to various embodiments, the plurality of executors 2400 may include a smartphone (for example, the smartphone 1410 of FIG. 5), a computer (for example, the computer 1420 of FIG. 5, a personal computer, or a notebook computer), a television (for example, the television 1430 of FIG. 5), a refrigerator (for example, the refrigerator 1440 of FIG. 5), and/or an illumination device (for example, the illumination device 1450 of FIG. 5). In addition, the executors 2400 according to various embodiments may further include an air conditioner, a thermostat, an alarm device, a gas valve control device, or a door lock device.

According to an embodiment, each of the plurality of executors 2400 may include a communication circuit to establish communication (for example, the second channel) with the first server 2100 by using a designated protocol (for example, Bluetooth, WiFi, or Zigbee), and to transmit and/or receive a variety of information. According to an embodiment, the plurality of executors 2400 may transmit information regarding their own operation states (for example, on/off information of a device) to the receiver 2300 or the first server 2100. In addition, the plurality of executors 2400 may receive a control message (for example, an on/off control command of a device, or other operation control commands of a device) from the receiver 2300 or the first server 2100, and may perform an operation corresponding to the control message. In addition, the plurality of executors 2400 may transmit a result of performing the operation corresponding to the control message to the receiver 2300 or the first server 2100.

In an embodiment, at least some components of the first server 2100 may correspond to at least some components of the receiver 2300 (for example, the receiver 1300 of FIG. 6). For example, the first server 2100 may include a processor (for example, the processor 1110 of FIG. 7), a memory (for example, the memory 1120 of FIG. 7), a communication module (for example, the communication module 1130 of FIG. 7), a voice processing module (for example, the voice processing module 1140 of FIG. 7), and/or a matching information generation module (for example, the matching information generation module 1150 of FIG. 7). Herein, the matching information generation module may be selectively included in the first server 2100.

According to various embodiments, the processor (for example, the processor 1110 of FIG. 7) of the first server 2100 may control the voice processing module (for example, the voice processing module 1140 of FIG. 7) to process utterance data received from the receiver 2300. In addition, the processor (for example, the processor 1110 of FIG. 7) may provide the result of processing the utterance data to the receiver 2300. For example, the result of processing may include at least one of an intent on the user input, a domain for executing a task, or data (for example, a slot or a task parameter) required to understand the user's intent.

According to various embodiments, the processor (for example, the processor 1110 of FIG. 7) of the first server 2100 may control to provide intent masking information to the receiver 2300 as a result of processing. As described above, the intent masking information may be information in which an utterance processing object is designated with respect to an intent. In addition, the intent masking information may be generated by the matching information generation module (for example, the matching information generation module 1150 of FIG. 7).

According to various embodiments, the voice processing module (for example, the voice processing module 1140 of FIG. 7) of the first server 2100 may include the voice recognition module (for example, the voice recognition module 1140-1 of FIG. 7) and the NLU module (for example, the NLU module 1140-2 of FIG. 7), similarly to the voice processing module (for example, the voice processing module 1340 of FIG. 6) of the receiver 2300. According to an embodiment, the voice processing module (for example, the voice processing module 1140 of FIG. 7) of the first server 2100 may have a higher processing capability than the utterance data processing capability of the receiver 2300. For example, a result of processing an utterance (or utterance data), acquired by the voice processing module (for example, the voice processing module 1140 of FIG. 7) of the first server 2100, may have higher accuracy than a result of processing an utterance, acquired by the voice processing module (for example, the voice processing module 1340 of FIG. 6) of the receiver 2300.

According to various embodiments, the matching information generation module (for example, the matching information generation module 1150) of the first server 2100 may generate intent masking information based on the result of processing by the receiver 2300 (for example, the voice processing module 1340 of FIG. 6). The intent masking information may be associated with a matching rate between a first processing result on utterance data performed by the receiver 2300 (for example, the voice processing module 1340 of FIG. 6), and a second processing result on utterance data performed by the first server 2100 (for example, the voice processing module 1140 of FIG. 7). According to an embodiment, the first server 2100 may receive the first processing result from the receiver 2300, and the matching information generation module (for example, the matching information generation module 1150 of FIG. 7) may identify a matching rate regarding the first processing result by comparing the received first processing result and the second processing result performed by the first server 2100. In addition, the matching information generation module (for example, the matching information generation module 1150) may generate intent masking information in which one of the receiver 2300 or the first server 2100 is designated as an object to process the received utterance, based on the identified matching rate.

In an embodiment, the first server 2100 may identify the first executor 2410 (for example, the target executor) as an executor to perform the operation corresponding to the utterance acquired at the receiver 2300, and may connect the receiver 2300 and the executor 2410. The first server 2100 may generate the first channel for communicating with the receiver 2300. The first server 2100 may generate the second channel for communicating with the first executor 2410 which performs the operation corresponding to the utterance from among the plurality of executors 2400.

For example, the receiver 2300 may generate first device information (for example, state information, necessary response information, or identification information of the receiver 2300). According to an embodiment, the receiver 2300 may transmit the first device information to the first server 2100 by using the first channel.

In an embodiment, the first executor 2410 may generate second device information (for example, state information, necessary response information, or identification information of the first executor 2410). According to an embodiment, the first executor 2410 may transmit the second device information to the first server 2100 by using the second channel. In an embodiment, the first server 2100 may receive the first device information of the receiver 2300 through the first channel, and may control maintenance, termination of a connection, and/or reconnection with the receiver 2300. The first server 2100 may receive the second device information of the first executor 2410 through the second channel, and may control maintenance, termination of a connection, and/or reconnection with the first executor 2410. In addition, the first server 2100 may control information exchange and information distribution between the receiver 2300 and the plurality of executors 2400.

In an embodiment, for the connection between the receiver 2300 and the plurality of executors 2400, the receiver 2300 may transmit the first device information thereof to the first server 2100 and/or the second server 2200. The plurality of executors 2400 may transmit their respective second device information to the first server 2100 and/or the second server 2200. The second server 2200 may store and manage the first device information and the second device information for the connection between the receiver 2300 and the plurality of executors 2400. The second server 2200 may provide the first device information of the receiver 2300 and the second device information of each of the plurality of executors 2400 to the first server 2100. The first server 2100 and the second server 2200 may be disposed with different configurations. However, this should not be considered as limiting, and the first server 2100 and the second server 2200 may be configured with the same configuration. Although FIG. 18 illustrates that the first server 2100 and the second server 2200 are separately configured, the first server 2100 and the second server 2200 may be integrated into one server.

In an embodiment, the receiver 2300 and the first server 2100 may transmit and/or receive data through a capsule execution service (CES) 2500. In addition, the plurality of executors 2400 and the second server 2200 may also transmit and/or receive data through the CES 2500. The CES 2500 may support management of the first channel connecting the receiver 2300 and the first server 2100. In addition, the CES 2500 may support management of the second channel connecting the plurality of executors 2400 and the first server 2100. The CES 2500 may indicate, to the receiver 2300, the first server 2100 to be connected from among the plurality of servers. In addition, the CES 2500 may indicate, to the executor 2400, the first server 2100 to be connected from among the plurality of servers. That is, the CES 2500 may inform the receiver 2300 and the plurality of executors 2400 of which server should be connected from among the plurality of servers.

According to various embodiments, the processor (for example, the processor 1110 of FIG. 7) of the first server 2100 may include a conversation manager 2110 (for example, the conversation manager 1112 of FIG. 8), a device dispatch 2120, a classifier 3140 (for example, the classifier 1114 of FIG. 8), an event manager 2160 (for example, the event manager 1116 of FIG. 8), and/or a plurality of CANs 2170 (for example, the CAN 1118 of FIG. 8). According to various embodiments, the conversation manager 2110 may include the response manager 2114 and a connection time module 2116.

According to various embodiments, the conversation manager 2110 may generate, maintain, and manage a plurality of channels 2112. In an embodiment, the conversation manager 2110 may generate, maintain, and manage the first channel (listener channel) for communicating with the receiver 2300, and the second channel (executor channel) for communicating with the first executor 2410 (for example, the target executor). In an embodiment, the conversation manager 2110 may generate the first channel for communicating with the receiver 2300 through the response manager 2114 after an utterance is acquired at the receiver 2300. The conversation manager 2110 may determine the first executor 2410 (for example, the target executor) to perform an operation (or an action) corresponding to the utterance from among the plurality of executors 2400, based on the utterance received from the receiver 2300, and may generate the second channel for communicating with the first executor 2410 through the response manager 2114.

According to various embodiments, the response manager 2114 may distribute responses generated by executing the operation (or action) to the first channel (for example, the receiver channel) and the second channel (for example, the executor channel), after the operation corresponding to the utterance is performed at the first executor 2410. The response manager 2114 may transmit the responses to the receiver 2300 and the first executor 2410 through the first channel (for example, the receiver channel) and the second channel (for example, the executor channel).

According to various embodiments, the connection time module 2116 may manage a connection maintaining time of the first channel and the second channel when the first channel for communicating with the receiver 2300 and the second channel for communicating with the first executor 2410 are formed. The connection time module 2116 may manage effectiveness (for example, maintaining a connection) for a predetermined connection maintaining time. According to an embodiment, the connection time module 2116 may include the configuration of the life-time module 1112b of FIG. 8 and the configuration of the connection module 1112c of FIG. 8.

The connection time module 2116 may count a time from a time that the first channel is generated, and may determine whether a connection maintaining time (for example, a connection maintaining time of the receiver 2300) is exceeded after the first channel is generated. In addition, the connection time module 2116 may count a time from a time that the second channel is generated, and may determine whether a connection maintaining time (for example, a connection maintaining time of the first executor 2410) is exceeded after the second channel is generated. In addition, the connection time module 2116 may count a time from a time that an utterance is acquired at the receiver 2300, and may determine whether a connection maintaining time (for example, an additional information input waiting time) is exceeded after the utterance is acquired. In addition, the connection time module 2116 may count a time from a time that the utterance is performed at the first executor 2410, and may determine whether a connection maintaining time (for example, a follow-up utterance waiting time) is exceeded after the utterance is performed.

According to various embodiments, the receiver 2300 and the plurality of executors 2400 may have connection maintaining times different according to each device (for example, a connection maintaining time of the speaker is 8 seconds, a connection maintaining time of the air conditioner is 30 seconds, a connection maintaining time of the TV is 1 minute, or a connection maintaining time of the refrigerator is 2 minutes). In an embodiment, when the connection maintaining time of the receiver 2300 (for example, a first connection maintaining time) is ended, the receiver 2300 may inform a corresponding device, that is, the first executor 2410, of a disconnection request via the first server 2100. When the connection maintaining time of the first executor 2410 (for example, a second connection maintaining time) is ended, the first executor 2410 may inform a corresponding device, that is, the receiver 2300, of a disconnection request via the first server 2100. When the disconnection request is executed by any one of the receiver 2300 and the first executor 2410, the first server 2100 may disconnect the receiver 2300 and the first executor 2410.

In an embodiment, when a reconnection request is executed by any one of the receiver 2300 and the first executor 2410, the first server 2100 may reconnect the receiver 2300 and the first executor 2410.

In an embodiment, the connection time module 2116 may manage the first connection maintaining time of the receiver 2300 and the second connection maintaining time of the first executor 2410. In a state where the first connection maintaining time of the receiver 2300 and the second connection maintaining time of the first executor 2410 are effective, an operation of continuing the connection maintenance at the receiver 2300 (for example, an operation indicating continuous use of the receiver 2300) may be executed. In an embodiment, when a user's input operation (for example, touch, function selection, function execution, or utterance) for continuing the connection maintenance of the receiver 2300 is received, the receiver 2300 may perform an operation of maintaining the connection of the first channel. For example, the receiver 2300 may transmit a connection maintenance request of the first channel to the first server 2100 through the first channel. In this case, the connection time module 2116 may reset or refresh the first connection maintaining time. The connection time module 2116 may request the first executor 2410 to reset or refresh the second connection maintaining time.

In an embodiment, in the state where the first connection maintaining time of the receiver 2300 and the second connection maintaining time of the first executor 2410 are effective, an operation of continuing the connection maintenance at the first executor 2410 (for example, an operation indicating continuous use of the first executor 2410) may be executed. In an embodiment, when a user's input operation (for example, touch, function selection, or function execution) for continuing (or extending) the connection maintenance of the first executor 2410 is received, the first executor 2410 may perform an operation of maintaining the connection of the second channel. For example, the first executor 2410 may transmit a connection maintenance request of the second channel to the first server 2100 through the second channel. In this case, the connection time module 2116 may reset or refresh the second connection maintaining time. The connection time module 2116 may request the receiver 2300 to reset or refresh the first connection maintaining time. That is, when the operation of continuing the connection maintenance at any one of the receiver 2300 and the first executor 2410 is executed, the connection time module 2116 may manage to reset or refresh the first connection maintaining time of the receiver 2300 and the second connection maintaining time of the executor 2400.

In an embodiment, the receiver 2300 and the executors 2400 may recognize and manage their own channel maintaining time (for example, maintaining, resetting, or refreshing a connection maintaining time). That is, all of the electronic devices (for example, the receiver and/or the executors) may know and manage their own channel maintaining time. The electronic devices may readjust (for example, refresh) connection state information every predetermined time (for example, 5 seconds, 10 seconds, 30 seconds, 60 second, 5 minutes, 10 minutes or 30 minutes). Herein, when the connection of the electronic device (for example, the receiver and/or the executor) should be maintained due to control or additional operation of the user, the electronic device (for example, the receiver and/or the executor) may transmit a control value for resetting or refreshing its own channel maintaining time (for example, a value of a reset or refreshed connection maintaining time) to the first server 2100. When the connection maintaining time is not reset or refreshed, the electronic device (for example, the receiver and/or the executor) may disconnect the channel and may transmit a disconnection request of the channel to the first server 2100 when the connection maintaining time is ended. When a disconnection is requested from any one of the receiver 2300 and the executor 2410, the first server 2100 may terminate the connection between the receiver 2300 and the executor 2410. Since the receiver 2300 and the executors 2400 can manage the connection and the disconnection of the channel through the first server 2100, the receiver 2300 does not need to recognize the connection maintaining time of the executors 2400 connected thereto, and the executors 2400 do not need to recognize the connection maintaining time of the receiver 2300 connected thereto.

In an embodiment, the connection time module 2116 may identify whether the first connection maintaining time of the receiver 2300 and the second connection maintaining time of the first executor 2410 are reset or refreshed. The operation of identifying whether the first connection maintaining time and the second connection maintaining time are reset or refreshed may be performed at the connection time module 2116 on a predetermined interval basis. The connection time module 2116 may identify whether the connection maintaining time is reset or refreshed at the same intervals (for example, 5 seconds, 15 seconds, 30 seconds, 1 minute, 3 minutes, 5 minutes or 10 minutes) with respect to the receiver 2300 and the first executor 2410. However, this should not be considered as limiting, and the connection time module 2116 may identify whether the connection maintaining time is reset or refreshed at different intervals with respect to the receiver 2300 and the first executor 2410 (for example, 30 seconds for the receiver 2300 or 1 minute for the first executor 2410).

In an embodiment, the first connection maintaining time of the receiver 2300 (for example, the speaker) may be set to 1 minute, and the second connection maintaining time of the first executor 2410 (for example, the TV) may be set to 5 minutes. Herein, when 20 seconds are elapsed, the remaining first connection maintaining time of the receiver 2300 (for example, the speaker) may be 40 seconds, and the remaining second connection maintaining time of the first executor 2410 (for example, the TV) may be 4 minutes and 40 seconds. In this case, the operation of continuing the connection maintenance may be executed by the user operating the receiver 2300 (touching, selecting a function, executing a function, or uttering) or operating the first executor 2410 (touching, selecting a function, or executing a function). When the operation of continuing the connection maintenance is executed, the connection time module 2116 may reset the first connection maintaining time of the receiver 2300 to 1 minute again, and may reset the second connection maintaining time of the first executor 2410 to 5 minutes again.

In an embodiment, when the first channel is formed between the receiver 2300 and the first server 2100, the receiver 2300 may transmit utterance information and first device information on the receiver 2300 to the first server 2100 by using the first channel. Herein, the receiver 2300 may also transmit the first device information to the second server 2200. In this case, the receiver 2300 may transmit the first device information to the second server 2200 via the first server 2100. However, this should not be considered as limiting, and the receiver 2300 may directly transmit the first device information to the second server 2200. For example, when a user utterance is received from the receiver 2300, the conversation manager 2110 may determine whether the corresponding utterance can be processed at the receiver 2300, and/or which device of the plurality of executors can execute the utterance. When the user utterance can be processed at the first executor 2410 (for example, the target executor), the conversation manager 2110 may transmit the first device information to the second server 2200.

In an embodiment, the first executor 2410 may generate second device information (for example, state information, necessary response information, or identification information of the first executor 2410). When the second channel is formed between the first executor 2410 and the first server 2100, the first executor 2410 may transmit the second device information to the first server 2100 through the second channel. After the first channel and the second channel are formed, the first server 2100 may connect the receiver 2300 and the first executor 2410 based on the first device information received from the receiver 2300 and the second device information received from the first executor 2410.

In the above-described example, the first device information and the second device information are transmitted and received through the first server 2100 and/or the second server 2200. However, this should not be considered as limiting, and the first device information and the second device information may be transmitted and received between the receiver 2300 and the plurality of executors 2400 in a D2D method.

In an embodiment, the device dispatch 2120 may include a rule NLU module 2122. When a user utterance is inputted to the first server 2100 through the receiver 2300, the rule NLU module 2122 may determine whether the utterance is to control another device (for example, at least one executor of the plurality of executors 2400). The rule NLU module 2122 may provide information of the executor 2400 which executes an operation (or action) corresponding to a result of determining about the utterance to the device dispatch 2120.

In an embodiment, the device dispatch 2120 may receive the information of the executor (for example, the first executor 2410) which executes the operation (or action) corresponding to the utterance from the rule NLU module 2122, and then may determine whether there is the executor (for example, the first executor 2410) to execute the operation (or action). Herein, when there are a plurality of executors to execute the operation (or action) corresponding to the utterance, the device dispatch 2120 may ask the user which device will execute the operation (or action) corresponding to the utterance again, and may select the executor to execute the operation (or action). In an embodiment, when a connection between the receiver 2300 and the executor (for example, the first executor 2410) to execute the operation (or action) corresponding to the utterance is determined to be effective by the connection time module 2116, the device dispatch 2120 may omit the operation of selecting the executor (for example, the first executor 2410) to execute the operation (action) corresponding to the utterance.

In an embodiment, the classifier 3140 may classify which executor 2400 will perform the operation corresponding to the utterance requested at the receiver 2300 from among the plurality of executors 2400. The classifier 3140 may cause utterance information to be transmitted to the executor 2400 to perform the operation corresponding to the requested utterance, that is, to the target executor. In addition, when the executor to execute the operation (or action) corresponding to the utterance is the first executor 2410, the classifier 3140 may cause a result of performing the utterance to be transmitted to the corresponding receiver 2300 after the operation corresponding to the utterance is performed at the first executor 2410.

In an embodiment, the event manager 2160 may cause the result of performing the utterance to be transmitted to the receiver 2300 and/or the first executor 2410 after the operation corresponding to the utterance is performed. The event manager 2160 may determine through which channel the result of performing the utterance is transmitted to the receiver 2300 and/or the first executor 2410. The event manager 2160 may determine whether to transmit the result of performing the utterance without processing, or may determine whether to correct the result of performing the utterance according to a UI form of the receiver 2300 and/or the first executor 2410, and to transmit the corrected result. When the result of performing the utterance should be corrected, the event manager 2160 may correct the result of performing the utterance according to the UI form of the receiver 2300 and/or the first executor 2410, and may transmit the corrected result of performing the utterance to the receiver 2300 and/or the first executor 2410.

Figure 19:
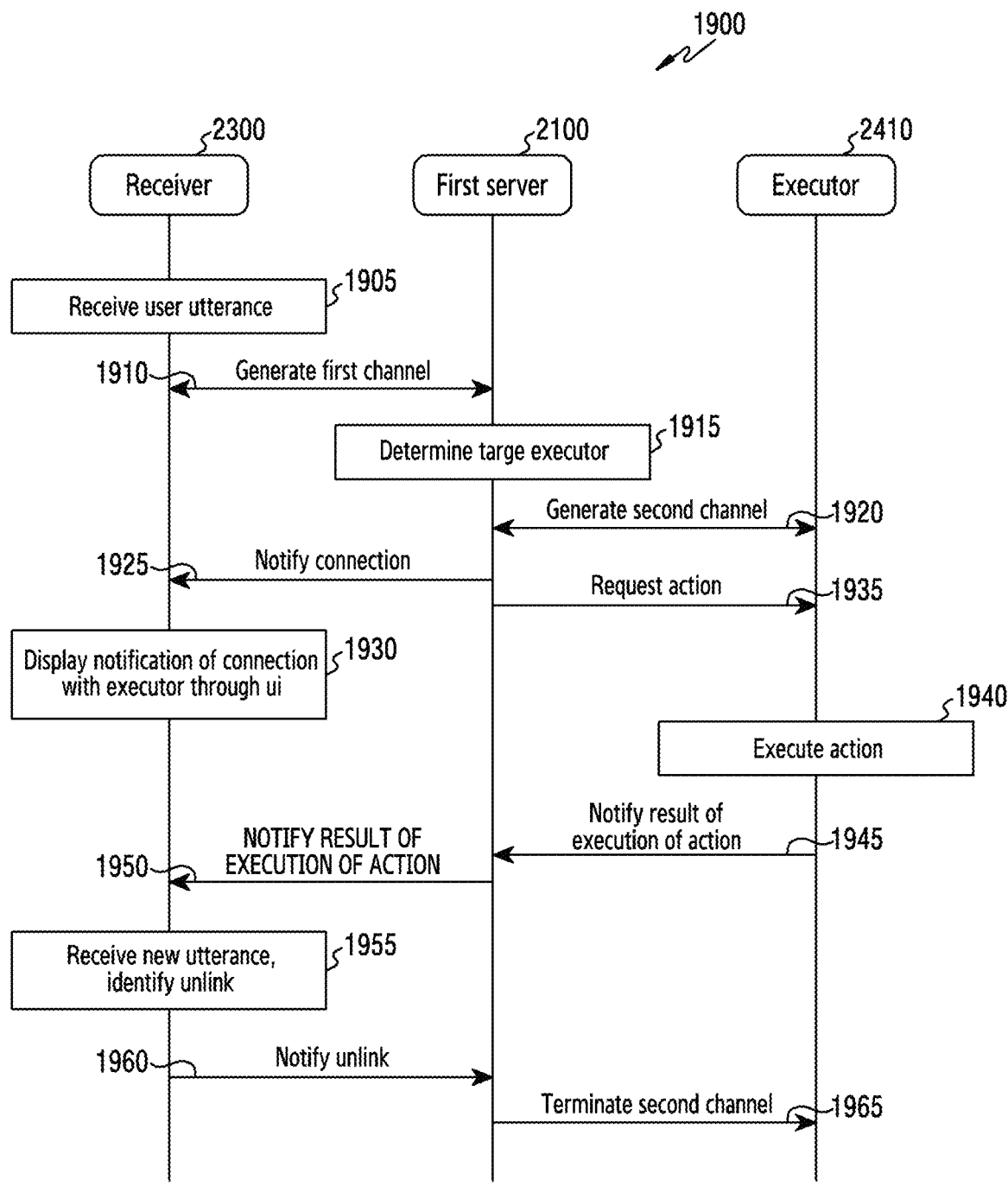
FIG. 19 illustrates an example flowchart for providing an intelligent assistance service at the receiver according to various embodiments.
Figure 20:
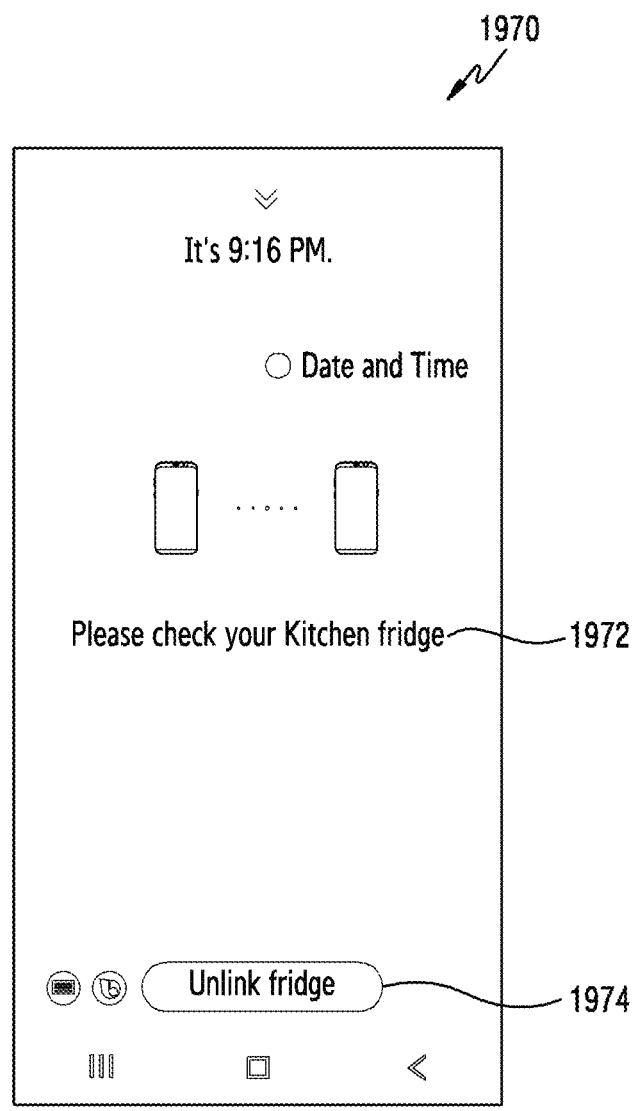
FIG. 20 illustrates a view of an example of a UI informing that a receiver (for example, a mobile phone) and an executor (for example, a refrigerator) are connected.

FIG. 19 illustrates an example flowchart 1900 for providing an intelligent assistance service at the receiver according to various embodiments. FIG. 20 illustrates a view of an example of a user interface 1970 informing that the receiver (for example, a mobile phone) and the executor (for example, a refrigerator) are connected.

Referring to FIGS. 19 and 20, in operation 1905, the receiver 2300 (for example, the mobile phone) may receive a user utterance.

In operation 1910, the receiver 2300 (for example, the mobile phone) may generate a first channel between the receiver 2300 (for example, the mobile phone) and the first server 2100, based on the received user utterance. The user utterance and context information of the receiver 2300 (for example, the mobile phone) may be transmitted to the first server 2100 through the first channel.

In operation 1915, the first server 2100 (for example, the classifier 3140) may determine which executor (for example, the first executor 2410) of the plurality of executors 2400 will execute an operation (or action) corresponding to the user utterance.

When the first executor 2410 is determined to execute the operation (or action) corresponding to the user utterance, the first server 2100 may transmit a connection generation request to the first executor 2410 in operation 1920. When the connection generation request is received, the first executor 2410 may generate a second channel with the first server 2100, and the receiver 2300 (for example, the mobile phone) and the first executor 2410 may be connected with each other.

In an embodiment, the first executor 2410 may transmit its own context information (for example, a response type or a device type) to the first server 2100 through the second channel. The first server 2100 may transmit the context information of the first executor 2410 to execute the operation (or action) corresponding to the utterance to the classifier, by using the context information of the corresponding receiver 2300 and the first executor 2410.

In operation 1925, the first server 2100 may inform the receiver 2300 that the first executor 2140 to execute the operation (or action) corresponding to the utterance is connected.

In an embodiment, when execution of the operation (or action) corresponding to the utterance is completed at the first executor 2410, information of the result (or response) of executing the operation (or action) may be provided to the event manager 2160. The event manager 2160 may transmit the result (for example, a response) of executing the operation (or action) to the receiver 2300 and the first executor 2410, respectively, according to an information setting value (for example, a response type) required by the receiver 2300 and the first executor 2410. In an embodiment, the event manager 2160 may transmit information of a result (for example, a response) that is not set by the receiver 2300 and other executors to the receiver 2300 and other executors.

In an embodiment, when the user utters "Find the recipe of pizza on the first executor 2410 (for example, the refrigerator)" through the receiver 2300 (for example, the mobile phone), the receiver 2300 (for example, the mobile phone) and the first server 2100 may generate the first channel. The receiver 2300 (for example, the mobile phone) and the first server 2100 may transmit and/or receive the user utterance and context information of the receiver 2300 (for example, the mobile phone) through the first channel.

In an embodiment, the first server 2100 may determine whether the utterance "Find the recipe of pizza on the refrigerator", received through the receiver 2300 (for example, the mobile phone), should be executed at the receiver 2300 (for example, the mobile phone) or the executor 2400, through the rule NLU module 2122 of the device dispatch 2120. In an embodiment, the first server 2100 may determine whether an operation (or action) corresponding to the utterance should be executed at the first executor 2410 (for example, the refrigerator) through the dispatch 2120, and may determine whether the first executor 2410 (for example, the refrigerator) is an effective device.

In an embodiment, when the first executor 2410 (for example, the refrigerator) is determined to execute the operation (or action) corresponding to the utterance, the first server 2100 may transmit a connection generation request to the first executor 2410 (for example, the refrigerator) to form the second channel between the first server 2100 and the first executor 2410 (for example, the refrigerator). The first executor 2410 (for example, the refrigerator) may form the second channel between the first server 2100 and the first executor 2410 (for example, the refrigerator), based on the received connection generation request. The first executor 2410 (for example, the refrigerator) may transmit its own context information to the first server 2100 through the second channel.

In an embodiment, the first server 2100 may determine a CAN to perform the operation (or action) from among the plurality of CANs 2170 through the classifier 3140, by using the context information of the receiver 2100 received through the first channel and the context information of the first executor 2140 received through the second channel.

In operation 1930, the receiver 2300 may display connection information 1972 informing that the first executor 2410 (for example, the refrigerator) is connected, for the user through a UI 1970. An example of a content informing the connection information 1972 may be "Please check your kitchen fridge", or the content of the connection information 1972 may be displayed through a display (for example, the display 440 of FIG. 4) in various other forms. The UI 1970 informing the connection information may be displayed through the receiver 2300 until the connection is lost after the operation (or action) corresponding to the utterance is executed at the first executor 2140 (for example, the refrigerator). In an embodiment, a result (for example, a response) of executing the operation (or action) corresponding to the utterance may be displayed not only through the receiver 2300, but also through a display of the first executor 2140 (for example, the refrigerator).

In operation 1935, the first server 2100 may request the first executor 2140 (for example, the refrigerator) to execute the operation (or action) corresponding to the utterance. In an embodiment, the first server 2100 may request the first executor 2140 (for example, the refrigerator) to execute the operation (or action) corresponding to the utterance through the second channel.

In operation 1940, the first executor 2140 (for example, the refrigerator) may execute the operation (or action) corresponding to the utterance. In an embodiment, in the state where the receiver 2300 (for example, the mobile phone) and the first executor 2410 (for example, the refrigerator) are connected through the utterance of the user "Find the recipe of pizza on the refrigerator", when the user makes the next utterance "Tell me the weather" to the receiver 2300 (for example, the mobile phone), an operation (or action) for the corresponding utterance may be executed at the first executor 2140 (for example, the refrigerator).

In operation 1945, the first executor 2140 (for example, the refrigerator) may notify the first server 2100 of the result of executing the operation (or action) corresponding to the utterance.

In operation 1950, the first server 2100 may notify the receiver 2300 of the result of executing the operation (or action) at the first executor 2140 (for example, the refrigerator).

In operation 1955, the receiver 2300 may receive a new user utterance. The receiver 2300 may display connection termination (or uplink) on the UI 1970. When the user wishes to execute the utterance "Tell me the weather" through the receiver 2300 (for example, the mobile phone), rather than through the first executor 2140 (for example, the refrigerator), the user may touch (or click) the connection termination (or unlink) menu 1974 (for example, Unlink fridge) displayed on the UI 1970.

When the connection termination (or unlink) menu 1974 displayed on the UI 1970 is selected on the receiver 2300 (for example, the mobile phone), the receiver 2300 (for example, the mobile phone) may transmit the connection termination (or unlink) to the first server 2100 in operation 1960.

In operation 1965, the first server 2100 may transmit the connection termination (or unlink) to the first executor 2410 (for example, the refrigerator), and may disable the second channel, thereby disconnecting the first executor 2410 (for example, the refrigerator).

In an embodiment, the user may return back to a home screen by touching (or clicking) a home key of the receiver 2300 (for example, the mobile phone), and then may input the utterance "Tell me the weather" to the receiver 2300 (for example, the mobile phone). In this case, the operation (or action) corresponding to the utterance may be executed at the receiver 2300 (for example, the mobile phone) rather than at the first executor 2410 (for example, the refrigerator), and the result of executing the operation corresponding to the utterance may be provided to the user.

Figure 21:
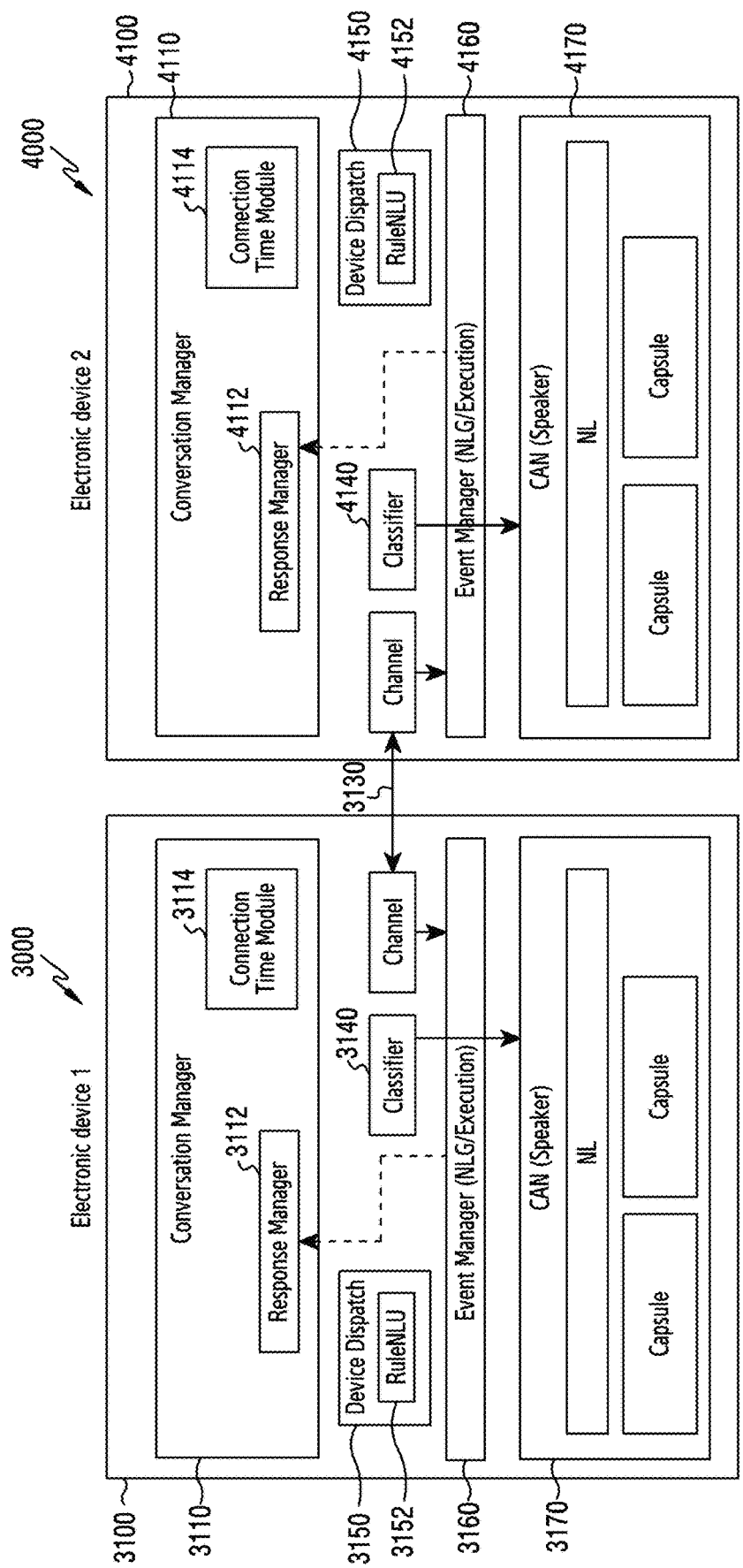
FIG. 21 illustrates an example view showing that a receiver and an executor are connected in a device to device (D2D) method according to an embodiment.

FIG. 21 illustrates an example view of a receiver and an executor which are connected in a D2D method according to an embodiment.

Referring to FIG. 21, a first electronic device 3000 may operate as a receiver (for example, the receiver 2300 of FIG. 18), and a second electronic device 4000 may operate as an executor (for example, the executor 2400 of FIG. 18). However, this should not be considered as limiting, and the second electronic device 4000 may operate as a receiver and the first electronic device 3000 may operate as an executor. The first electronic device 3000 (for example, the receiver) and the second electronic device 4000 (for example, the executor) may be connected with each other in a D2D method by using a wired or wireless network. FIG. 21 illustrates that one first electronic device 3000 (for example, the receiver) and one second electronic device 4000 (for example, the executor) are connected in the D2D method, but this should not be considered as limiting, and one or a plurality of first electronic devices 3000 (for example, the receivers) and a plurality of second electronic devices 4000 (for example, the executors) may be connected in the D2D method.

According to various embodiments, the first electronic device 3000 (for example, the receiver) may perform a function of a listener of receiving a user voice. The first electronic device 3000 (for example, the receiver) may include various devices (for example, an AI speaker) including a configuration related to voice recognition and a voice input device (for example, a microphone). For example, the first electronic device 3000 (for example, the receiver) may include the electronic device 101 of FIG. 1 or the user terminal 400 of FIG. 2. The first electronic device 3000 (for example, the receiver) may acquire an utterance from a user (for example, the user 1010 of FIG. 5) through the voice input device (for example, the microphone 420 of FIG. 2). The utterance may include a wake-up utterance instructing to enable and/or invoke an intelligent assistance service, and/or a control utterance instructing an operation (for example, power control, volume control) of a hardware and/or software configuration included in the second electronic device 4000 (for example, the executor). In an embodiment, the wake-up utterance and the control utterance may be acquired, respectively. In an embodiment, the control utterance may be acquired along with the wake-up utterance.

According to various embodiments, the first electronic device 3000 (for example, the receiver) may generate a control message (or a control instruction), based on at least a portion of the acquired utterance (or utterance data). The first electronic device 3000 (for example, the receiver) may transmit the generated control message to the second electronic device 4000 (for example, the executor) which will perform an operation corresponding to the utterance. The control message may be generated based on a result of processing the utterance data.

In an embodiment, the processing of the utterance data may be performed through natural language processing by the first electronic device 3000 (for example, the receiver). For example, the first electronic device 3000 (for example, the receiver) may process the utterance data by itself by using a voice processing module (for example, the voice processing module 1340 of FIG. 6).

For example, the first electronic device 3000 (for example, the receiver) may include an utterance data processing capability of a first level, for example, a voice recognition module (for example, the voice recognition module 1340-1 of FIG. 6) of the first level, and an NLU module (for example, the NLU module 1340-2 of FIG. 6) of the first level. In addition, the first electronic device 3000 (for example, the receiver) may include an utterance data processing capability of a second level which is higher than the first level, for example, a voice recognition module (for example, the voice recognition module 1140-1 of FIG. 7) of the second level, and an NLU module (for example, the NLU module 1140-2 of FIG. 6) of the second level. In addition, the first electronic device 3000 (for example, the receiver) may provide the result of performing the operation corresponding to the user utterance. The first electronic device 3000 (for example, the receiver) may include a sound output device (for example, a speaker), a display, and/or one or more lamps to provide the result of performing the operation corresponding to the utterance.

According to various embodiments, the second electronic device 4000 (for example, the executor) may include a smartphone (for example, the smartphone 1410 of FIG. 5), a computer (for example, the computer 1420 of FIG. 5, a personal computer, or a notebook computer), a television (for example, the television 1430 of FIG. 5), a refrigerator (for example, the refrigerator 1440 of FIG. 5), and/or an illumination device (for example, the illumination device 1450 of FIG. 5). In addition, the second electronic device 4000 (for example, the executor) according to various embodiments may further include an air conditioner, a thermostat, an alarm device, a gas valve control device, or a door lock device.

According to an embodiment, the second electronic device 4000 (for example, the executor) may include a communication circuit to form a channel with the first electronic device 3000 (for example, the receiver) by using a designated protocol (for example, Bluetooth, WiFi, or Zigbee), and to transmit and/or receive a variety of information. According to an embodiment, the second electronic device 4000 (for example, the executor) may transmit information on its own operation state (for example, on/off information of a device) to the first electronic device 3000 (for example, the receiver). In addition, the second electronic device 4000 (for example, the executor) may receive a control message (for example, an on/off control command of a device, or other operation control commands of a device) from the first electronic device 3000 (for example, the receiver), and may execute an operation corresponding to the control message. In addition, the second electronic device 4000 (for example, the executor) may transmit a result of executing the operation corresponding to the control message to the first electronic device 3000 (for example, the receiver).

In an embodiment, at least some components of the first electronic device 3000 (for example, the receiver) may correspond to at least some components of the second electronic device 4000 (for example, the executor). For example, the first electronic device 3000 (for example, the receiver) and the second electronic device 4000 (for example, the executor) may include a processor (for example, the processor 1110 of FIG. 7), a memory (for example, the memory 1120 of FIG. 7), a communication module (for example, the communication module 1130 of FIG. 7), a voice processing module (for example, the voice processing module 1140 of FIG. 7) and/or a matching information generation module (for example, the matching information generation module 1150 of FIG. 7).

According to various embodiments, the processor 3100 (for example, the processor 1110 of FIG. 7) of the first electronic device 3000 (for example, the receiver) may include a conversation manager 3110 (for example, the conversation manager 1112 of FIG. 8 or the conversation manager 2110 of FIG. 18), a device dispatch 3150 (for example, the device dispatch 2120 of FIG. 18), a classifier 3140 (for example, the classifier 1114 of FIG. 8 or the classifier 3140 of FIG. 18), an event manager 3160 (for example, the event manager 1116 of FIG. 8 or the event manager 2160 of FIG. 18), and/or a CAN 3170 (for example, the CAN 1118 of FIG. 8 or the CAN 2170 of FIG. 18). According to various embodiments, the conversation manager 3110 may include a response manager 3112 and/or a connection time module 3114.

According to various embodiments, the processor 4100 (for example, the processor 1110 of FIG. 7) of the second electronic device 4000 (for example, the executor) may include a conversation manager 4110 (for example, the conversation manager 1112 of FIG. 8 or the conversation manager 2110 of FIG. 18), a device dispatch 4150 (for example, the device dispatch 2120 of FIG. 18), a classifier 4140 (for example, the classifier 1114 of FIG. 8 or the classifier 3140 of FIG. 18), an event manager 4160 (for example, the event manager 1116 of FIG. 8 or the event manager 2160 of FIG. 18), and/or a CAN 4170 (for example, the CAN 1118 of FIG. 8 or the CAN 2170 of FIG. 18). According to various embodiments, the conversation manager 4110 may include a response manager 4112 and/or a connection time module 4114.

In the following description, it is assumed that the first electronic device 3000 operates as a receiver and the second electronic device 4000 operates as an executor. Accordingly, the configuration of the first electronic device 3000 (for example, the receiver) and an operating method thereof will be mainly described, and description of the configuration of the second electronic device 4000 (for example, the executor) which is the same as the first electronic device 3000 (for example, the receiver) will be omitted.

In an embodiment, a channel 3130 may be generated to transmit and receive data between the first electronic device 3000 (for example, the receiver) and the second electronic device 4000 (for example, the executor). For example, generation of the channel 3130 may be initiated by the first electronic device 3000 (for example, the receiver). For example, generation of the channel 3130 may be initiated by the second electronic device 4000 (for example, the executor). The channel 3130 may be generated by transmitting and receiving a request for generating the channel 3130 between the first electronic device 3000 (for example, the receiver)

and the second electronic device 4000 (for example, the executor), and response information. The request and the response information which are transmitted and received between the first electronic device 3000 (for example, the receiver) and the second electronic device 4000 (for example, the executor) may be managed by the response manager 3112 of the first electronic device 3000 (for example, the receiver) and/or the response manager 4112 of the second electronic device 4000 (for example, the executor).

According to various embodiments, the conversation manager 3110 of the first electronic device 3000 (for example, the receiver) and/or the conversation manager 4110 of the second electronic device 4000 (for example, the executor) may generate, maintain, and manage the channel 3130. In an embodiment, after a user utterance is acquired, the conversation manager 3110 of the first electronic device 3000 (for example, the receiver) may determine the second electronic device 4000 (for example, the executor) to perform an operation (or action) corresponding to the utterance from among the plurality of executors, based on the received utterance. Thereafter, the channel 3130 for communicating with the second electronic device 4000 (for example, the executor) may be generated through the response manager 3112.

In an embodiment, the device dispatch 3150 may include a rule NLU module 3152. The rule NLU module 3152 may determine whether an utterance is to control another device (for example, at least one executor of the plurality of executors) when the user utterance is inputted to the first electronic device 3000 (for example, the receiver). The rule NLU module 3152 may provide information on an executor which executes an operation corresponding to a result of determining regarding the utterance to the device dispatch 3150.

In an embodiment, after receiving the information of the second electronic device 4000 (for example, the executor) which executes the operation (or action) corresponding to the utterance from the rule NLU module 3152, the device dispatch 3150 may determine whether there is the second electronic device 4000 (for example, the executor) to execute the operation (or action). In an embodiment, when a connection between the first electronic device 3000 (for example, the receiver) and the second electronic device 4000 (for example, the executor) to execute the operation (or action) corresponding to the utterance is determined to be effective by the connection time module 3114, 4114, the device dispatch 3150 may omit the operation of selecting the executor to execute the operation (or action) corresponding to the utterance.

According to various embodiments, the response manager 4112 of the second electronic device 4000 (for example, the executor) may distribute responses which are generated after the operation (or action) corresponding to the utterance is executed at the second electronic device 4000 (for example, the executor), through the channel 3130. The response manager 4112 of the second electronic device 4000 (for example, the executor) may transmit the responses to the first electronic device 3000 (for example, the receiver) through the channel 3130.

According to various embodiments, when the channel 3130 is formed, the connection time module 3114 of the first electronic device 3000 (for example, the receiver) and the connection time module 4114 of the second electronic device 4000 (for example, the executor) may manage a connection maintaining time of the channel 3130. Each of the connection time modules 3114, 4114 may manage effectiveness for a predetermined connection maintaining time.

According to various embodiments, the first electronic device 3000 (for example, the receiver) and the second electronic device 4000 (for example, the executor) may have connection maintaining times different according to each device (for example, a connection maintaining time of the speaker is 8 seconds, a connection maintaining time of an air conditioner is 30 seconds, a connection maintaining time of the TV is 1 minute, or a connection maintaining time of the refrigerator is 2 minutes). In an embodiment, when the connection maintaining time of the first electronic device 3000 (for example, the receiver) (for example, a first connection maintaining time) is ended, the first electronic device 3000 may inform the second electronic device 4000 (for example, the executor) of a disconnection request. Likewise, when the connection maintaining time of the second electronic device 4000 (for example, the executor) (for example, a second connection maintaining time) is ended, the second electronic device 4000 may inform the first electronic device 3000 (for example, the receiver) of a disconnection request. When the disconnection request is executed at any one of the first electronic device 3000 (for example, the receiver) and the second electronic device 4000 (for example, the executor), the channel 3130 between the first electronic device 3000 (for example, the receiver) and the second electronic device 4000 (for example, the executor) may be disabled. That is, the connection may be disabled.

In an embodiment, when a reconnection request is executed at any one of the first electronic device 3000 (for example, the receiver) and the second electronic device 4000 (for example, the executor), the first electronic device 3000 (for example, the receiver) and the second electronic device 4000 (for example, the executor) may re-generate the channel 3130 and may be reconnected.

In an embodiment, the connection time module 3114 of the first electronic device 3000 (for example, the receiver) may manage the first connection maintaining time of the first electronic device 3000 (for example, the receiver). The connection time module 4114 of the second electronic device 4000 (for example, the executor) may manage the second connection maintaining time of the second electronic device 4000 (for example, the executor).

In an embodiment, in the state where the first connection maintaining time and the second connection maintaining time are effective, an operation of continuing connection maintenance at the first electronic device 3000 (for example, the receiver) (for example, an operation indicating continue use of the receiver) may be executed. In this case, the first electronic device 3000 (for example, the receiver) may reset or refresh the first connection maintaining time, and the connection time module 3114 may request the second electronic device 4000 (for example, the executor) to reset or refresh the second connection maintaining time.

In an embodiment, in the state where the first connection maintaining time and the second connection maintaining time are effective, an operation of continuing connection maintenance at the second electronic device 4000 (for example, the executor) (for example, an operation indicating continue use of the executor) may be executed. In this case, the second electronic device 4000 (for example, the executor) may reset or refresh the second connection maintaining time, and the connection time module 4114 may request the first electronic device 3000 (for example, the receiver) to reset or refresh the first connection maintaining time.

In an embodiment, in the state where the first connection maintaining time and the second connection maintaining time are effective, when the operation of continuing connection maintenance is executed at any one device of the first electronic device 3000 (for example, the receiver) and the second electronic device 4000 (for example, the executor), each of the connection time modules 3114, 4114 may manage to reset or refresh the first connection maintaining time and the second connection maintaining time.

In an embodiment, an operation of identifying whether the first connection maintaining time and the second connection maintaining time are reset or refreshed may be performed at each of the connection time modules 3114, 4114 on a predetermined interval basis. Each of the connection time modules 3114, 4114 may identify whether the connection maintaining time is reset or refreshed at the same intervals (for example, 5 seconds, 15 seconds, 30 seconds, 1 minute, 3 minutes, 5 minutes or 10 minutes) with respect to the first electronic device 3000 (for example, the receiver) and the second electronic device 4000 (for example, the executor). However, this should not be considered as limiting, and each of the connection time modules 3114, 4114 may identify whether the connection maintaining time is reset or refreshed at different intervals with respect to the first electronic device 3000 (for example, the receiver) and the second electronic device 4000 (for example, the executor) (for example, 30 seconds for the receiver or 1 minute for the executor).

In an embodiment, when a user utters "Find the recipe of pizza on the refrigerator" through the first electronic device 3000 (for example, the receiver), the rule NLU module 3152 of the first electronic device 3000 (for example, the receiver) may determine whether the corresponding utterance should be executed at the first electronic device 3000 (for example, the receiver). When the corresponding utterance is not executed at the first electronic device 3000 (for example, the receiver) as a result of determining by the rule NLU module 3152, the device dispatch 3150 may determine whether the refrigerator is an effective device. In the disclosure, it is assumed that the second electronic device 4000 (for example, the executor) is the refrigerator.

In an embodiment, when it is determined that the second electronic device 4000 (for example, the executor) is an effective device as an executor, context information and utterance information to be transmitted from the first electronic device 3000 (for example, the receiver) to the second electronic device 4000 (for example, the executor) may be determined through the classifier 3140. The classifier 3140 may classify to determine which executor will perform the utterance requested at the first electronic device 3000 (for example, the receiver) from among the plurality of executors. The classifier 3140 may cause utterance information to be transmitted to the executor to perform the utterance requested at the first electronic device 3000 (for example, the receiver), that is, to the second electronic device 4000 (for example, the executor). In addition, the classifier 3140 may cause a result of performing the utterance to be transmitted to the first electronic device 3000 (for example, the receiver) after an operation corresponding to the utterance is performed at the second electronic device 4000 (for example, the executor).

In an embodiment, the first electronic device 3000 (for example, the receiver) may generate the channel 3130 and may connect to the second electronic device 4000 (for example, the executor) for a predetermined connection maintaining time. Thereafter, first device information of the first electronic device 3000 (for example, the receiver) and second device information of the second electronic device 4000 (for example, the executor) may be transmitted and/or received. Thereafter, the first electronic device 3000 (for example, the receiver) may transmit context information and utterance information to the second electronic device 4000 (for example, the executor).

In an embodiment, the second electronic device 4000 (for example, the executor) may determine a capsule (domain) (for example, the CAN 4170) to execute the operation (or action) corresponding to the utterance, based on the context information and the utterance information received from the first electronic device 3000 (for example, the receiver). The second electronic device 4000 (for example, the executor) may transmit the context information and the utterance information received from the first electronic device 3000 (for example, the receiver) to the capsule (domain) to execute the operation (or action) corresponding to the utterance. After the operation corresponding to the utterance is performed, the event manager 4160 of the second electronic device 4000 (for example, the executor) may transmit the result of performing the utterance to the first electronic device 3000 (for example, the receiver) and the second electronic device 4000 (for example, the executor).

In an embodiment, the event manager 3160, 4160 may determine whether to transmit the result of performing the utterance without processing, or may determine whether to correct the result of performing the utterance according to a UI form of the first electronic device 3000 (for example, the receiver) and/or the second electronic device 4000 (for example, the executor), and to transmit the corrected result. When the result of performing the utterance should be corrected, the event manager 3160, 4160 may correct the result of performing the utterance according to the UI form of the first electronic device 3000 (for example, the receiver) and/or the second electronic device 4000 (for example, the executor), and may transmit the corrected result of performing the utterance to the first electronic device 3000 (for example, the receiver) and/or the second electronic device 4000 (for example, the executor).

In an embodiment, the response manager 3112 of the first electronic device 3000 (for example, the receiver) may provide the result of performing the utterance, received from the second electronic device 4000 (for example, the executor), to the user through a UI (for example, the UI 1970 of FIG. 20).

In an embodiment, the result of performing at the CAN 4170 of the second electronic device 4000 (for example, the executor) may be processed by a response manager of another executor. However, this should not be considered as limiting, and the executor may transmit the result of executing the operation (or action) to the receiver and the result of performing at the CAN 4170 may be processed through the response manager 3112 of the receiver.

Figure 22:
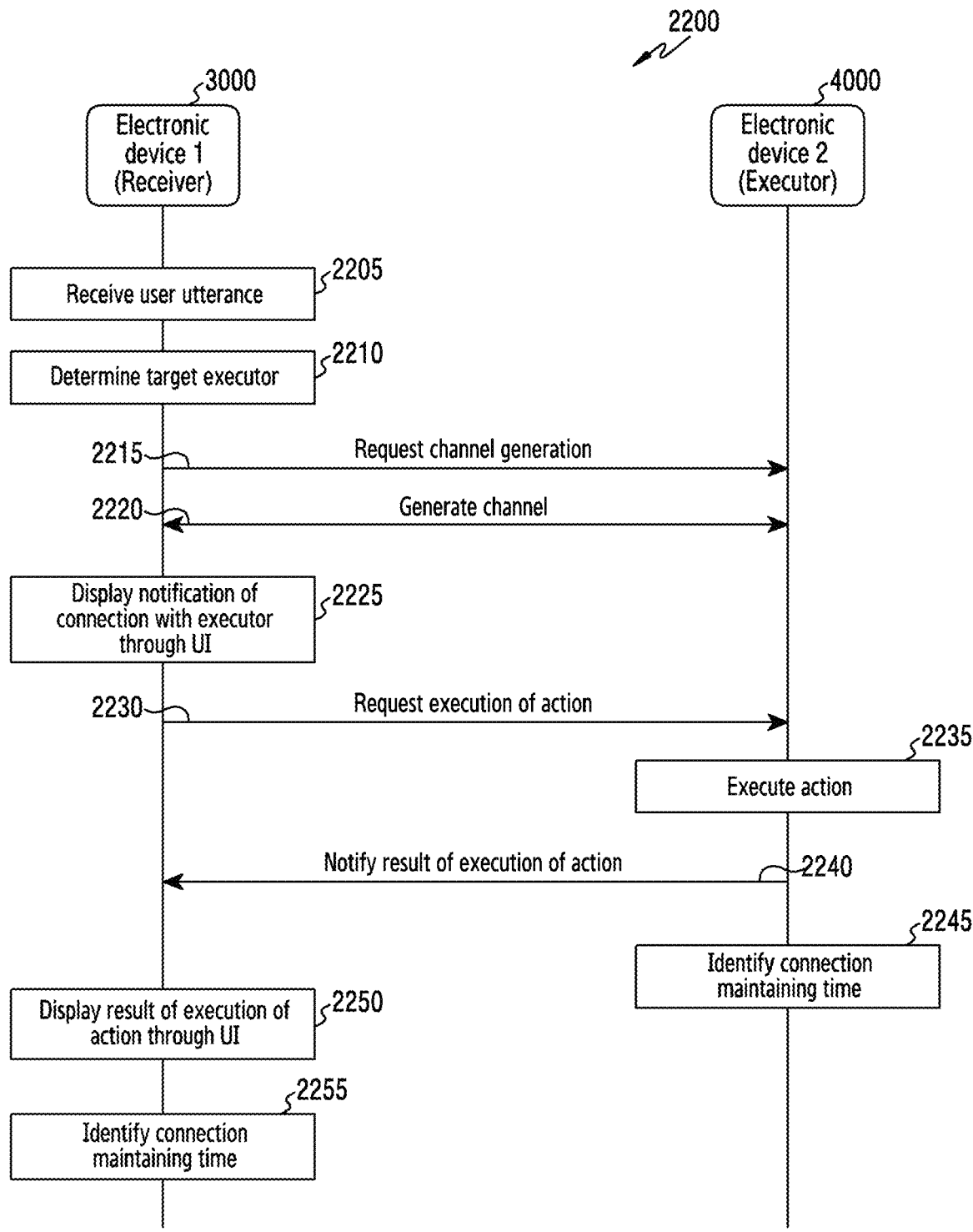
FIG. 22 illustrates an example flowchart for providing an intelligent assistance service through the receiver and the executor which are connected in the D2D method according to various embodiments.

FIG. 22 illustrates a flowchart 52200 for providing an intelligent assistance service through the receiver and the executor which are connected in the D2D method according to various embodiments.

Referring to FIGS. 21 and 22, the first electronic device 3000 (for example, the receiver) may receive a user utterance in operation 2205.

In operation 2210, the first electronic device 3000 (for example, the receiver) may determine a target executor to perform an operation (or action) corresponding to the utterance from among the plurality of executors, based on the received user utterance. In the following description, it is assumed that the second electronic device 4000 (for example, the executor) is the target executor to perform the operation (or action) corresponding to the utterance.

In operation 2215, the first electronic device 3000 (for example, the receiver) may request the second electronic device 4000 (for example, the executor) to generate the channel 3130.

In operation 2220, the second electronic device 4000 (for example, the executor) may receive a request for generation of the channel 3130 from the first electronic device 3000 (for example, the receiver), and may generate the channel 3130 between the first electronic device 3000 (for example, the receiver) and the second electronic device 4000 (for example, the executor).

In operation 2225, the first electronic device 3000 (for example, the receiver) may display a notification of connection with the second electronic device 4000 (for example, the executor) through a UI (for example, the UI 1970 of FIG. 20).

In operation 2230, the first electronic device 3000 (for example, the receiver) may transmit the user utterance and context information to the second electronic device 4000 (for example, the executor), and may request the second electronic device 4000 to execute the operation (or action) corresponding to the utterance.

In operation 2235, the second electronic device 4000 (for example, the executor) may execute the operation (or action), based on the user utterance and the context information which are received from the first electronic device 3000 (for example, the receiver).

In operation 2240, the second electronic device 4000 (for example, the executor) may notify the first electronic device 3000 (for example, the receiver) of a result of executing the operation (or action) corresponding to the utterance.

In operation 2245, the second electronic device 4000 (for example, the executor) may identify a predetermined second connection maintaining time, and may wait for reception of a follow-up operation (or action) execution request for the second connection maintaining time.

In operation 2250, the first electronic device 3000 (for example, the receiver) may display the result of executing the operation (or action) corresponding to the utterance, received from the second electronic device 4000 (for example, the executor), through the UI.

In operation 2255, the first electronic device 3000 (for example, the receiver) may identify a predetermined first connection maintaining time, and may wait for reception of a follow-up utterance for the first connection maintaining time.

In operations 2245 and 2255, when the connection maintaining time is ended at any one of the first electronic device 3000 (for example, the receiver) and the second electronic device 4000 (for example, the executor), the channel 3130 between the first electronic device 3000 (for example, the receiver) and the second electronic device 4000 (for example, the executor) may be disabled. That is, the connection between the first electronic device 3000 (for example, the receiver) and the second electronic device 4000 (for example, the executor) may be disabled. However, this should not be considered as limiting, and, when resetting or refreshing of the connection maintaining time is requested at any one of the first electronic device 3000 (for example, the receiver) and the second electronic device 4000 (for example, the executor), the connection between the first electronic device 3000 (for example, the receiver) and the second electronic device 4000 (for example, the executor) may be maintained.

In an embodiment, in the state where the first connection maintaining time and the second connection maintaining time are effective, an operation of continuing connection maintenance may be executed at any one of the first electronic device 3000 (for example, the receiver) and the second electronic device 4000 (for example, the executor). In this case, each of the connection time modules 3114, 4114 of the first electronic device 3000 (for example, the receiver) and the second electronic device 4000 (for example, the executor) may reset or refresh the first connection maintaining time and the second connection maintaining time. However, this should not be considered as limiting. The connection termination (or unlink) menu 1974 may be displayed on a UI (for example, the UI 1970 of FIG. 20) of the first electronic device 3000 (for example, the receiver). When the user selects the connection termination (or unlink) menu 1974 displayed on the UI of the first electronic device 3000 (for example, the receiver), the first electronic device 3000 (for example, the receiver) may transmit connection termination (or unlink) to the second electronic device 4000 (for example, the executor). When the connection termination (or unlink) is received from the first electronic device 3000 (for example, the receiver), the second electronic device 4000 (for example, the executor) may disable the channel 3130 between the first electronic device 3000 (for example, the receiver) and the second electronic device 4000 (for example, the executor).

According to various embodiments of the disclosure, an electronic device 101, 1100, 2100 performing an operation corresponding to an utterance of a user in a multi-device environment may include a communication module 190, a processor 120, and a memory 130. The processor 120 may be operatively connected with the communication module 190 and may operate a first electronic device for receiving (for example, the receiver 1300, 2300) and a second electronic device for executing (for example, the executor 1400, 2400) in association with each other. The memory 130 may be operatively connected with the processor 120. The memory 130 may store instructions that, when being executed, cause the processor 120 to: determine whether a first utterance received at the first electronic device (for example, the receiver 1300, 2300) should be performed at the second electronic device (for example, the executor 1400, 2400); when the first utterance should be performed at the second electronic device (for example, the executor 1400, 2400), form a connection binding with the first electronic device (for example, the receiver 1300, 2300) and the second electronic device (for example, the executor 1400, 2400) by using one or more channels through the communication module 190; and, when an operation corresponding to the first utterance is completed at the second electronic device (for example, the executor 1400, 2400), terminate the connection binding with the first electronic device (for example, the receiver 1300, 2300) and the second electronic device (for example, the executor 1400, 2400).

According to various embodiments, the instructions of the electronic device 101, 1100, 2100 may cause the processor 120 to: receive first device information on the first electronic device (for example, the receiver 1300, 2300) and second device information on the second electronic device (for example, the executor 1400, 2400); and based on the first device information and the second device information, connect the first electronic device and the second electronic device (for example, the receiver 1300 and the executor 1400, 2400).

According to various embodiments, the instructions of the electronic device 101, 1100, 2100 may cause the processor 120 to, after the operation corresponding to the first utterance is completed, transmit a response resulting from processing of the first utterance to the first electronic device (for example, the receiver 1300, 2300) in the form of a UI expressible by the first electronic device (for example, the receiver 1300, 2300), based on the first device information.

According to various embodiments, the instructions of the electronic device 101, 1100, 2100 may cause the processor 120 to abstain from transmitting a response which is not a UI expressible by the first electronic device (for example, the receiver 1300, 2300) to the first electronic device (for example, the receiver 1300, 2300).

According to various embodiments, the instructions of the electronic device 101, 1100, 2100 may cause the processor 120 to, after the operation corresponding to the first utterance is completed, transmit a response resulting from processing of the first utterance to the second electronic device (for example, the executor 1400, 2400) in the form of a UI expressible by the second electronic device (for example, the executor 1400, 2400), based on the second device information.

According to various embodiments, the instructions of the electronic device 101, 1100, 2100 may cause the processor 120 to abstain from transmitting a response which is not a UI expressible by the second electronic device (for example, the executor 1400, 2400) to the second electronic device (for example, the executor 1400, 2400).

According to various embodiments, the instructions of the electronic device 101, 1100, 2100 may cause the processor 120 to, after the operation corresponding to the first utterance is completed, correct a response content of the second electronic device (for example, the executor 1400, 2400) resulting from processing of the first utterance, and to transmit the corrected response content to the first electronic device (for example, the receiver 1300, 2300).

According to various embodiments, the instructions of the electronic device 101, 1100, 2100 may cause the processor 120 to: when the first electronic device and the second electronic device (for example, the executor 1400, 2400) are connected, receive a first response format from the first electronic device (for example, the receiver 1300, 2300); and transmit a response resulting from processing of the first utterance to the first electronic device (for example, the receiver 1300, 2300), based on the first response format.

According to various embodiments, the instructions of the electronic device 101, 1100, 2100 may cause the processor 120 to: when the first electronic device and the second electronic device (for example, the executor 1400, 2400) are connected, receive a second response format from the second electronic device (for example, the executor 1400, 2400); and transmit a response resulting from processing of the first utterance to the second electronic device (for example, the executor 1400, 2400), based on the second response format.

According to various embodiments, the instructions of the electronic device 101, 1100, 2100 may cause the processor 120 to: count a first connection maintaining time from a time that a first channel for connecting with the first electronic device (for example, the receiver 1300, 2300) is generated, and to maintain or terminate the connection with the first electronic device (for example, the receiver 1300, 2300) based on the first connection maintaining time; and count a second connection maintaining time from a time that a second channel for connecting with the second electronic device (for example, the executor 1400, 2400) is generated, and to maintain or terminate the connection with the second electronic device (for example, the executor 1400, 2400) based on the second connection maintaining time.

According to various embodiments, the instructions of the electronic device 101, 1100, 2100 may cause the processor 120 to: count a follow-up utterance waiting time from a time that the first utterance is received from the first electronic device (for example, the receiver 1300, 2300); and maintain or terminate the connection with the first electronic device (for example, the receiver 1300, 2300), based on the follow-up utterance waiting time.

According to various embodiments, the instructions of the electronic device 101, 1100, 2100 may cause the processor 120 to: set an additional information input waiting time for waiting until additional information is received from the user after the additional information is requested from the user; and when the additional information is received within the additional information input waiting time or the additional information is not received for the additional information input waiting time, terminate the connection with the first electronic device and the second electronic device (for example, the executor 1400, 2400).

According to various embodiments, the instructions of the electronic device 101, 1100, 2100 may cause the processor 120 to, when a new second utterance that should be performed at the second electronic device (for example, the executor 1400, 2400) is received at the first electronic device (for example, the receiver 1300, 2300) after the connection with the first electronic device (for example, the receiver 1300, 2300) and the second electronic device (for example, the executor 1400, 2400) is terminated, reconnect the first electronic device (for example, the receiver 1300, 2300) and the second electronic device (for example, the executor 1400, 2400).

According to various embodiments, the instructions of the electronic device 101, 1100, 2100 may cause the processor 120 to: in a state in which the connection with the second electronic device (for example, the executor 1400, 2400) based on the first utterance is maintained, when a new second utterance is received at a third electronic device for receiving, generate a connection with the third electronic device for receiving; and connect the second electronic device (for example, the executor 1400, 2400) and the third electronic device.

According to various embodiments, the instructions of the electronic device 101, 1100, 2100 may cause the processor 120 to: in a state in which the connection with the first electronic device (for example, the receiver 1300, 2300) based on the first utterance is maintained, when a new second utterance that should be performed at a fourth electronic device for executing is received at the first electronic device (for example, the receiver 1300, 2300), generate a connection with the fourth electronic device for executing; and connect the first electronic device (for example, the receiver 1300, 2300) and the fourth electronic device.

According to various embodiments, an operating method of an electronic device 101, 1100, 2100 which operates a first electronic device for receiving (for example, the receiver 1300, 2300) and a second electronic device for executing (for example, the executor 1400, 2400) in association with each other, may include: determining whether a first utterance received at the first electronic device (for example, the receiver 1300, 2300) should be performed at the second electronic device (for example, the executor 1400, 2400); when the first utterance should be performed at the second electronic device (for example, the executor 1400, 2400), forming a connection binding with the first electronic device (for example, the receiver 1300, 2300) and the second electronic device (for example, the executor 1400, 2400) by using one or more channels; and, when an operation corresponding to the first utterance is completed at the second electronic device (for example, the executor 1400, 2400), terminating the connection binding with the first electronic device (for example, the receiver 1300, 2300) and the second electronic device (for example, the executor 1400, 2400).

According to various embodiments, the operating method of the electronic device 101, 1100, 2100 may further include: receiving first device information on the first electronic device (for example, the receiver 1300, 2300) and second device information on the second electronic device (for example, the executor 1400, 2400); and, based on the first device information and the second device information, connecting the first electronic device and the second electronic device (for example, the executor 1400, 2400).

According to various embodiments, the operating method of the electronic device 101, 1100, 2100 may include: after the operation corresponding to the first utterance is completed, transmitting a response resulting from processing of the first utterance to the first electronic device (for example, the receiver 1300, 2300) in the form of a UI expressible by the first electronic device (for example, the receiver 1300, 2300), based on the first device information; and transmitting a response resulting from processing of the first utterance to the second electronic device (for example, the executor 1400, 2400) in the form of a UI expressible by the second electronic device (for example, the executor 1400, 2400), based on the second device information.

According to various embodiments, the operating method of the electronic device 101, 1100, 2100 may not transmit a response which is not a UI expressible by the first electronic device (for example, the receiver 1300, 2300) to the first electronic device (for example, the receiver 1300, 2300), and may not transmit a response which is not a UI expressible by the second electronic device (for example, the executor 1400, 2400) to the second electronic device (for example, the executor 1400, 2400).

According to various embodiments, after the operation corresponding to the first utterance is completed, the operating method of the electronic device 101, 1100, 2100 may correct a response content of the second electronic device (for example, the executor 1400, 2400) resulting from processing of the first utterance, and may transmit the corrected response content to the first electronic device (for example, the receiver 1300, 2300).

According to various embodiments, an electronic device 101, 1100, 2100 performing an operation corresponding to an utterance of a user in a multi-device environment may include: a communication module; a processor 120 operatively connected with the communication module 190 and configured to operate a first electronic device for receiving (for example, the receiver 1300, 2300) and a second electronic device for executing (for example, the executor 1400, 2400) in association with each other; and a memory 130 operatively connected with the processor 120. The memory 130 may store instructions that, when being executed, cause the processor 120 to: generate a first channel with the first electronic device (for example, the receiver 1300, 2300) which receives the utterance; receive information of the utterance through the first channel; determine whether an action corresponding to the utterance should be executed at the second electronic device (for example, the executor 1400, 2400), based on the information of the utterance; generate a second channel with the second electronic device (for example, the executor 1400, 2400); request the second electronic device (for example, the executor 1400, 2400) to execute the action corresponding to the utterance through the second channel; receive a result of executing the action corresponding to the utterance from the second electronic device (for example, the executor 1400, 2400); and transmit the result of executing the action corresponding to the utterance to the first electronic device (for example, the receiver 1300, 2300).

According to various embodiments, the processor 120 of the electronic device 101, 1100, 2100 may maintain the first channel for a predetermined first connection maintaining time, and may maintain the second channel for a predetermined second connection maintaining time.

According to various embodiments, when any one of the first connection maintaining time and the second connection maintaining time is ended, the processor 120 of the electronic device 101, 1100, 2100 may disable the first channel and the second channel.

According to various embodiments, in a state in which the first connection maintaining time and the second connection maintaining time are effective, when an operation of continuing connection maintenance is executed at any one of the first electronic device (for example, the receiver 1300, 2300) and the second electronic device (for example, the executor 1400, 2400), the processor 120 of the electronic device 101, 1100, 2100 may reset the first connection maintaining time and the second connection maintaining time.

According to various embodiments, in a state in which the first connection maintaining time and the second connection maintaining time are effective, when a connection termination (unlink) request is received from the first electronic device (for example, the receiver 1300, 2300), the processor 120 of the electronic device 101, 1100, 2100 may terminate the connection with the second electronic device (for example, the executor 1400, 2400).

According to various embodiments, an electronic device 101, 1100, 2100 for receiving an utterance of a user in a multi-device environment may include: a communication module 190; a processor 120 operatively connected with the communication module 190 and configured to operate the first electronic device for receiving (for example, the receiver 1300, 2300) and a second electronic device for executing (for example, the executor 1400, 2400) in association with each other; a memory 130 operatively connected with the processor 120. The memory 130 may store instructions that, when being executed, cause the processor 120 to: when the utterance is received, generate at least one channel and connect with the second electronic device (for example, the executor 1400, 2400); display the connection with the second electronic device (for example, the executor 1400, 2400) through a UI; request the second electronic device (for example, the executor 1400, 2400) to execute an action corresponding to the utterance through the at least one channel; receive a result of executing the action corresponding to the utterance from the second electronic device (for example, the executor 1400, 2400); and display the result of executing the action corresponding to the utterance through the UI.

According to various embodiments, the processor 120 of the electronic device 101, 1100, 2100 may maintain the at least one channel for a predetermined connection maintaining time, and may disable the at least one channel when the connection maintaining time is ended.

According to various embodiments, in a state in which the connection maintaining time is effective, when an operation of continuing connection maintenance is executed at the first electronic device (for example, the receiver 1300, 2300), the processor 120 of the electronic device 101, 1100, 2100 may reset the connection maintaining time.

According to various embodiments, when a new utterance is received in a state in which the connection maintaining time is effective, the processor 120 of the electronic device 101, 1100, 2100 may determine a device to execute an action corresponding to the new utterance; when the new utterance should be executed not at the second electronic device but at another device (for example, the executor 1400, 2400), the processor 120 may display a connection termination (unlink) menu through the UI, and may terminate the connection with the second electronic device (for example, the executor 1400, 2400) when the connection termination is selected by a user.

According to various embodiments, the electronic device 101, 1100, 2100 may connect the another device and the first electronic device (for example, the receiver 1300, 2300), and may request the another device to execute an action corresponding to the new utterance.

According to various embodiments, when a new utterance is received in a state in which the connection maintaining time is effective, the processor 120 of the electronic device 101, 1100, 2100 may determine a device to execute the new utterance, when the new utterance should be executed at the first electronic device (for example, the receiver 1300, 2300), the processor 120 may return to a home screen of the first electronic device (for example, the receiver 1300, 2300), and may execute an action corresponding to the new utterance.

According to various embodiments, an operation corresponding to an utterance can be performed in a multi-device environment without interruption.

According to various embodiments, a resulting response corresponding to an utterance can be displayed according to a UI form of a receiver and an executor.

According to various embodiments, a response corresponding to an utterance can be corrected and transmitted to a receiver.

According to various embodiments, an operation corresponding to an utterance can be processed at a fixed executor while a receiver is changed.

According to various embodiments, an operation corresponding to an utterance can be processed while an executor is changed.

According to various embodiments, a connection with a receiver and an executor can be maintained and terminated based on a connection maintaining time.

According to various embodiments, a connection with a receiver and an executor can be maintained and terminated based on a follow-up utterance waiting time.

According to various embodiments, a connection with a receiver and an executor can be maintained and terminated based on an additional information input waiting time.

Various effects directly or indirectly grasped through the present document may be provided.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory #38) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Although the present disclosure has been described with various embodiments, various changes and modifications may be suggested to one skilled in the art. It is intended that the present disclosure encompass such changes and modifications as fall within the scope of the appended claim.

What is claimed is:

1. An electronic device performing an operation corresponding to an utterance of a user in a multi-device environment, the electronic device comprising:
    a communication module;
    a processor operatively connected with the communication module and configured to operate a first electronic device for receiving and a second electronic device for executing in association with each other; and
    a memory operatively connected with the processor,
    wherein the memory stores instructions that when executed, cause the processor to:
        determine whether a first utterance received at the first electronic device should be performed at the second electronic device;
        in response to determining that the first utterance should be performed at the second electronic device, form a connection binding with the first electronic device and the second electronic device by using one or more channels through the communication module;
        maintain the connection binding with the first electronic device and the second electronic device so that the second electronic device performs at least one action corresponding to at least one utterance received by the first electronic device while the connection binding is maintained; and
        in response to determining that an operation corresponding to the first utterance is completed at the second electronic device, terminate the connection binding with the first electronic device and the second electronic device.

2. The electronic device of claim 1, wherein the instructions cause the processor to:
    receive first device information on the first electronic device and second device information on the second electronic device; and
    based on the first device information and the second device information, connect the first electronic device and the second electronic device.

3. The electronic device of claim 2, wherein the instructions cause the processor to:
    after the operation corresponding to the first utterance is completed, transmit a response resulting from processing of the first utterance to the first electronic device in a form of a user interface (UI) expressible by the first electronic device, based on the first device information.

4. The electronic device of claim 3, wherein the instructions cause the processor to abstain from transmitting a response that is not the UI expressible by the first electronic device to the first electronic device.

5. The electronic device of claim 3, wherein the instructions cause the processor to abstain from transmitting a response that is not UI expressible by the second electronic device to the second electronic device.

6. The electronic device of claim 2, wherein the instructions cause the processor to:
    after the operation corresponding to the first utterance is completed, transmit a response resulting from processing of the first utterance to the second electronic device in a form of a user interface (UI) expressible by the second electronic device, based on the second device information.

7. The electronic device of claim 1, wherein the instructions cause the processor to:
    after the operation corresponding to the first utterance is completed, correct a response content of the second electronic device resulting from processing of the first utterance, and transmit the corrected response content to the first electronic device.

8. The electronic device of claim 1, wherein the instructions cause the processor to:
    in response to the first electronic device and the second electronic device being connected, receive a first response format from the first electronic device; and
    transmit a response resulting from processing of the first utterance to the first electronic device, based on the first response format.

9. The electronic device of claim 1, wherein the instructions cause the processor to:
    in response to the first electronic device and the second electronic device being connected, receive a second response format from the second electronic device; and
    transmit a response resulting from processing of the first utterance to the second electronic device, based on the second response format.

10. The electronic device of claim 1, wherein the instructions cause the processor to:
    count a first connection maintaining time from a time that a first channel for connecting with the first electronic device is generated, and maintain or terminate the connection with the first electronic device based on the first connection maintaining time; and
    count a second connection maintaining time from a time that a second channel for connecting with the second electronic device is generated, and maintain or terminate the connection with the second electronic device based on the second connection maintaining time.

11. The electronic device of claim 10, wherein the instructions cause the processor to:
    set an additional information input waiting time for waiting until additional information is received from the user after the additional information is requested from the user; and
    in response to the additional information being received within the additional information input waiting time or the additional information not being received for the additional information input waiting time, terminate the connection with the first electronic device and the second electronic device.

12. The electronic device of claim 1, wherein the instructions cause the processor to:
   count a follow-up utterance waiting time from a time that the first utterance is received from the first electronic device; and
   maintain or terminate the connection with the first electronic device, based on the follow-up utterance waiting time.

13. The electronic device of claim 1, wherein the instructions cause the processor to:
   in response to a new second utterance that should be performed at the second electronic device being received at the first electronic device after the connection with the first electronic device and the second electronic device is terminated, reconnect the first electronic device and the second electronic device.

14. The electronic device of claim 1, wherein the instructions cause the processor to: in a state that the connection with the second electronic device based on the first utterance is maintained,
   in response to a new second utterance being received at a third electronic device for receiving, generate a connection with the third electronic device for receiving; and
   connect the second electronic device and the third electronic device.

15. The electronic device of claim 1, wherein the instructions cause the processor to:
   in a state that the connection with the first electronic device based on the first utterance is maintained,
   in response to a new second utterance that is determined to be performed at a fourth electronic device for executing is received at the first electronic device, generate a connection with the fourth electronic device for executing; and
   connect the first electronic device and the fourth electronic device.

16. An operating method of an electronic device that operates a first electronic device for receiving and a second electronic device for executing in association with each other, the method comprising:
   determining whether a first utterance received at the first electronic device should be performed at the second electronic device;
   in response to the first utterance being determined to be performed at the second electronic device, forming a connection binding with the first electronic device and the second electronic device by using one or more channels;
   maintaining the connection binding with the first electronic device and the second electronic device so that the second electronic device performs at least one action corresponding to at least one utterance received by the first electronic device while the connection binding is maintained; and
   in response to an operation corresponding to the first utterance being completed at the second electronic device, terminating the connection binding with the first electronic device and the second electronic device.

17. The method of claim 16, further comprising:
   receiving first device information on the first electronic device and second device information on the second electronic device; and
   based on the first device information and the second device information, connecting the first electronic device and the second electronic device.

18. The method of claim 17, further comprising:
   after the operation corresponding to the first utterance is completed,
   transmitting a response resulting from processing of the first utterance to the first electronic device in a form of a user interface (UI) expressible by the first electronic device, based on the first device information; and
   transmitting a response resulting from processing of the first utterance to the second electronic device in the form of the UI expressible by the second electronic device, based on the second device information.

19. The method of claim 18, wherein a response that is not the UI expressible by the first electronic device is not transmitted to the first electronic device, and
   a response that is not the UI expressible by the second electronic device is not transmitted to the second electronic device.

20. The method of claim 16, further comprising
   after the operation corresponding to the first utterance is completed, correcting a response content of the second electronic device resulting from processing of the first utterance, and transmitting the corrected response content to the first electronic device.

21. An electronic device performing an operation corresponding to an utterance of a user in a multi-device environment, the electronic device comprising:
   a communication module;
   a processor operatively connected with the communication module and configured to operate a first electronic device for receiving and a second electronic device for executing in association with each other; and
   a memory operatively connected with the processor,
   wherein the memory stores instructions that when executed, cause the processor to:
      generate a first channel between the electronic device and the first electronic device that receives the utterance;
      receive information of the utterance through the first channel;
      determine whether an action corresponding to the utterance should be executed at the second electronic device, based on the information of the utterance;
      generate a second channel between the electronic device and the second electronic device;
      maintain the first channel and the second channel so that the second electronic device performs at least one action corresponding to at least one utterance received by the first electronic device while the connection binding is maintained; and
      while maintaining the first channel and the second channel:
         request the second electronic device to execute the action corresponding to the utterance through the second channel;
         receive a result of executing the action corresponding to the utterance from the second electronic device; and
         transmit the result of executing the action corresponding to the utterance to the first electronic device.

22. The electronic device of claim 21, wherein the processor is further configured to:

maintain the first channel for a predetermined first connection maintaining time, and maintain the second channel for a predetermined second connection maintaining time.

23. The electronic device of claim 22, wherein, in response to any one of the first connection maintaining time and the second connection maintaining time is ended, the processor is configured to:

disable the first channel and the second channel.

24. The electronic device of claim 22, wherein, in a state that the first connection maintaining time and the second connection maintaining time are effective, in response to an operation of continuing connection maintenance is executed at any one of the first electronic device and the second electronic device, the processor is further configured to:

reset the first connection maintaining time and the second connection maintaining time.

25. The electronic device of claim 21, wherein, in a state that a first connection maintaining time and a second connection maintaining time are effective, in response to a connection termination (unlink) request being received from the first electronic device, terminate the connection with the second electronic device.

26. An electronic device for receiving an utterance of a user in a multi-device environment, the electronic device comprising:

a communication module;

a processor operatively connected with the communication module and configured to operate a first electronic device for receiving and a second electronic device for executing in association with each other; and a memory operatively connected with the processor, wherein the memory stores instructions that when executed, cause the processor to:

in response to the utterance being received, generate at least one channel and connect with the second electronic device;

maintain the at least one channel and the connection with the second electronic device so that the second electronic device performs at least one action corresponding to at least one utterance received by the first electronic device while the connection is maintained; and while maintaining the at least one channel and the connection:

display the connection with the second electronic device through a user interface (UI);

request the second electronic device to execute an action corresponding to the utterance through the at least one channel;

receive a result of executing the action corresponding to the utterance from the second electronic device; and display the result of executing the action corresponding to the utterance through the UI.

27. The electronic device of claim 26, wherein the processor is further configured to:

maintain the at least one channel for a predetermined connection maintaining time; and disable the at least one channel in response to the connection maintaining time being ended.

28. The electronic device of claim 27, wherein, in a state that the connection maintaining time is effective, in response to an operation of continuing connection maintenance being executed at the first electronic device, reset the connection maintaining time.

29. The electronic device of claim 26, wherein the processor is further configured to:

in response to a new utterance being received in a state that a connection maintaining time is effective, determine a device to execute an action corresponding to the new utterance;

in response to determining that the new utterance should be executed at another device, display a connection termination (unlink) menu through the UI; and terminate the connection with the second electronic device in response to the connection termination being selected by a user.

30. The electronic device of claim 29, wherein the processor is further configured to:

connect the another device and the first electronic device; and request the another device to execute an action corresponding to the new utterance.

31. The electronic device of claim 26, wherein the processor is further configured to:

in response to a new utterance being received in a state that a connection maintaining time is effective, determine a device to execute the new utterance;

in response to determining that the new utterance should be executed at the first electronic device, return to a home screen of the first electronic device; and execute an action corresponding to the new utterance.

* * * * *